(12) United States Patent
Yamaguchi et al.

(10) Patent No.: US 9,399,165 B2
(45) Date of Patent: Jul. 26, 2016

(54) GAME DEVICE, GAME CONTROL METHOD, RECORDING MEDIUM AND GAME MANAGEMENT DEVICE

(71) Applicant: KONAMI DIGITAL ENTERTAINMENT CO., LTD., Tokyo (JP)

(72) Inventors: Tsuyoshi Yamaguchi, Tokyo (JP); Jun Hayashi, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 314 days.

(21) Appl. No.: 14/016,577

(22) Filed: Sep. 3, 2013

(65) Prior Publication Data

US 2014/0004947 A1 Jan. 2, 2014

Related U.S. Application Data

(63) Continuation of application No. PCT/JP2011/075575, filed on Nov. 7, 2011.

(30) Foreign Application Priority Data

Mar. 18, 2011 (JP) .................................. 2011-061705
Nov. 1, 2011 (JP) .................................. 2011-240668

(51) Int. Cl.
*A63F 9/24* (2006.01)
*A63F 13/00* (2014.01)
(Continued)

(52) U.S. Cl.
CPC ................. *A63F 13/00* (2013.01); *A63F 13/10* (2013.01); *A63F 13/12* (2013.01); *A63F 2300/575* (2013.01); *A63F 2300/8011* (2013.01)

(58) Field of Classification Search
CPC ......... A63F 13/00; A63F 13/10; A63F 13/12; A63F 2300/575; A63F 2300/8011
USPC ...................................................... 463/31, 9
See application file for complete search history.

(56) References Cited

U.S. PATENT DOCUMENTS

2004/0157654 A1  8/2004 Kataoka et al.
2004/0242294 A1  12/2004 Shiozawa
(Continued)

FOREIGN PATENT DOCUMENTS

EP      1493474 A2    1/2005
JP   2004-275231 A   10/2004
(Continued)

OTHER PUBLICATIONS

The Miracle of the Zone 2 Toriatsukai Setsumeisho, Hudson, Recieved date Aug. 2, 2004, pp. 36-37.
(Continued)

*Primary Examiner* — Omkar Deodhar
*Assistant Examiner* — Wei Lee
(74) *Attorney, Agent, or Firm* — Westerman, Hattori, Daniels & Adrian, LLP

(57) ABSTRACT

A game device includes an owned card storage unit for storing player cards owned by a game player, and a player card exchange unit for exchanging a player card owned by the game player with an exchangeable card presented by a CPU, wherein the player card exchange unit includes an exchangeable card presentation unit for determining the exchangeable cards based on the player cards owned by the game player to be presented on a screen, an exchange condition presentation unit for setting an exchange condition for exchanging the exchangeable card with the player card owned by the game player to be presented on the screen; and an exchange execution unit for approving the exchange of the player card and the exchangeable card when the player card that satisfies the exchange condition is selected by the game player, and updating the memory content of the owned card storage unit to a content after the approval of the exchange.

8 Claims, 30 Drawing Sheets

(51) Int. Cl.
    *G06F 17/00*     (2006.01)
    *G06F 19/00*     (2011.01)
    *A63F 13/40*     (2014.01)
    *A63F 13/30*     (2014.01)

(56) References Cited

U.S. PATENT DOCUMENTS

| | | |
|---|---|---|
| 2004/0259642 A1 | 12/2004 | Tanaka et al. |
| 2009/0124393 A1 | 5/2009 | Tanaka et al. |
| 2009/0275371 A1 | 11/2009 | Takahashi et al. |
| 2010/0197407 A1 | 8/2010 | Kataoka et al. |
| 2011/0237317 A1* | 9/2011 | Noonan et al. ............ 463/2 |

FOREIGN PATENT DOCUMENTS

| | | |
|---|---|---|
| JP | 2005-028103 A | 2/2005 |
| JP | 2005-319135 A | 11/2005 |
| JP | 2007-130501 A | 5/2007 |
| JP | 2007-130502 A | 5/2007 |
| JP | 2007-175508 A | 7/2007 |
| JP | 4393267 B2 | 1/2010 |
| JP | 2011-040080 A | 2/2011 |
| KR | 10-2003-0019459 A | 3/2003 |
| KR | 10-2007-0110544 A | 11/2007 |

OTHER PUBLICATIONS

Culdcept DS Koshiki Guide, 1st Edition, Media Factory, Inc, Oct. 16, 2008, pp. 101.

International search Report for PCT/JP2011/075575, Mailing Date of Feb. 7, 2012.

Office Action for Japanese Patent Application 2011-240668, Mailing Date of Feb. 7, 2012.

Korean Office Action dated Oct. 6, 2014, issued in KR corresponding application No. 10-2013-7001488(English Translation) (5 pages).

\* cited by examiner

FIG. 13A

| TOURNAMENT \ STRENGTH | ☆10~24 | ☆25~54 | ☆55~79 | ☆80~99 |
|---|---|---|---|---|
| GRAND PRIX 1 | 10% | 45% | 40% | 5% |
| GRAND PRIX 2 | 10% | 40% | 45% | 5% |
| GRAND PRIX 3 | 10% | 35% | 45% | 10% |
| GRAND PRIX 4 | 5% | 30% | 50% | 15% |
| GRAND PRIX 5 | 5% | 20% | 55% | 20% |
| GRAND PRIX 6 | 0% | 15% | 55% | 30% |
| GRAND PRIX 7 | 0% | 5% | 50% | 45% |

FIG. 13B

| GRADE \ STRENGTH | ☆10~24 | ☆25~54 | ☆55~79 | ☆80~99 |
|---|---|---|---|---|
| GRADES 0~3 | 10% | 45% | 40% | 5% |
| GRADES 4~6 | 10% | 40% | 45% | 5% |
| GRADES 7~9 | 10% | 35% | 45% | 10% |
| GRADES 10~12 | 5% | 30% | 50% | 15% |
| GRADES 13~15 | 5% | 20% | 55% | 20% |
| GRADES 16~17 | 0% | 15% | 55% | 30% |
| GRADES 18~19 | 0% | 5% | 50% | 45% |

FIG. 13C

| AVE STRENGTH \ STRENGTH | ☆10~24 | ☆25~54 | ☆55~79 | ☆80~99 |
|---|---|---|---|---|
| ☆ 25 or less | 10% | 45% | 40% | 5% |
| ☆ 26~30 | 10% | 40% | 45% | 5% |
| ☆ 31~35 | 10% | 35% | 45% | 10% |
| ☆ 36~40 | 5% | 30% | 50% | 15% |
| ☆ 41~45 | 5% | 20% | 55% | 20% |
| ☆ 46~50 | 0% | 15% | 55% | 30% |
| ☆ 51 or more | 0% | 5% | 50% | 45% |

FIG. 14

| N of CARD(s) STRENGTH | ONE | TWO | THREE |
|---|---|---|---|
| ☆10~24 | 100% | 0% | 0% |
| ☆25~54 | 80% | 20% | 0% |
| ☆55~79 | 40% | 40% | 20% |
| ☆80~99 | 30% | 30% | 40% |

FIG. 15

| REQUIRED # OF PLAYER CARDS FOR EXCHANGE | STRENGTH OF EACH PLAYER (STRENGTH/PLAYER CARD) |
|---|---|
| ONE | ☆NUMBER ±5 OF EXCHANGEABLE CARD |
| TWO | (☆NUMBER −10 OF EXCHANGEABLE CARD) ±5 OF THE EXCHANGEABLE CARD |
| THREE | (☆NUMBER −15 OF EXCHANGEABLE CARD) ±5 OF THE EXCHANGEABLE CARD |

FIG. 16

| BASIC EXCHANGE CONDITIONS | CONTENT |
|---|---|
| ☆ NUMBER TRADE | PLAYER CARD MATCHING ☆ NUMBER OF EXCHANGEABLE CARD IS REQUESTED |
| BALL CLUB TRADE | PLAYER CARD OF SPECIFIC BALL CLUB IS REQUESTED |
| CAPABILITY TRADE | PLAYER CARD WITH SPECIFIC POSITION OR SPECIFIC CAPABILITY IS REQUESTED |

FIG.17

| BASIC EXCHANGE CONDITION | EXCHANGE CONDITION ITEM ID | TARGET CONDITION | EXCHANGE CONDITIONS |
|---|---|---|---|
| ☆ NUMBER TRADE | 1 | ☆ NUMBER | PLAYER WITH ☆NUMBER OR HIGHER |
| BALL CLUB TRADE | 2 | BALL CLUB | PLAYER AFFILIATED TO BALL CLUB ○ |
| CAPABILITY TRADE | 3 | POSITION | PLAYER OF POSITION ○ |
| | 4 | BATTING SKILL (Against R/L) | PLAYER WITH BATTING SKILL OF ○ RANK OR HIGHER |
| | 5 | BATTING POWER | PLAYER WITH BATTING POWR OF ○ RANK OR HIGHER |
| | 6 | BASE RUNNING SKILL | PLAYER WITH BASE RUNNING SKILL OF ○ RANK OR HIGHER |
| | 7 | OVERALL FIELDING SKILL | PLAYER WITH OVERALL FIELDING SKILL OF ○ RANK OR HIGHER |
| | 8 | VELOCITY | PLAYER WITH VELOCITY OF ○km/h OR MORE |
| | 9 | PITCH TYPE | PLAYER WITH PITCH TYPE ○ |
| | 10 | CURVE | PLAYER WITH CURVE OF ○ RANK OR HIGHER |
| | 11 | BALL POWER | PLAYER WITH BALL POWR OF ○ RANK OR HIGHER |
| | 12 | BALL CONTROL | PLAYER WITH BALL CONTROL OF ○ RANK OR HIGHER |
| | 13 | STAMINA | PLAYCER WITH STAMINA OF ○ OR HIGHER |
| | 14 | DOMINANT HAND | RIGHT-HANDED PITCHER OR LEFT-HANDED PITCHER |

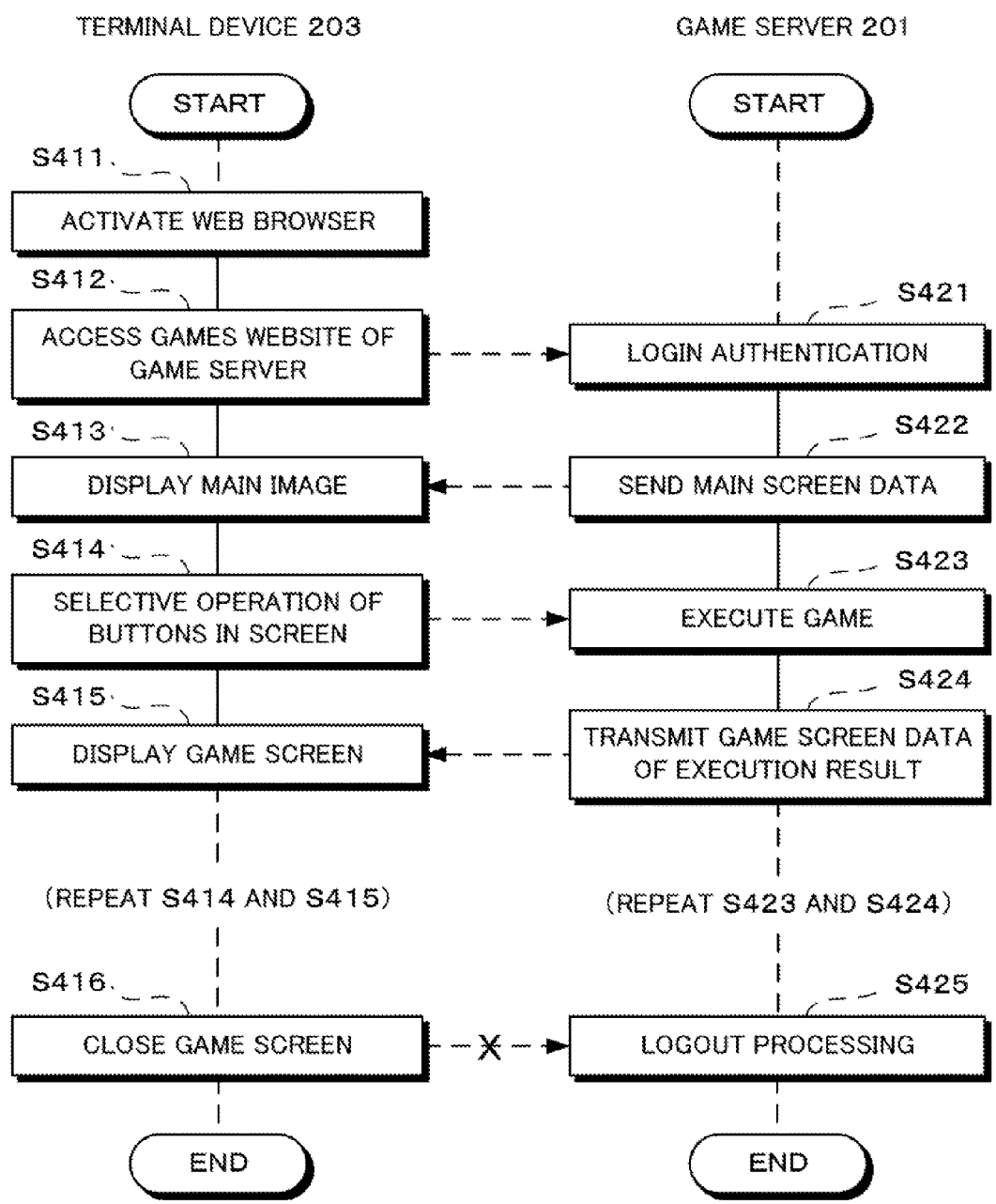

GAME DEVICE, GAME CONTROL METHOD, RECORDING MEDIUM AND GAME MANAGEMENT DEVICE

TECHNICAL FIELD

This application is based on Japanese Patent Application Serial No. 2011-061705, filed in the Japan Patent Office on Mar. 18, 2011, and Japanese Patent Application Serial No. 2011-240668, filed in the Japan Patent Office on Nov. 1, 2011, the contents of which are hereby incorporated by reference.

The present invention relates to a game device which executes various types of games, a game control method, a program, a recording medium with the foregoing program recorded thereon, and a game management device.

BACKGROUND ART

There is a game where a game player owns objects such as various items and characters in a virtual game space, and which enables the game player to use those objects in the game. With this kind of game, normally, since the game development of whether the game player can play the game to one's satisfaction will differ depending on the types of objects owned by the game player, the game player attempts to collect the types of objects of one's needs.

For example, in a baseball game, there is a type where a game player collects player characters to form one's own team, and plays a team competition game with another team. In the foregoing case, the game player attempts to acquire player characters of one's preference in order to form one's ideal team. However, generally speaking, it is no easy task for a game player to acquire objects, such as characters, of one's preference in a virtual game space.

Thus, in a conventional game system, there is a type which communicably connects a plurality of game devices, and, by allowing a plurality of game players to mutually exchange objects in one's possession, enables a game player to acquire an object, which is not in one's possession, from another game player (refer to Japanese Patent No. 4393267).

Nevertheless, with the foregoing conventional configuration, since it is necessary to exchange objects with another game player, when the other game player does not possess the object desired by a certain game player, or, even when the other game player possesses that object, when the other game player is not willing to exchange that object, a game player will not be able to acquire one's desired object. Thus, in cases where a game player repeatedly attempts to exchange objects with another game player but there is no sign of being able to acquire the object of one's preference, there is a problem in that the game player may become dissatisfied with the exchange of objects between game players.

SUMMARY OF THE INVENTION

An object of this invention is to provide a game device capable of realizing the exchange of characters which subdues the dissatisfaction in a conventional exchange of characters by game players.

In order to achieve the foregoing object, the game device according to one aspect of the present invention is a game device for executing a game using an owned character that is owned by a game player in a virtual space, which comprises a character storage unit for storing the owned character in a storage device; and a character exchange unit for exchanging the owned character with another character, wherein the character exchange unit comprises an exchangeable character presentation unit for determining, based on the owned character, an exchangeable character that can be exchanged with the owned character, and presenting the exchangeable character on a screen, an exchange condition presentation unit for setting a character exchange condition for exchanging the exchangeable character presented by the exchangeable character presentation unit with the owned character, and presenting the character exchange condition on a screen, an exchange-target character selection unit for causing the game player to select, among owned characters, an owned character to be exchanged with the exchangeable character, and an exchange execution unit for executing the exchange of the owned character with the exchangeable character when the owned character that satisfies the character exchange condition presented by the exchange condition presentation unit is selected by the exchange-target character selection unit, and updating a memory content of the character storage unit to a content after the approval of the exchange.

The game management device according to another aspect of the present invention is a game management device which receives an access from a terminal device of each player via a network and provides to each player, via the network, a game service using an owned character that is owned by a game player in a virtual space, the which comprises a character storage unit for storing an owned character in a storage device, and a character exchange unit for exchanging the owned character with another character, wherein the character exchange unit comprises an exchangeable character presentation unit for determining, based on the owned character, an exchangeable character that can be exchanged with the owned character, transmitting information for displaying the exchangeable character to the terminal device, and presenting the exchangeable character on a screen of the terminal device; an exchange condition presentation unit for setting a character exchange condition for exchanging the exchangeable character presented by the exchangeable character presentation unit with the owned character, transmitting information for displaying the character exchange condition to the terminal device and presenting the character exchange condition on the screen of the terminal device; a selection operation information reception unit for receiving a selection operation information from the terminal device when an owned character to be exchanged with the exchangeable character is selected among the owned characters using the terminal device; and an exchange execution unit for executing the exchange of the owned character with the exchangeable character when the owned character that satisfies the character exchange condition presented by the exchange condition presentation unit is selected using the terminal device, and updating a memory content of the character storage unit to a content after the execute of the exchange.

The game control method according to another aspect of the present invention is a game control method where a computer controls a game using an owned character that is owned by a game player in a virtual space, comprises a character storage step of the computer storing the owned character in a storage device.

The method further comprises a character exchange step of the computer exchanging the owned character with another character, wherein the character exchange step comprises an exchangeable character presentation step of the computer determining, based on the owned character, an exchangeable character that can be exchanged with the owned character, and presenting the exchangeable character on a screen, an exchange condition presentation step of the computer setting a character exchange condition for exchanging the exchangeable character presented in the exchangeable character presentation step with the owned character, and presenting the character exchange condition on a screen, an exchange target character selection step of the computer causing the game player to select, among the owned characters, an owned character to be exchanged with the exchangeable character, and an exchange execution step of the computer approving the exchange of the owned character and the exchangeable character when the owned character that satisfies the character exchange condition presented in the exchange condition presentation step is selected in the exchange-target character selection step, and updating a memory content of the storage device to a content after the approval of the exchange.

According to the present invention, it is possible to realize a highly amusing game capable of realizing a smooth character exchange which subdues the dissatisfaction during a conventional exchange of characters by game players.

The game device and the game management device of the present invention may also be realized by a computer, and, in the foregoing case, a program which realizes the foregoing game device and game management device with a computer by causing the computer to operate as the respective units described above and a computer-readable recording medium with such a program recorded thereon are also covered by the present invention.

The objects, features and advantages of the present invention will become further evident from the following description with reference to the accompanying drawings.

BRIEF DESCRIPTION OF THE DRAWINGS

FIG. 13A is an explanatory diagram showing an example of the strength determination probability table based on the level of advancement in the tournament;

FIG. 13B is an explanatory diagram showing an example of the strength determination probability table based on the grade level;

FIG. 13C is an explanatory diagram showing an example of the strength determination probability table based on the average strength of the player card;

FIG. 14 is an explanatory diagram showing an example of the number of cards determination probability table;

FIG. 15 is an explanatory diagram showing the relationship of the number of player cards required for the exchange and the strength of the respective player cards;

FIG. 16 is an explanatory diagram explaining an example of the basic exchange condition;

FIG. 17 is an explanatory diagram showing an example of the exchange condition item list;

FIG. 34 is a flowchart showing an example of the operation of the game system.

BEST MODE FOR CARRYING OUT THE INVENTION

In the following, a game device, a game control method, a program, a non-transitory recording medium having recorded thereon the program, and a game management device according to one embodiment of the present invention are described with reference to the accompanying drawings.

[Outline of Game Device]

The game device according to an embodiment of the present invention is applied to a game in which a game player can own characters in a virtual space, and the game player can use the characters in one's possession in this game. As an example of this type of game, considered may be a sports game in which the game player owns player characters in a virtual space and a match is played in a virtual space by using those player characters. In a baseball game as one example of such a sports game, the game player can form one's own team with player characters such as pitcher characters and fielder characters owned by that game player, and play against an opponent team that is automatically controlled by a computer (CPU of the game device), or an opponent team that was formed by another game player. In this embodiment, the ensuing explanation is provided by taking this kind of baseball game as an example.

Figure 9:
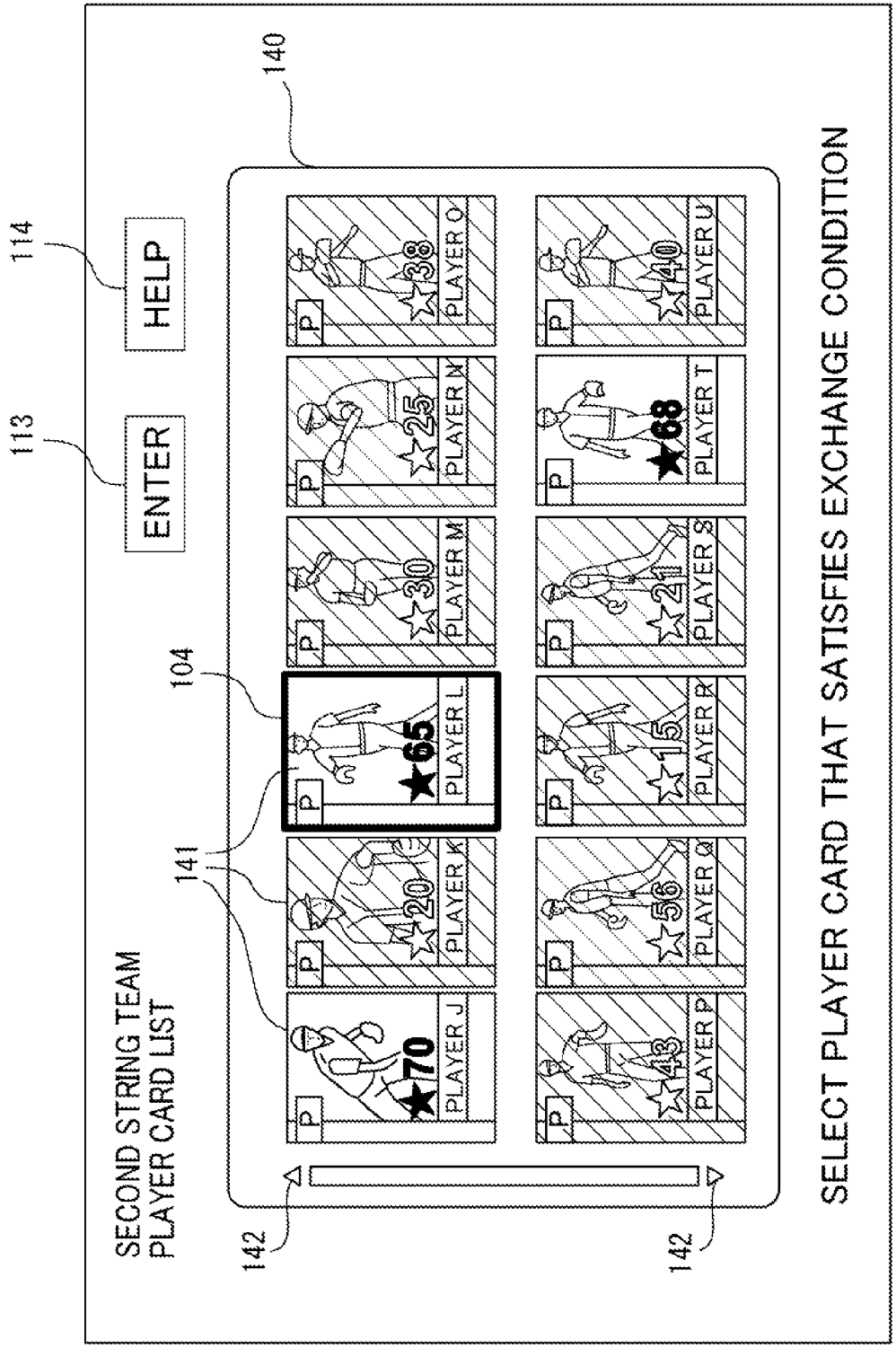
FIG. 9 is an explanatory diagram showing an example of the player card list display screen.

With the game device of this embodiment, shown is an example where the player characters (owned characters) owned by the game player are displayed on a screen in a card format which enables the visual recognition of the mode of the player characters. For example, as shown in FIG. 9, the respective player characters owned by the game player are displayed on the screen as a player card indicating that player character's mode, player name, position symbol (for instance, "P" represents a pitcher), basic ability score (for instance, * number) and so on. In other words, this embodiment adopts a mode where the game player owns player cards and can collect and exchange the player cards, and the player character is managed in the game as a player card. In addition, the game player can form an original team using the collected player cards and enjoy a baseball match. Note that the player characters in the match are configured from polygons and the like in a virtual game space, and move based on the game player's operations.

Figure 6:
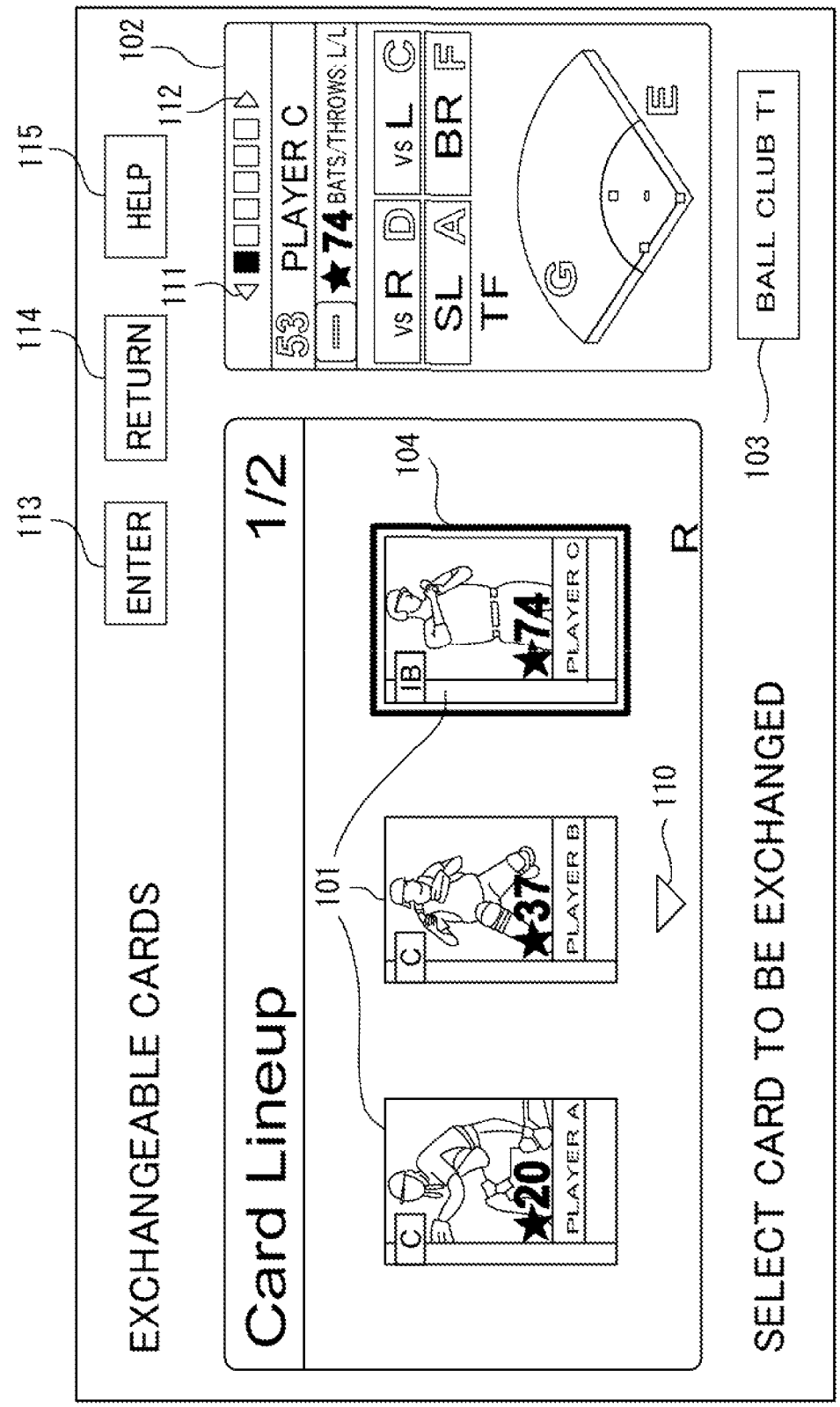
FIG. 6 is an explanatory diagram showing an example of the exchangeable card presentation screen.
Figure 7:
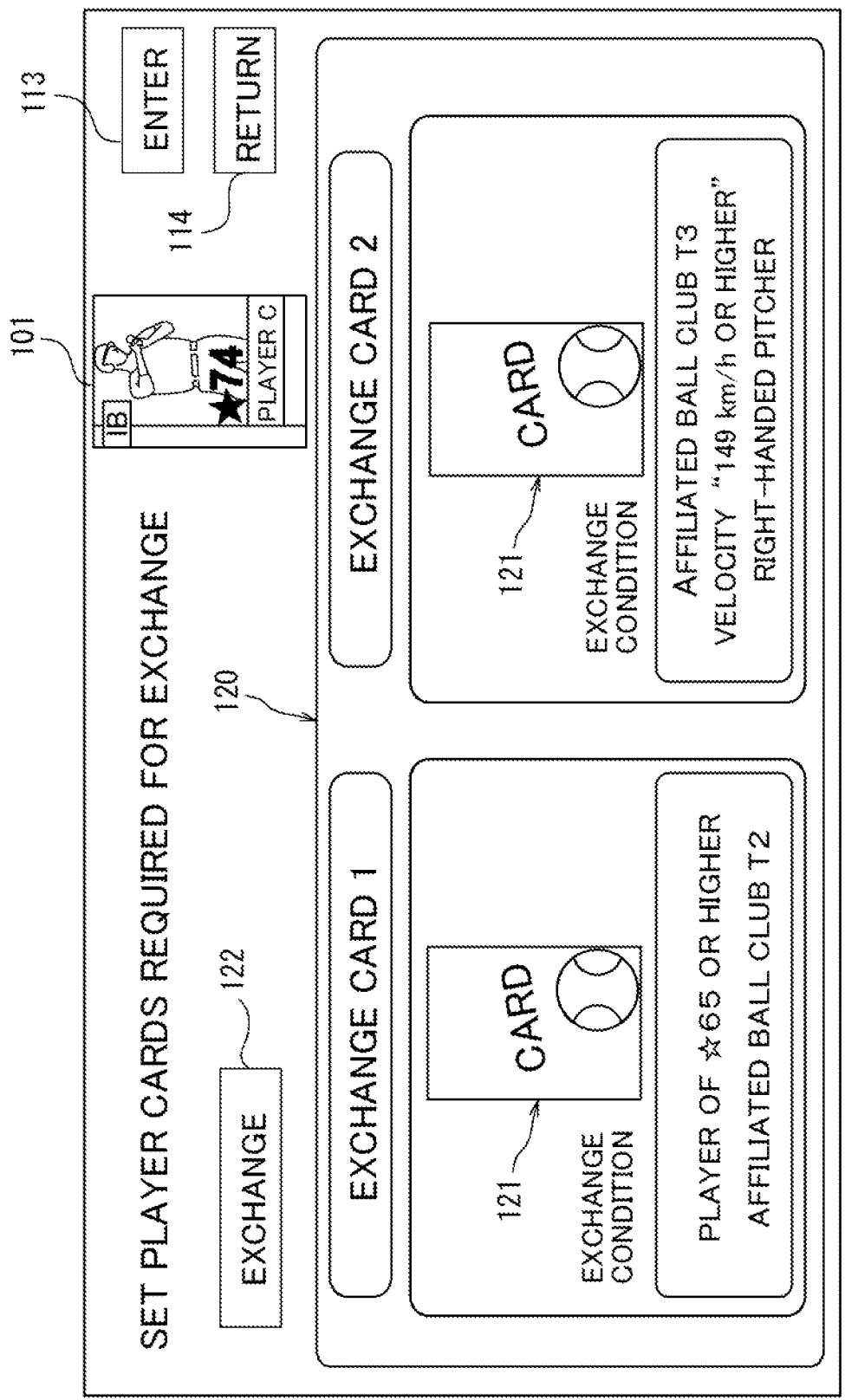
FIG. 7 is an explanatory diagram showing an example of the exchange condition presentation screen.

With the game device of this embodiment, the CPU of the game device analyzes the player characters owned by the game player, decides, within the game device, exchangeable characters that can be exchanged with the player characters, and presents the determined exchangeable characters and an exchange condition on a screen. For example, as shown in FIG. 6, the game device presents on the screen, as a predetermined number of exchangeable cards, the exchangeable characters that were determined based on the player cards owned by the game player, and allows the game player to select the exchangeable card. Moreover, as shown in FIG. 7, the game device also displays on the screen an exchange condition (character exchange condition) for exchanging the exchangeable card selected by the game player with the player card owned by the game player. In addition, for example, as shown in FIG. 9, by the game player selecting a player card that satisfies the exchange from the list display screen of the player cards owned by the game player, the game device approves the character exchange. Note that FIG. 6, FIG. 7 and FIG. 9 described will be explained in detail later.

Accordingly, with this embodiment, rather than exchanging characters with another game player, the game player can exchange a player card (player character) in one's possession with an exchangeable card (exchangeable character) presented by the CPU of the game device. In addition, the game device of this embodiment realizes a smooth character exchange which subdues the dissatisfaction in a conventional exchange of characters by game players as described above as a result of the CPU predicting the card that the game player wishes to exchange upon determining the exchangeable cards based on the player cards owned by the game player, and causing the predicted card to be presented as the exchangeable card with a higher probability. The configuration of the game device according to this embodiment is now explained in further detail.

[Configuration of Game Device]

Figure 1:
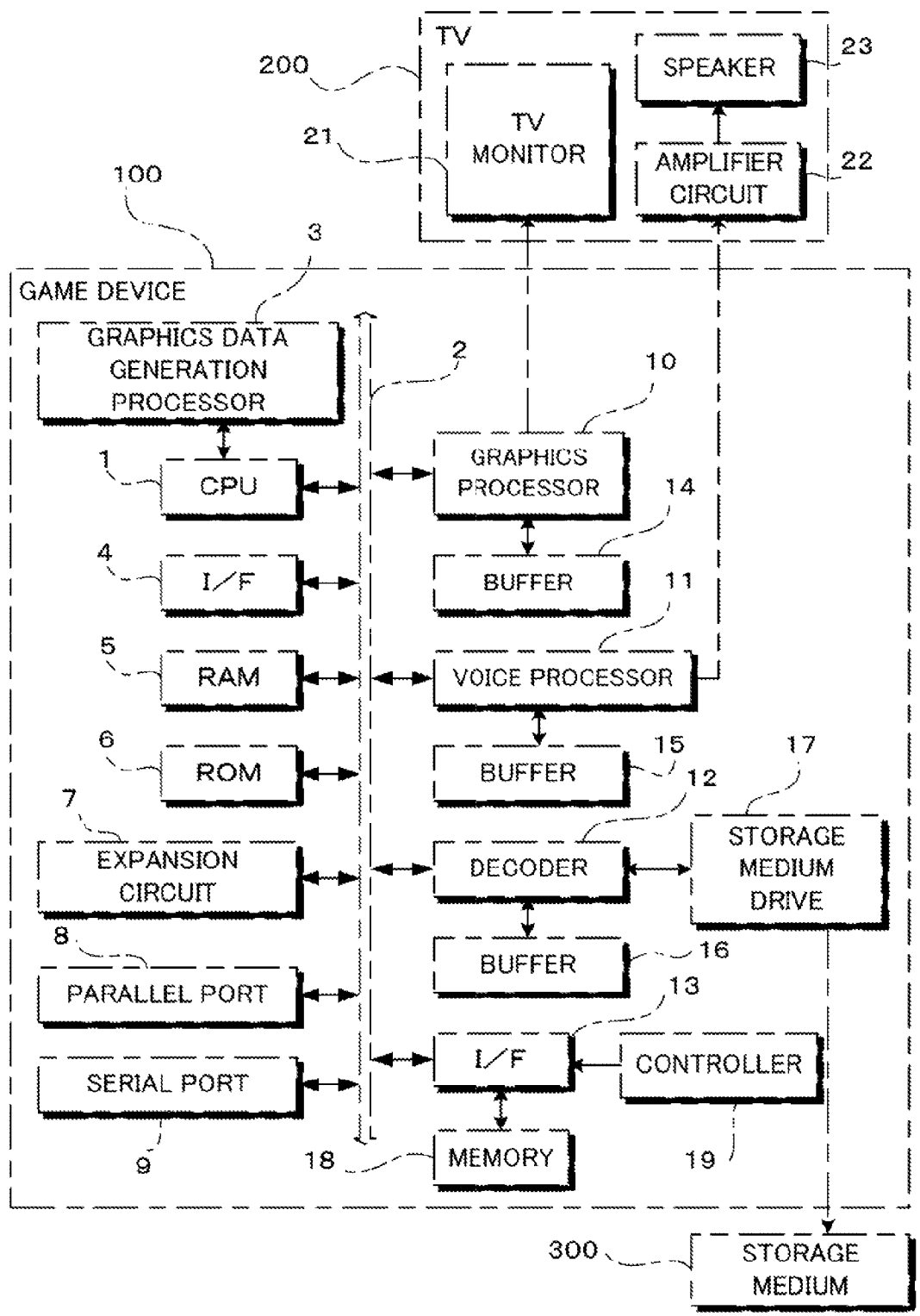
FIG. 1 is a block diagram showing an example of the hardware configuration of the game device according to an embodiment of the present invention.

FIG. 1 is a block diagram showing an example of the hardware configuration of the game device according to an embodiment of the present invention. In this embodiment, as one example of the game device 100, explained is a domestic video game machine that is used by being connected to a domestic television 200. The game device 100 is loaded with a computer-readable recording medium 300 on which a game program is recorded, and a game is executed by the game program being read from the recording medium 300 as needed.

The game device 1000 includes a CPU (Central Processing Unit) 1, a bus line 2, a graphics data generation processor 3, an interface circuit (I/F) 4, a RAM (Random-Access Memory) 5, a ROM (Read Only Memory) 6, an expansion circuit 7, a parallel port 8, a serial port 9, a drawing processor 10, a sound processor 11, a decoder 12, an interface circuit (I/F) 13, buffers 14 to 16, a recording medium drive 17, a memory 18, and a controller 19. The television 200 to which this game device 100 is connected includes a television monitor 21, an amplifier circuit 22 and a speaker 23.

The CPU 1 is connected to the bus line 2 and the graphics data generation processor 3. The bus line 2 includes an address bus, a data bus, a control bus, and the like. Via this bus line 2, the CPU 1, the interface circuit 4, the RAM 5, the ROM 6, the expansion circuit 7, the parallel port 8, the serial port 9, the drawing processor 10, the sound processor 11, the decoder 12, and the interface circuit 13 are mutually connected.

The drawing processor 10 is connected to the buffer 13 and the television monitor 21. The sound processor 11 is connected to the buffer 15 and the television 200. The decoder 12 is connected to the buffer 16 and the recording medium drive 17. The interface circuit 13 is connected to the memory 18 and the controller 19.

Incidentally, in the case where the game device 100 is constituted as a personal computer or a work station, the television monitor, and the like correspond to a display for a computer. The expansion circuit 7, the drawing processor 10, the sound processor 11, and the like respectively correspond to parts of data of a game control program recorded on the recording medium 300, or hardware on the expansion board mounted to an expansion slot of a computer. The interface circuit 4, the parallel port 8, the serial port 9 and the interface circuit 13 respectively correspond to hardware on the expansion board mounted to the expansion slot of the computer. The buffers 14 to 16 respectively correspond to respective memory areas of the RAM 5 or the expansion memory.

The graphics data generation processor 3 plays the role of coprocessor of CPU 1. In other words, this graphics data generation processor 3 performs coordinate transformation and light source calculation, such as fixed point matrix and vector operations, by parallel processing. The major processing of this graphics data generation processor 3 involves processing to determine the address of the processing target image in a predetermined display area based on the coordinate data, the moving amount data and the rotation amount data of each vertex in a 2-D or 3-D space of the image data supplied from the CPU 1, and to return this address data to the CPU 1, and the processing to calculate the luminance of the image based on the distance from the light source, which is set virtually.

The interface circuit 4 is for interfacing the peripheral devices and a pointing device, such as a mouse and trackball. The RAM 5 is used as the main memory. In the ROM 6, the program data required for the operating system of the game device 100 is stored.

The decompression circuit 7 performs decompression processing for compressed images which were compressed by intra-encoding conforming to the MPEG (Moving Picture Engineering Group) standard for moving pictures and to the JPEG (Joint Picture Engineering Group) standard for still pictures. Decompression processing includes decoding processing (decoding data encoded by VLC: Variable Length Code), inverse quantization processing, IDCT (Inverse Discrete Cosine Transform) processing, and restoration processing of intra-images.

The drawing processor 10 performs drawing processing for the buffer 14 at each predetermined time (for example, 1 frame, e.g. 1/60 sec.) based on the drawing instructions issued by the CPU 1. The buffer 14 is comprised of RAM, for example, and consists of a display area (frame buffer) and a non-display area. The display area is a development area for data to be displayed on the display screen of the television monitor 21. The non-display area is a storage area for data to define skeletons, model data to define polygons, animation data to assign motion to models, pattern data to indicate the content of each animation, texture data and color palette data. Here the texture data is 2-D image data. The color palette data is data for specifying the color of texture data. CPU 1 reads out these data from the recording medium 300 all at once, or at a plurality of times along with the progress of a game to be recorded in the non-display area of the buffer 14 beforehand.

The voice processor 11 writes ADPCM (Adaptive Differential Pulse Code Modulation) data read from the recording medium 300 to the buffer 15, and the ADPCM data stored in this buffer 15 is used as the sound source. This voice processor 11 reads the ADPCM data from the buffer 15 based on a clock signal with a 44.1 kHz frequency, for example. The voice processor 11 performs such processing as pitch transformation, adding noise, setting an envelope, setting level, and adding reverb, for the ADPCM data read from the buffer 15. When the voice data read from the recording medium 200 is PCM data such as CD-DA (Compact Disk Digital Audio), the voice data is converted to ADPCM data by the voice processor 11. The voice data processed by the voice processor is then output from the speaker 23 via the amplifier circuit 22.

For example, the recording medium drive 17 is made up of a DVD-ROM drive, a CD-ROM drive, a hard disk drive, an optical disk drive, a flexible disk drive, a silicon disk drive, a cassette medium reading device, etc. The recording medium 300 is made up of a DVD-ROM, a CD-ROM, a hard disk, an optical disc, a flexible disk or a semiconductor memory, etc. The recording medium drive 17 reads the image data, the audio data, and the program data from the recording medium 300, and supplies the data as read to the decoder 12. The decoder 12 performs an error correction processing based on the ECC (Error Correction Code) for the image data, the audio data, and the program data supplied from the recording medium drive 17, and supplies the data as processed to the RAM 5 or the sound processor 11.

The memory 18 is an auxiliary memory device, which has a nonvolatile storage region for storing therein various game parameters at a point of interruption, such as the case of holding the status at a point of interruption when the game is interrupted midway. The memory 18 can store game program or various kinds of data. For this memory 18, for example, a card type memory, a hard disk, etc. can be used.

The controller 19 is an operation device which permits the user as an operator to input various types of operation commands. The controller 19 outputs an operation signal according to an operation by the user to the CPU 1 via the interface circuit 13. This controller 19 is used for providing commands, to move a character and cursor vertically and horizontally on the screen of the television monitor 21, to the CPU 1.

The general operation of the above mentioned game device 100 will now be explained. When the power is supplied to the game device 100, the CPU 1 instructs the recording medium drive 17 to read the game program from the recording medium 300 based on the operating system stored in the ROM 6. The image data, voice data, and program data as read by the recording medium drive 17 from the recording medium 300 are supplied to the decoder 12, and the decoder 12 executes error correction processing for each data.

The image data to which the error correction processing has been performed, is supplied to the expansion circuit 7 via the bus line 2, and the above mentioned expansion processing is performed. The image data is then supplied to the drawing processor 10, and is written to the non-display area of the buffer 14 by the drawing processor 10. The voice data, to which the decoder 12 performed the error correction processing, is written to the buffer 15 via the RAM 5 or the voice processor 11. The program data, to which the decoder 12 performed the error correction processing, is written to the RAM 5.

The CPU 1 performs a player card exchange processing, a game progress processing, and the like based on the game control program stored in the RAM 5 and on the content which the user instructs using the controller 19. In other words, the CPU 1 controls image processing, controls voice processing, and controls internal processing based on the content which the user instructs using the controller 19.

The game device 100 comprises a communication interface (not shown), and it is also possible to execute a competitive game by connecting to other game device 100 by a wireless LAN communication, an internet communication, a near field communication a cable communication, etc., and carrying out sending and receiving of data while making the game devices in sync with one another.

[Functional Configuration of Game Device]

Figure 2:
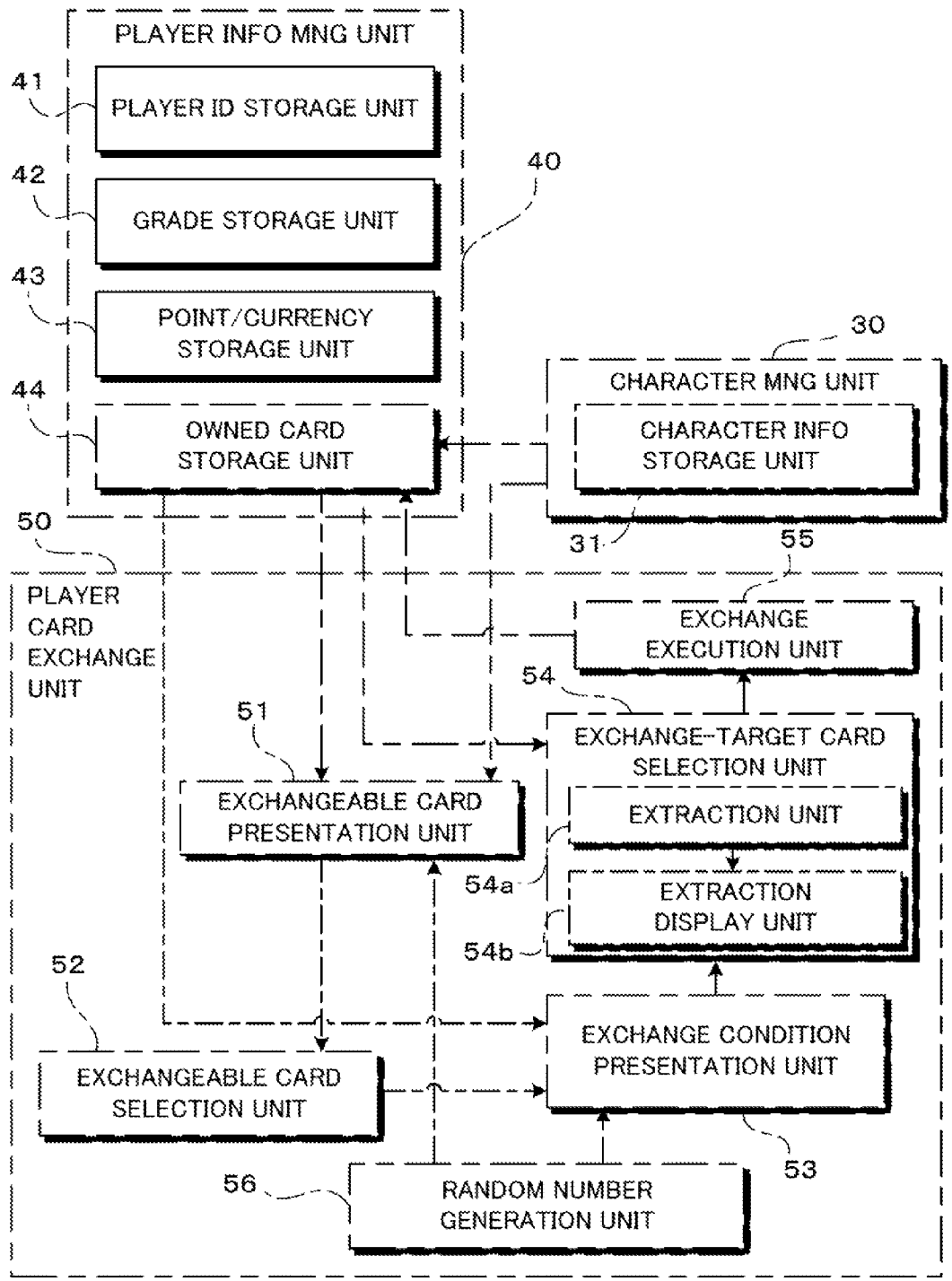
FIG. 2 is a functional block diagram showing an example of the functional configuration of the game device.

The main functions of the game device 100 configured as described above are now explained. FIG. 2 is a main functional block diagram of the game device 100 shown in FIG. 1. The game device 100 functionally comprises a character management unit 30, a game player information management unit 40 and a player card exchange unit 50 (character exchange unit), and the respective units are realized by a CPU 1 executing a game program.

The character management unit 30 comprises a character information storage unit 31, and manages image information and various types of data of the respective player characters. The character information storage unit 31 associates each player character in the game with identifying information (character ID) for uniquely identifying each player character, and stores, in a predetermined region of the memory, player character information such as image information, profile information (player's name, batting average, earned run average and other records) and parameters (basic ability score and various capabilities) of each player character.

The basic ability score as a parameter of the player character is a value that shows the level of basic capability of that player character, and is a comprehensive evaluation of the various strengths of the player character such as batting power and defensive skills. In this embodiment, as shown in FIG. 9 and other diagrams, the basic ability score is also displayed on the player card as the player character's strength indicated as "* number" (hereinafter, * indicates a symbol "star" in the figures). The foregoing player character's strength is represented, for example, in 99 levels of *1 to *99, and shows that, greater the * number, higher the basic ability score.

The various capabilities as a parameter of the player character are, for example, capabilities such as batting skill, batting power, base running skill, and overall defense skill when the player character is a fielder, and capabilities such as velocity, curve, ball power, ball control, and stamina when the player character is a pitcher. In this embodiment, the various capabilities of the player character are ranked S and A to G to represent the level of each capability, S rank shows the highest level of capability, and the capability decreases in the order of A rank, B rank, . . . , G rank.

The game player information management unit 40 comprises a game player ID storage unit 41, a grade storage unit 42, a point/currency storage unit 43 and an owned card storage unit 44 (character storage unit), and manages the various types of information related to the game player.

The game player ID storage unit 41 stores, in a predetermined region of a memory 18, a game player ID for identifying the game player who is operating the game device 100. This game player ID is used for managing the various types of information related to the game player, and also used for the log-in authentication to a game server (not shown) in a communicative competition game to be played via the internet or the like.

The grade storage unit 42 stores the grade of the game player in a predetermined region of the memory 18. Here, "grade" is one type of capability evaluation level (virtual grade, reward, honor, rank and the like), which is previously arranged in the game system, that the game device 100 is to assign to the game player upon cumulatively evaluating the game player's game scores until now. This grade shows, in multiple levels, the level capability (strength) of the game player and, for example, grades in 20 levels from "0" as the weakest grade to "19" as the strongest grade are assigned to the game player. Moreover, when the world ranking, national ranking or local ranking are to be determined based on the capability evaluation level of the game player, ranking information is stored in the memory 18 together with the grade information. This grade information can be used in the strength determination processing of an exchangeable card described later.

The point/currency storage unit 43 stores, in a predetermined region of the memory 18, points and coins (game coins) owned by the game player. Here, points and coins are used for acquiring various items or player cards in a virtual game space, and can be acquired by the game player by playing the game. For example, the higher the difficulty of the game (the stronger the opponent of the match), the greater chance that the points and coins that can be acquired. Moreover, as a result of winning the game, more points and coins can be acquired in comparison to cases of drawing or losing the game. The acquired points and coins can be used to purchase various items and player cards in, for example, shops in a virtual game space. Moreover, the acquired points and coins and be used for purchasing the player cards being sold by other game players in a bazaar in a virtual game space.

The owned card storage unit 44 stores, in a predetermined region of the memory 18, the player cards (owned characters) owned by the game player. As described above, the character information storage unit 31 also stores the player character's image information and basic ability score that are associated with the character ID. Thus, the owned card storage unit 44 only stores the character ID as the information of the player cards owned by the game player. In addition, the game player information management unit 40 the player cards owned by the game player by reading, from the character information storage unit 31, the basic ability score and the like corresponding to the character ID stored in the owned card storage unit 44.

In this embodiment, when a game player is to execute a game mode of forming an original team and playing a match for the first time with the game device 100, a predetermined number of (for example, 30) player cards are given to that game player. Subsequently, the game player can add and own player cards by purchasing the player cards with the coins and the like that were acquired in the game as described above. Note that it is possible to limit the number of player cards that the game player can own. In this embodiment, the game player can own 30 to 140 player cards, and the owned card storage unit 44 stores up to 140 player cards in the storage area of the memory 18.

The player card exchange unit 50 includes a player card exchange processing function of exchanging a player card owned by the game player with another player card. This player card exchange unit 50 comprises an exchangeable card presentation unit 51 (exchangeable character presentation unit), an exchangeable card selection unit 52 (exchangeable character selection unit), an exchange condition presentation unit 53, an exchange-target card selection unit 54 (exchange-target character selection unit), an exchange execution unit 55 and a random number generation unit 56.

The exchangeable card presentation unit 51 has a function of determining the exchangeable cards that can be exchanged with a player card based on the player cards owned by the game player, and presenting the exchangeable cards on a screen. In other words, with the game device 100 of this embodiment, the CPU 1 determines the exchangeable cards, and the CPU 1 presents the exchangeable card to the game player. This exchangeable card presentation unit 51 analyzes the player cards owned by the game player and predicts the player card that the game player wishes to exchange, and selects the exchangeable cards which reflect the prediction.

For example, the exchangeable card presentation unit 51 predicts the ball club (affiliated team) of the player card that the game player wishes to exchange based on the player cards owned by the game player, and causes the player cards of the predicted ball club to be presented on the screen as the exchangeable cards with a higher probability than the player cards of other ball clubs. Moreover, the exchangeable card presentation unit 51 predicts the position of the player card that the game player wishes to exchange by identifying the insufficient position based on the player cards owned by the game player, and causes the player cards of the predicted position to be presented on the screen as the exchangeable cards more with a higher probability than the player cards of other positions.

A screen sample where the exchangeable card presentation unit 51 presents the exchangeable cards to the game player is shown in FIG. 6. The exchangeable cards 101 selected by the exchangeable card presentation unit 51 are displayed as a list of "Currently exchangeable cards". The configuration and operation of the foregoing exchangeable card presentation unit 51 are not explained in further detail with reference to the screen of FIG. 6.

The exchangeable card selection unit 52 causes the game player to select an arbitrary exchangeable character 101 among the options of the exchangeable characters 101 presented by the exchangeable card presentation unit 51. The exchangeable card selection unit 52 can be realized, for example, by the CPU 1 recognizing an operation input signal of the controller 19 and moving a cursor 104 within a frame encompassing the card shown in FIG. 6, and thereby enabling the game player to select the arbitrary exchangeable card 101 using the cursor 104. In order to finalize the exchangeable character 101 that was selected by the game player as the target of exchange processing, for instance, the game player operates the controller 19 and selects the enter button 113.

The exchange condition presentation unit 53 shown in FIG. 2 has a function of setting an exchange condition (character exchange condition) for exchanging the exchangeable card presented by the exchangeable card presentation unit 51 with the player card owned by the game player, and presenting the exchange condition on the screen. The number of player cards owned by the game player that is requested by the exchange condition presentation unit 53 as an exchange condition for an exchange with one exchangeable card may be one card or multiple cards. In this embodiment, explained is a mode where one to three player cards are requested as the exchange condition for an exchange with one exchangeable card.

A screen sample where the exchange condition presentation unit 53 presents the exchange condition to the game player is shown in FIG. 7. In this diagram, shown is a screen example requesting two player cards (exchange cards 1 and 2) for one exchangeable card. In the foregoing case, the game player is required to select, among the player cards in one's possession, a total of two player cards to be exchanged; namely, one player card which satisfies the exchange condition of the exchange card 1, and one player card which satisfies the exchange condition of the exchange card 2. The detailed configuration and operation of the exchange condition presentation unit 53 and details regarding FIG. 7 will be described later.

The exchange-target card selection unit 54 causes the game player to select, among the player cards owned by the game player, the player cards to be exchanged with the exchangeable card. The exchange-target card selection unit 54 can be realized, for example, by displaying a list of the player cards 141 owned by the game player on the screen as shown in FIG. 9, the CPU 1 recognizing an operation input signal of the controller 19 and moving the cursor 104, and thereby enabling the game player to select the arbitrary player card 141 using the cursor 104.

By way of reference, in this embodiment, the respective player cards owned by the game player can be registered in one group among first string team, second string team and third string team. An upper limit of player cards that can be set in each string is set and, for example, the number of players that can be registered in a first string team is limited to 28 player cards, the number of players that can be registered in a second string team is limited to 42 player cards, and the number of players that can be registered in a third string team is limited to 70 player cards. Normally, the game player will register the player cards of the player characters that he/she wishes to use in the match as the first string team, and register the cards of players who did not make the first string team in the second string team or the third string team.

Figure 8:
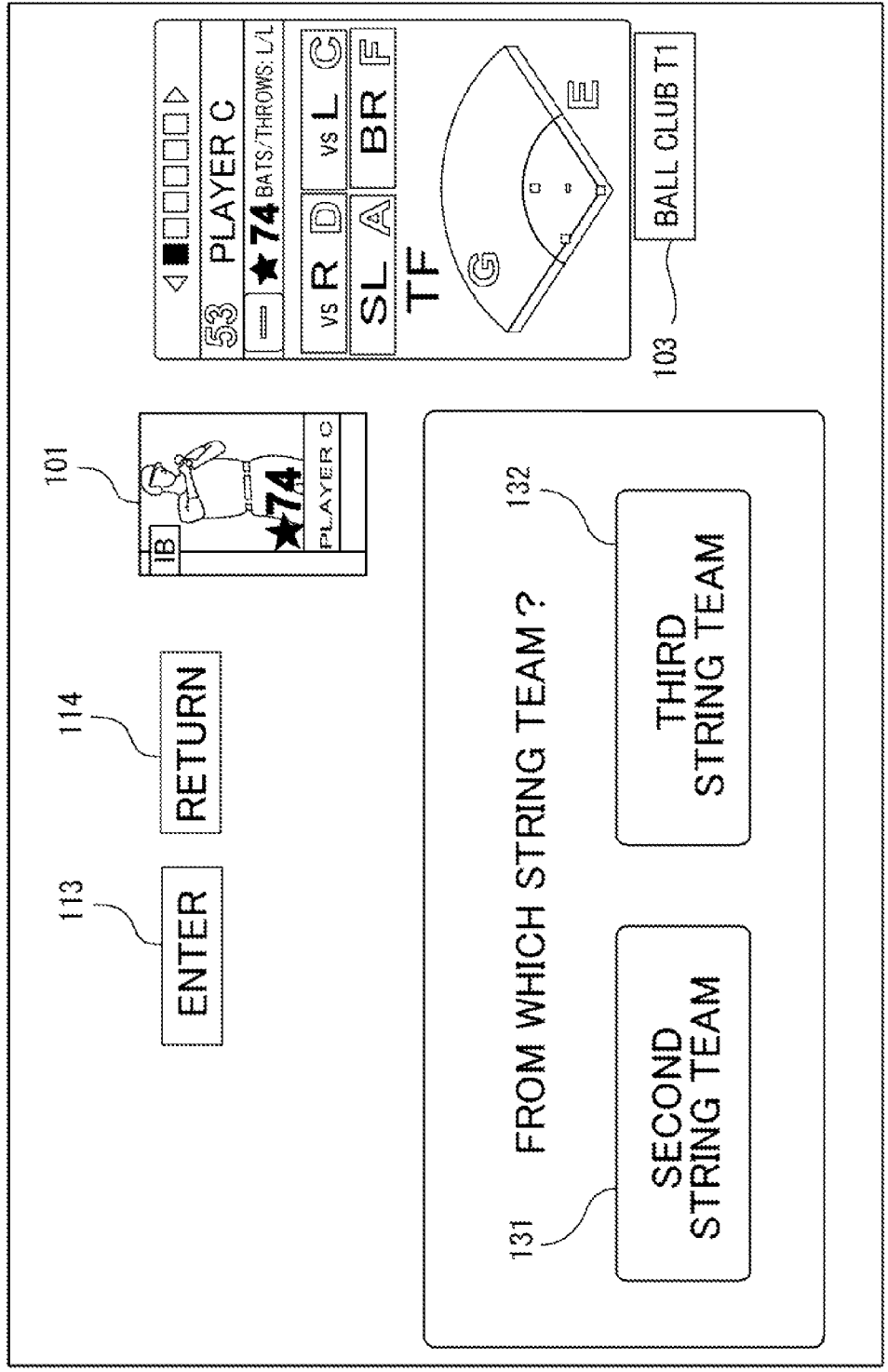
FIG. 8 is an explanatory diagram showing an example of the string selection screen.

Thus, in this embodiment, the exchange-target card selection unit 54 foremost displays the string selection screen in which a screen example thereof is shown in FIG. 8, and allows the game player to select the player cards to be exchanged from a group of either the second string team or the third string team. Accordingly, rather than display a list of all of the numerous player cards (up to 140 player cards) owned by the game player, the game player can more easily select the cards by foremost selecting the grouped string team and then displaying a list of the player cards of only that string team. Moreover, many of the player cards registered in the first string team are player cards that are favored by the game player among the player cards owned by the game player, and many of the cards of players to be exchanged exist in the second string team or the third string team. Thus, the string selection screen shown in the screen example of FIG. 8 is foremost displayed so that the game player can select the player cards to be exchanged from either the second string team or the third string team. For example, when a second string team button 131 is selected in this string selection screen, the processing proceeds to the list display screen of FIG. 9 described above, and a list of the player cards registered as the second string team player is displayed. However, since there may be cases where the player card to be exchanged exists in the first string team, the configuration may also be such that the game player can select from any one of the groups of first string team to third string team in the string selection screen of FIG. 8.

Moreover, as shown in FIG. 2, the exchange-target card selection unit 54 comprises an extraction unit 54*a* and an extraction display unit 54*b*. The extraction unit 54*a* has a function of extracting the player cards that satisfy the exchange condition presented by the exchangeable card presentation unit 51 among the player cards owned by the game player. Moreover, the extraction display unit 54*b* has a function of displaying the player cards extracted by the extraction unit 54*a* on the screen apart from the player cards that do not satisfy the exchange condition.

As an example of displaying the player cards that satisfy the exchange condition apart from the player cards that do not satisfy the exchange condition, considered may be changing the brightness of the player cards. For example, as shown in FIG. 9, while increasing the brightness of the player cards 141 that satisfy the exchange condition and displaying these cards brightly on the one hand, the brightness of the player cards 141 that do not satisfy the exchange condition is lowered. Consequently, the game player can clearly visually recognize which player card 141 satisfies the exchange condition. As another example, the player cards 141 that satisfy the exchange condition can also be clarified by changing the color of the player cards 141, or changing the size of the player cards 141 (for example, displaying the player cards that satisfy the exchange condition larger than the player card that do not satisfy the exchange condition) depending on whether they satisfy the exchange condition. In the screen example of FIG. 9, while the player cards 141 that satisfy the exchange condition are displayed in color on the one hand, the player cards 141 that do not satisfy the exchange condition are displayed in a different color; namely, in a gray color. Moreover, since the player cards 141 that do not satisfy the exchange condition cannot be used for the exchange to begin with, these player cards 141 are desirably displayed as a gray-out so that they cannot be selected.

As described above, as a result of the exchange-target card selection unit 54 displaying the player cards that satisfy the exchange condition apart from the player cards that do not satisfy the exchange condition, the game player can easily find the player cards that satisfy the exchange condition even in cases where the game player owns numerous player cards, and thereby accurately and smoothly performing the operation of selecting the player cards to be exchanged.

The exchange execution unit 55 shown in FIG. 2 has a function of approving the exchange of the player card and the exchangeable card when the player card that satisfies the exchange condition is selected by the exchange-target card selection unit 54, and updating the memory content of the owned card storage unit 44 to a content after the approval of the exchange.

The random number generation unit 56 generates a random number and outputs the random number value to the exchangeable card presentation unit 51 and the exchange condition presentation unit 53. For the generation of a random number, a standard pseudorandom number generation algorithm may be used. The exchangeable card presentation unit 51 uses the random number that was generated by the random number generation unit 56 in the processing of determining the ball club, position, strength and so on of the exchangeable card.

Moreover, the exchange condition presentation unit 53 uses the random number that was generated by the random number generation unit 56 in the processing of determining the number of cards required for the exchange. Details regarding the processing using the random numbers to be performed by the exchangeable card presentation unit 51 and the exchange condition presentation unit 53 will be described later.

The configuration of the exchangeable card presentation unit 51 is now explained in further detail with reference to the functional block diagram of FIG. 3. The exchangeable card presentation unit 51 comprises a ball club determination unit 61, a position determination unit 62, a strength determination unit 63, an exchangeable card selection unit 64, and an exchangeable card display unit 65.

In this embodiment, the respective player characters in the virtual game space belong to a ball club among a predetermined number of ball clubs (groups). For example, a plurality of ball clubs corresponding to the 12 ball clubs of Japan Professional Baseball (or 30 ball clubs in a game of Major League Baseball) which exist in the real world also exist in the virtual game space, and the respective player characters belong to one of these ball clubs. In this embodiment, the ensuing explanation is provided on the assumption that there are the 12 ball clubs of ball clubs T1 to T12 in the virtual game space.

The ball club determination unit 61 has a function of determining the affiliated ball club (group) of the exchangeable card (player character). The ball club determination unit 61 predicts the affiliated ball club of the player character that the game player wishes to exchange upon determining the ball club, and thereby enables that affiliated ball club to be selected with a higher probability than other ball clubs. In order to realize this, the ball club determination unit 61 comprises a ball club identification unit 66 (affiliated group identification unit) and a ball club determination unit 67 (group determination unit).

The ball club identification unit 66 identifies the ball club to which player characters of the most player cards are affiliated based on the player cards owned by the game player. The game player can collect the player cards of a specific ball club of one's preference based on the player card exchange function of this game device 100 or in the foregoing bazaar in the virtual game space. Thus, if the player cards owned by the game player are analyzed and the ball club to which the most player characters are affiliated is identified, it is possible to predict the ball club favored by the game player for which player characters are being collected; that is, the affiliated ball club of the player character that the game player wishes to acquire via exchange.

Moreover, in this embodiment, when a game player is to execute a game mode of forming an original team and playing a match for the first time with the game device 100, the game player can select one's own ball club (or reference ball club) among the foregoing ball clubs T1 to T12. In the foregoing case, since it is possible to predict that the ball club that was selected by the game player as one's own ball club is the ball club favored by the game player, the ball club identification unit 66 may also identify that ball club as the affiliated ball club of the player character that the game player wishes to exchange.

Note that the game player may also form a completely original team without selecting one's own ball club among the foregoing ball clubs T1 to T12. When the game player is to form an original team, regardless of whether the game player selects one's own ball club, as described above, the ball club desired by the game player can be accurately predicted by identifying the ball club to which the most player characters are affiliated based on the player card owned by the game player.

The ball club determination unit 67 has a function of determining the ball club based on probability by causing the ball club identified by the ball club identification unit 66 to be chosen with a higher probability than the other ball clubs. The ball club determination unit 67 determines the ball club, for example, based on the random number generated by the random number generation unit 56. In addition, the ball club determination unit 67 causes the probably that the ball club identified by the ball club identification unit 66 to be selected with a higher probability than the other ball clubs upon choosing the ball club based on a random number. For example, within the range (minimum value to maximum value) that the random number value can be obtained, the probability of the choosing of the random number is subject to weighting where the random number value that the ball club identified by the ball club identification unit 66 will be chosen is set to 20% (11/55), and the random number value that the other 11 ball clubs will be respectively chosen is set to be lower at approximately 7.27% (4/55).

The weighting of the choosing probability is not limited to the foregoing example, and an arbitrary choosing probability may be adopted so as long as the probability that ball club identified by the ball club identification unit 66 will be selected is higher than the probability that each of the ball clubs will be selected. However, if the probability that the ball club identified by the ball club identification unit 66 will be chosen is too high, there may be cases where the player card of the ball club that is predicted as being the player card that the game player wishes to acquire will be presented as the exchangeable card with a probability that is too high. In such a case, the game player will be able to easily acquire the player card of one's desired ball club based on the exchange processing of this game device 100. In order for the game player to feel the amusement or enjoyment in collecting one's favored player cards, it is desirable to consider the balance where the acquisition of such player cards is not too easy, but not too hard either. Thus, in consideration of the foregoing balance, in this embodiment, the probability that the ball club identified by the ball club identification unit 66 being chosen is increased by roughly 10%, and made to be 20% as described above, in comparison to a case of not subjecting the choosing probability to weighting (that is, a case where the choosing probability of the respective 12 ball clubs is uniform at approximately 8.33% (1/12)).

A variation in the ball club determination unit 61 determining the ball club of the exchangeable card is now explained. There may be cases where a plurality of ball clubs favored by the game player exist among the plurality of ball clubs T1 to T12 existing in the virtual game space. For example, when the ball clubs T1 to T12 are separated into two leagues as with Japan Professional Baseball and Major League Baseball in the real world, there may be cases where the game player has a preferred ball club in the respective leagues. Thus, the ball club identification unit 66 of the ball club determination unit 61 not only identifies the ball club with the most number of player cards among those owned by the game player, but also identifies the ball club with the second largest number of player cards. In addition, the ball club determination unit 67 sets the weighting of the choosing probability of the ball club, for example, so that the choosing probability of the two highest ball clubs to be higher than the choosing probability of the other clubs by setting the ball club with the most player characters to 20%, setting the ball club with the second most player characters to 10%, and setting each of the other ball clubs to 7%. In addition, it is also possible to identify the balls clubs up to the n-th ball club with the most player characters among the player cards owned by the game player, and set the choosing probability of this n-th highest ball club to be higher than the choosing probability of other ball clubs.

The position determination unit 62 has a function of determining the position of the exchangeable card (player character). The position determination unit 62 predicts the position of the player character that the game player wishes to exchange by identifying the insufficient position based on the player cards owned by the game player upon determining the position, and causes probability of the insufficient position being selected to be higher than each of the other positions. In order to realize the above, the position determination unit 62 comprises an average strength calculation unit 68 (average value calculation unit), an insufficient position identification unit 69 and a position determination unit 70.

The average strength calculation unit 68 calculates, for each position, the average value of the strengths (basic ability scores) indicated with the * number of the player cards owned by the game player. In the case of the baseball game of this embodiment, for example, the average value of the strengths for each of the five positions of (1) starting pitcher, (2) relief pitcher/closer, (3) infielder, (4) outfielder, and (5) catcher is calculated. Note that the sorting of positions for calculating the average value is not limited to the foregoing example and, for example, the average value of the strengths for each of the individual positions of starting pitcher, relief pitcher, closer, first baseman, second baseman, shortstop, third baseman, right fielder, center fielder, left fielder, and catcher may also be calculated. Moreover, when adopting a designated hitter as a player who specializes in offense only in the baseball game, the average value of the strengths for each position by including such designated hitter in one of the positions may also be calculated.

The insufficient position identification unit 69 identifies, as the insufficient position, the position with the lowest average value of the strengths calculated by the average strength calculation unit 68. Since the insufficient position identified as described above is lacking strength in comparison to the other positions, it can be predicted to be a position that the game player wishes to acquire via exchange.

A variation of the insufficient position identification unit 69 identifying the insufficient position is now explained. The insufficient position identification unit 69 may also identify, as the insufficient position, the position that is less than a reference number (position in which the number is lacking to begin with). The reference number in the foregoing case may be different for each position, for example, such as the reference number being "6" for a starting pitcher, "8" for a relief pitcher/closer, "6" for an infielder, "5" or an outfielder, and "3" for a catcher. In addition, when there are a plurality of positions that are less than the reference number, one position that lacks the reference number the most may be identified as the insufficient position, or all of such plurality of positions may be identified as the insufficient position.

Moreover, another variation of identifying the insufficient position is now explained. When the average strength calculation unit 68 calculates the average value of the strengths for each position, the average value of the strengths (* number) of the top n-number of player cards that have the largest * number among the respective positions (value of n may be differed by position). Subsequently, the insufficient position identification unit 69 identifies, as the insufficient position, the position with the lowest average value of the strengths of the top n-number of player cards. Position in which the top n-number of player cards are sufficient is most likely a position that the game player is satisfied with in terms of strength, and there is a good possibility that the player cards of a lower class are being treated as exchange candidates. Thus, the player cards that are lower than the top n-number of player cards of the respective positions are excluded from being identified as the insufficient position. Moreover, when there are numerous lower-class player cards in the position where the top n-number of player cards are sufficient, the average strength of the overall position will ultimately decrease considerably. Thus, the player cards that are lower than the top n-number of player cards of the respective positions are excluded from being identified as the insufficient position.

The position determination unit 70 has a function of causing the insufficient position identified by the insufficient position identification unit 69 to be chosen with a higher probability than each of the other positions, and determining the position based on the probability. The position determination unit 70 determines the position based on, for example, the random number generated by the random number generation unit 56. In addition, upon determining the position based on the random number, the position determination unit 70 increases the probability that the insufficient position will be selected to be higher than the probability that each of the other positions will be selected. For example, within the range that the random number value can be obtained, the probability of the choosing of the random number is subject to weighting where the random number value that the insufficient position will be chosen is set to 30% (12/40), and the random number value that the other four positions will be respectively chosen is set to be lower at approximately 17.5% (7/40).

The weighting of the choosing probability is not limited to the foregoing example. However, as with the case of determining the ball club, it is desirable to consider the foregoing balance so that the probability that the insufficient position will be chosen is not too high. Thus, in consideration of the foregoing balance, in this embodiment, the probability that the insufficient position will be chosen is increased by 10%, and made to be 30%, in comparison to a case of not subjecting the choosing probability to weighting (that is, a case where the choosing probability of each of the five positions is uniform at 20% (1/5)).

The strength determination unit 63 has a function of determining the * number as the strength of the exchangeable card presented by the CPU 1. The strength determination unit 63 comprises a strength determination probability table storage unit 71, a probability table selection unit 72 and a strength determination unit 73.

The strength determination probability table storage unit 71 stores in a predetermined storage area, the strength determination probability table for determining the * number as the strength of the exchangeable card. Moreover, the strength determination probability table storage unit 71 temporarily stores the strength determination probability table in the work area of the RAM 5, which is the main storage device, as needed during the game.

FIG. 13A to FIG. 13C show an example of the strength determination probability table. FIG. 13A shows an example where the probability for determining the strength of the exchangeable card changes according to the level of advancement of the tournament (level or difficulty of the tournament) that is carried out in the virtual game space. The tournament that is implemented in the virtual game space is now explained.

With the baseball of this embodiment, offered is a play mode where the game player can form an original team based on the player cards owned by that game player and, while the game player manages the original team as the manager (or while the game player operates the player characters of the original team), participate in various tournaments (for example, tournament-type matches). As the tournament of this play mode, there are, for example, the seven tournaments of grand prix 1 to grand prix 7 as shown in FIG. 13A, and the game player can initially participate in the grand prix 1 only. As a general rule, the edibility to participate in the tournament of the grand prix 2 can only be obtained upon winning the tournament of the grand prix 1. Similarly, the game player can only participate in the grand prix (n+1) upon winning the grand prix n, and the level (difficulty) of the tournament increases in order from the grand prix 1 to the grand prix 7. Note that the eligibility to participate in the respective tournaments in not limited to the foregoing example, and it will suffice so as long as the tournament level increases in order from the grand prix 1 to the grand prix 7.

In this embodiment, when the game player participates in one of the tournaments and that tournament is ended, the player card exchange unit 50 determines (updates) the lineup of the exchangeable cards presented on the screen of FIG. 6.

In the example of FIG. 13A, the probability table for determining the strength of the exchangeable card is differed according to which tournament level the game player participated in among the tournaments of grand prix 1 to grand prix 7 in the virtual game space as described above. For example, when the game player participated in the tournament of grand prix 1, the probability that the strength of the exchangeable card becoming *10 to 24 is 10%, the probability of becoming *25 to 54 is 45%, the probability of becoming *55 to 79 is 40%, and the probability of becoming *80 to 99 is 5%. Moreover, for example, when the game player participates in the tournament of grand prix 7, the probability of becoming *10 to 24 is 0%, the probability of becoming *25 to 54 is 5%, the probability of becoming *55 to 79 is 50%, and the probability of becoming *80 to 99 is 45%, and the probability that a large * number will be selected as the strength of the exchangeable card will increase. Accordingly, the strength determination probability table of FIG. 13A is set so that, higher the level of the tournament that the game player is participating in, the probability that a large * number will be selected as the strength of the exchangeable card will increase.

Meanwhile, when a game player can participate in a tournament of a certain level, it is assumed that the game player owns a certain amount of player cards of the strength which measures up to that tournament level.

Thus, even if an exchangeable card with a small * number is presented to the game player participating in a high level tournament, is unlikely that the card will be used as an exchange candidate. Thus, the strength determination probability table of FIG. 13A causes a stronger player card (player card with a larger * number) to be selected with a higher probability as the exchangeable card for a game player who is participating in a higher level tournament. Moreover, if a game player participating in a not-so-high level tournament can easily obtain a player card with a large * number based on the card exchange, that game player will be able to easily win one victory after another in the tournament, and this may impair the amusement of the game. Thus, an appropriate probability table according to the tournament level is assigned so that exchangeable cards of an appropriate * number according to the level of the tournament (level of advancement of the tournament) that the game player is participating in are selected with a higher probability.

Moreover, it is also possible to use the strength determination probability table of FIG. 13B in substitute for FIG. 13A. The strength determination probability table of FIG. 13B shows an example where the probability for determining the strength of the exchangeable card changes according to the grade level of the game player. In the example of FIG. 13B, a similar probability table of grand prix 1 to grand prix 7 of FIG. 13A is applied regarding the range of the respective grade levels of grades 0 to 3, grades 4 to 6, grades 7 to 9, grades 10 to 12, grades 13 to 15, grades 16 and 17, and grades 18 and 19. In other words, the strength determination probability table of FIG. 13B is set so that the probability that a large * number will be selected as the strength of the exchangeable card is increased as the grade level of the game player is higher.

Meanwhile, when a game player is of a certain grade level, it is assumed that the game player owns a certain amount of player cards of the strength which measures up to that grade level. Thus, even if an exchangeable card with a small * number is presented to the game player of a high grade level, is unlikely that the card will be used as an exchange candidate. Thus, the strength determination probability table of FIG. 13B causes a stronger player card (player card with a larger * number) to be selected with a higher probability as the exchangeable card for a game player of a higher grade level. Moreover, if a game player of a not-so-high level grade level can easily obtain a player card with a large * number based on the card exchange, that game player will be able to easily achieve a higher grade level, and this may impair the amusement of the game. Thus, an appropriate probability table according to the grade level is assigned so that exchangeable cards of an appropriate * number according to the grade level are selected with a higher probability.

Moreover, it is also possible to use the strength determination probability table of FIG. 13C in substitute for FIG. 13A and FIG. 13B. The strength determination probability table of FIG. 13C shows an example where the probability for determining the strength of the exchangeable card changes according to the average strength (average value of * number) of all player cards (or player cards of the first string team) owned by the game player. In the example of FIG. 13C, a similar probability table of grand prix 1 to grand prix 7 of FIG. 13A is applied regarding the respective ranges where the average value is *25 or less, *26 to 30, *31 to 35, *36 to 40, *41 to 45, *46 to 50, and *51 or more. In other words, the strength determination probability table of FIG. 13C is set so that the probability that a large * number will be selected as the strength of the exchangeable card is increased as the average strength of the player cards owned by the game player is higher.

Even if an exchangeable card with a small * number is presented to the game player in which the average value of the * number of the player cards owned by the game player is large, it is unlikely that the card will be used as an exchange candidate. Thus, a stronger player card (player card with a larger * number) is caused to be selected with a higher probability as the exchangeable card as the average strength of the player cards owned by that game player is higher. Moreover, if a game player of a not-so-high average strength of the player cards owned by that game player can easily obtain a player card with a large * number based on the card exchange, the team strength will suddenly increase too much. Thus, an appropriate probability table according to the grade level is assigned so that exchangeable cards of an appropriate * number according to the average strength of the player cards owned by that game player.

Figure 3:
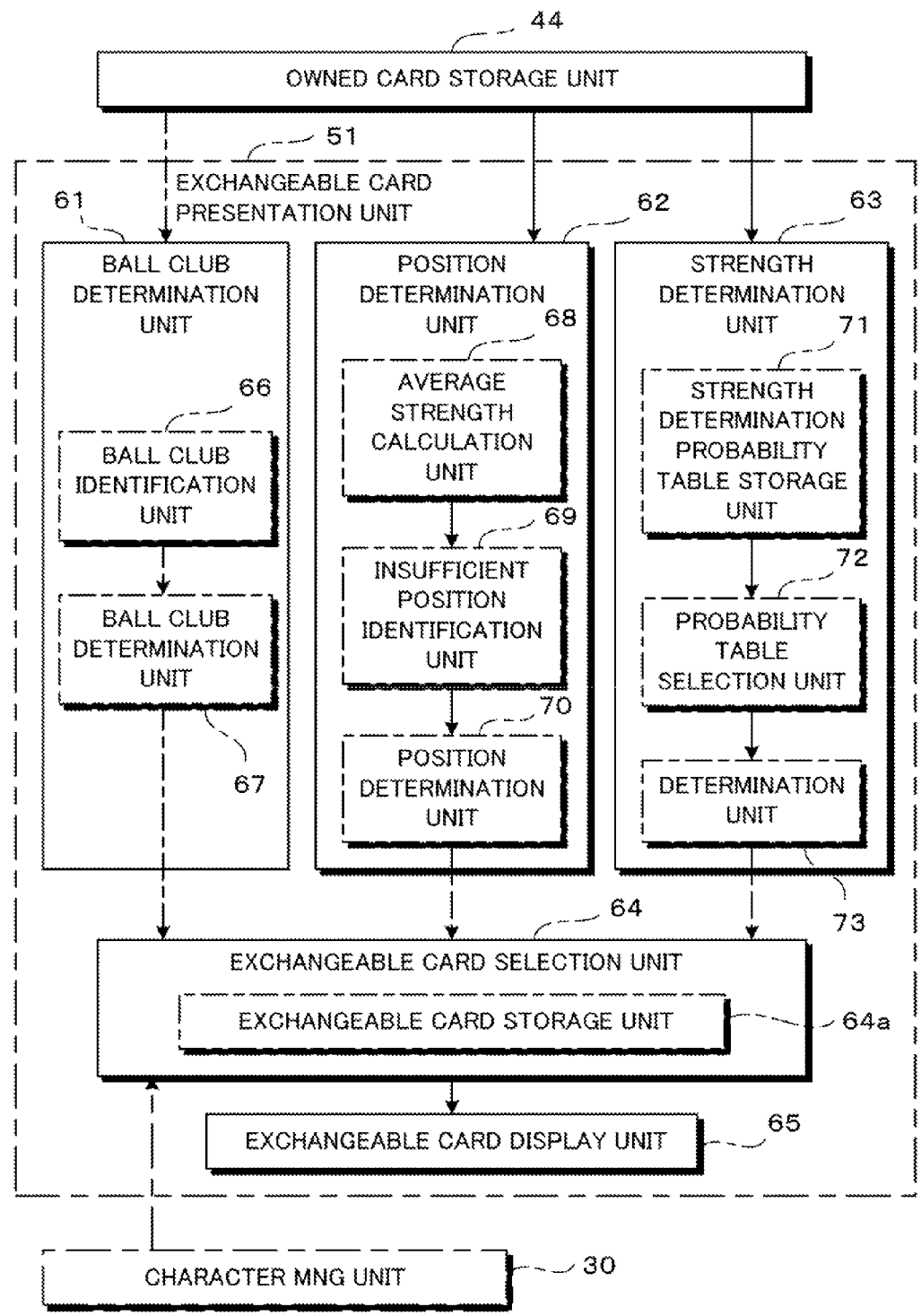
FIG. 3 is a functional block diagram showing a configuration example of an exchangeable card presentation unit.

The probability table selection unit 72 shown in FIG. 3 selects, from the strength determination probability table stored in the strength determination probability table storage unit 71, the probability table corresponding to the tournament that the game player participated in, the grade of the game player, or the average strength of the player cards owned by the game player. For example, in the case of applying the strength determination probability table of FIG. 13A, when the tournament that the game player is participating in is grand prix 1, the probability table in which *10 to 24 is 10%, *25 to 54 is 45%, *55 to 79 is 40%, and *80 to 99 is 5% is selected.

The strength determination unit 73 applies the probability table selected by the probability table selection unit 72, and determines the * number (* number range) as the strength of the exchangeable card based on the random number value generated by the random number generation unit 56.

The exchangeable card selection unit 64 selects, as the exchangeable cards among all player characters in the game that is managed by the character management unit 30, the player cards of the player characters that satisfy all of the following; namely, the ball club determined by the ball club determination unit 61, the position determined by the position determination unit 62, and the range of strength determined by the strength determination unit 63. The exchangeable card selection unit 64 comprises an exchangeable card storage unit 64a for storing the selected exchangeable cards in a predetermined storage area. Moreover, the exchangeable card display unit 65 displays the exchangeable cards selected by the exchangeable card selection unit 64 on a screen, for example, as shown in FIG. 6.

The configuration of the exchange condition presentation unit 53 is now explained in further detail with reference to the functional block diagram of FIG. 4. This exchange condition presentation unit 53 comprises a required number determination unit 81, a strength setting unit 82 (basic ability scoresetting unit), an exchange target selection unit 83, an exchange condition determination unit 84 and an exchange condition display unit 85.

The required number determination unit 81 has a function of determining the number of player cards (required number) that is required for the exchange with the exchangeable card. The required number determination unit 81 causes the probability of the required number increasing to be higher as the strength (basic ability score) of the exchangeable card is greater upon determining the required number. In order to realize the above, the required number determination unit 81 comprises a number of cards determination probability table storage unit 86 (required number determination probability table storage unit), a probability table selection unit 87, and a number of cards determination unit 88.

The number of cards determination probability table storage unit 86 stores, in a predetermined storage area, a number of cards determination probability table for determining the number of player cards that are required for the exchange. Moreover, the number of cards determination probability table storage unit 86 temporarily stores the number of cards determination probability table in the work area of the RAM 5 as the main storage device as needed during the game.

FIG. 14 shows an example of the number of cards determination probability table. In the example of FIG. 14, when the strength of the exchangeable card presented by the exchangeable card presentation unit 51 is *10 to 24, the probability that the required number of player cards will be one card is 100%. Moreover, when the strength of the exchangeable card is *25 to 54, the probability that the required number will be one card is 80%, and the probability that the required number will be two cards is 20%. When the strength of the exchangeable card is *55 to 79, the probability that the required number will be one card is 40%, and the probability that the required number will be two cards is 40%, and the probability that the required number will be three cards is 20%. When the strength of the exchangeable card is *80 to 99, the probability that the required number will be one card is 30%, the probability that the required number will be two cards is 30%, and the probability that the required number will be three cards is 40%. Accordingly, the number of cards determination probability table is set so that the probability that the required number of player cards required for the exchange increasing becomes higher as the strength of the exchangeable card is greater.

Figure 4:
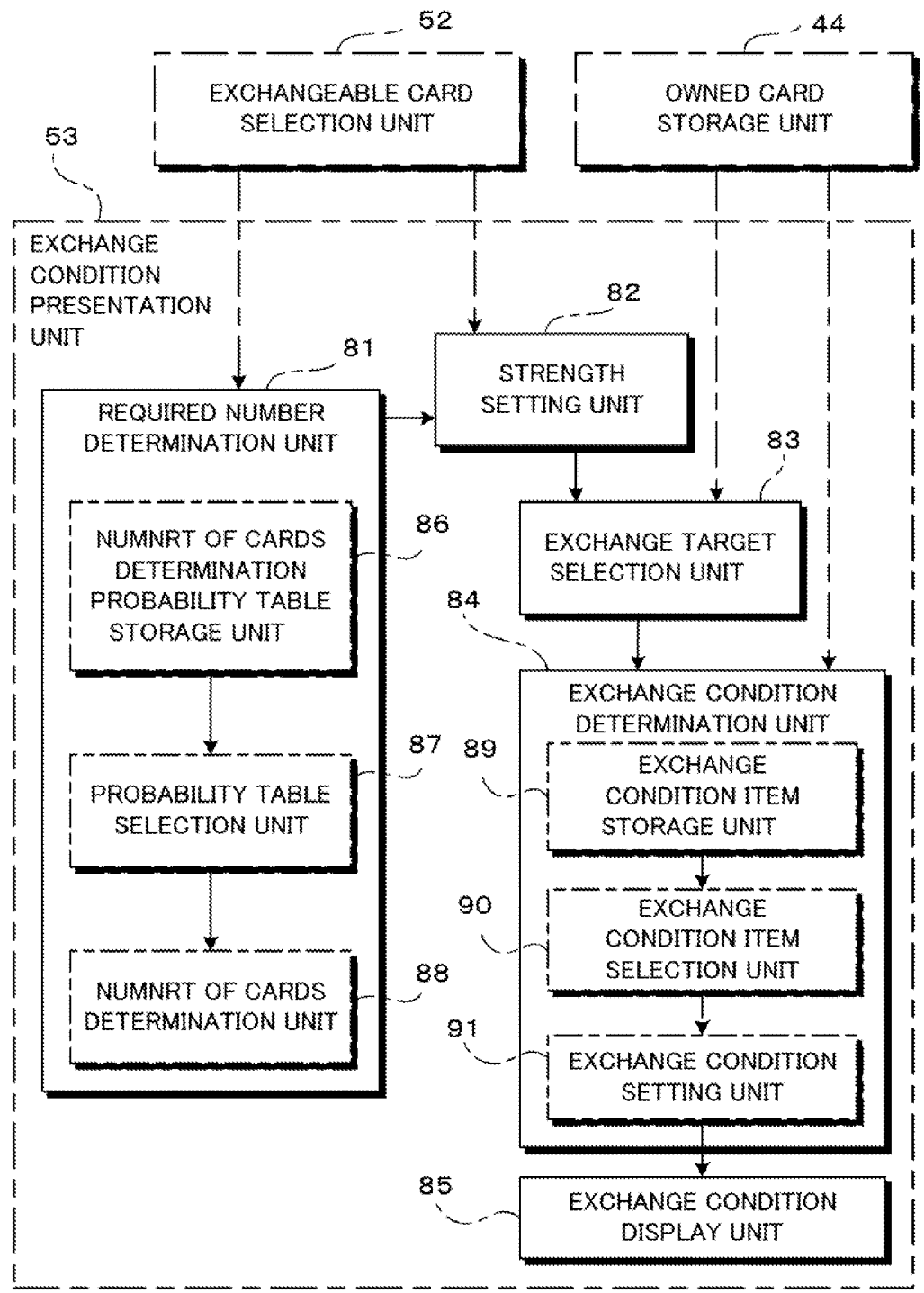
FIG. 4 is a functional block diagram showing a configuration example of an exchange condition presentation unit.

The probability table selection unit 87 shown in FIG. 4 selects the probability table corresponding to the strength of the exchangeable card that is presented by the exchangeable card presentation unit 51 from the number of cards determination probability table stored in the number of cards determination probability table storage unit 86. For example, when the strength of the exchangeable card is *74, in the number of cards determination probability table of FIG. 14, selected is the probability table in which the required number will be one card is 40%, the probability that the required number will be two cards is 40%, and the probability that the required number will be three cards is 20%.

The number of cards determination unit 88 applies the probability table selected by the probability table selection unit 87, and determines the number of player cards that are required for the exchange based on the random number value generated by the random number generation unit 56.

The strength setting unit 82 has a function of setting the strength (basic ability score) of each player card required for the exchange with the exchangeable card to be lower as the number of player cards that are required for the exchange determined by the number of cards determination unit 88 is greater. In other words, when n-number of player cards owned by the game player is required for the exchange with one exchangeable card presented by the CPU 1 (presented by the exchangeable card presentation unit 51), by suppressing the strength per player card as the number of n is greater, the balance between the number of cards required for the exchange and the strength is thereby maintained.

FIG. 15 illustrates the relationship between the number of player cards required for the exchange with one exchangeable card, and the strength of each player card (strength per player card). As shown in the example of FIG. 15, the strength setting unit 82 calculates the strength of each player card from the strength (* number) of the exchangeable card presented by the CPU 1 and the number of player cards required for the exchange. In other words, when the number of player cards required for the exchange with one exchangeable card is one card, the strength of the player card is calculated as * number±5 of the exchangeable card. As one example, considering a case where the strength of the exchangeable card is *74, the strength of the player card will be set within a range of * 69 to 79.

Moreover, when the number of player cards required for the exchange with one exchangeable card is two cards, the strength of the player card is calculated as (*number−10 of the exchangeable card)±5 of the exchangeable card. When the strength of the exchangeable card is * 74, the strength of the two player cards required for the exchange will respectively be set within a range of * 59 to 69. Moreover, when the number of player cards required for the exchange with one exchangeable card is three cards, the strength of the player card is calculated as (* number−15 of the exchangeable card) ±5 of the exchangeable card. When the strength of the exchangeable card is * 74, the strength of the three player cards required for the exchange will respectively be set within a range of * 54 to 64.

As described above, the required number determination unit 81 causes the required number to become greater more easily by increasing the probability that the number of player cards (required number) required for the exchange will increase as the strength of the exchangeable card is greater. In addition, the strength setting unit 82 sets the strength of each player card to be lower as the number of player cards required for the exchange is greater. In other words, when a strong card is selected as the exchangeable card presented by the CPU 1, the number of player cards required for the exchange is increased more easily in order to suppress the strength per player card. Accordingly, when a strong card with a large * number is presented as the exchangeable card by the CPU 1, the game player can conduct a one-to-many exchange using player cards with a smaller * number. Thus, the exchange can more easily be approved even in cases when the game player is not in possession of a player card with a large * number that matches the exchangeable card, or, even if the game player is in possession of a player card with a large * number, the game player does not wish to exchange and part with that card.

The exchange target selection unit 83 shown in FIG. 4 has a function of selecting the player card to be exchanged with the exchangeable card among the player cards owned by the game player stored in the owned card storage unit 44. In other words, at the stage prior to the CPU 1 ultimately determining the exchange condition for acquiring the exchangeable card via exchange, the CPU 1 (exchange target selection unit 83 as the function of the CPU 1) pre-selects the player cards that may be exchanged with the exchangeable card among the player cards owned by the game player. The exchange target selection unit 83 selects, among the player cards owned by the game player, the player cards that comply with "the strength of each player card required for the exchange" set by the strength setting unit 82. Here, when there are a plurality of player cards that comply with the strength set by the strength setting unit 82, the exchange target selection unit 83 randomly selects one card, for example, based on the random number generated by the random number generation unit 56.

The exchange condition determination unit 84 has a function of determining the exchange condition based on the player card selected by the exchange target selection unit 83. In other words, the exchange condition determination unit 84 determines the exchange conditions based on the player card so that the player card that was pre-selected by the exchange target selection unit 83 among the player cards owned by the game player satisfies the exchange condition. The exchange condition determination unit 84 comprises an exchange condition item storage unit 89, an exchange condition item selection unit 90 and an exchange condition setting unit 91.

In this embodiment, as with the example of FIG. 16, the three basic exchange conditions of * number trade, ball club trade and capability trade are provided. The * number trade is a condition where, as the exchange condition, a player card that matches the * number of the exchangeable card presented by the exchange target selection unit 83 is requested. Moreover, the ball club trade is a condition where, as the exchange condition, a player card of a specific ball club is requested. Moreover, the capability trade is a condition where, as the exchange condition, a player card with a specific position or specific capability is requested.

In addition, the exchange condition item storage unit 89 stores, for example, the information of the exchange condition item list shown in FIG. 17 in a predetermined storage area. Each exchange condition item is assigned identifying information (exchange condition item ID) for uniquely identifying the exchange condition items, and the CPU 1 can manage all exchange condition items through the exchange condition item ID. With the capability trade of the basic exchange condition, there are a plurality of exchange condition items. In relation to the capability trade, exchange condition item ID=3 is a common item of a fielder and a pitcher, but when the exchange condition item ID is 4 to 7, this is an exclusive items in a case where the player card subject to the exchange condition is a fielder. Moreover, when the exchange condition item ID is 8 to 14, this is an exclusive item in a case where the player card subject to the exchange condition is a pitcher. Note that this exchange condition item list is merely an example, and other exchange condition items may also be provided. For example, the catching or throwing capability in the case of a fielder and the curve level of a curve ball in the case of a pitcher may also be used as the exchange condition item.

The exchange condition item selection unit 90 selects one or more exchange condition items from the exchange condition item list stored in the exchange condition item storage unit 89. In this embodiment, one to three exchange condition items are selected by the exchange condition item selection unit 90. Note that the number of exchange condition items is not limited to one to three, and may be set to an arbitrary number. In addition, the exchange condition item selected by the exchange condition item selection unit 90 (when a plurality of exchange condition items are selected, the combination thereof) becomes the exchange condition that is presented on the screen.

The exchange condition setting unit 91 sets the exchange condition so that the player card selected by the exchange target selection unit 83 satisfies the exchange condition configured from the exchange condition item selected by the exchange condition item selection unit 90. For example, considered is a case where the player card selected by the exchange target selection unit 83 is player L (player L strength "65", affiliated ball club "T2", other parameters are omitted), and the two items of exchange condition item ID=1 (player with a * number of @ or higher) and ID=2 (player affiliated with @) shown in FIG. 17 are selected by the exchange condition item selection unit 90. In the foregoing case, since the exchange condition setting unit 91 needs to have the player card of the player L owned by the game player satisfy the exchange condition, for example, the exchange condition setting unit 91 sets an exchange condition of "player of *65 or higher" and "player affiliated with T2" (refer to the exchange condition of the exchange card 1 of FIG. 7).

Note that, in the foregoing example, since it will suffice for the player card of the player L to satisfy the exchange condition, for example, an exchange condition of "player of * 64 or higher" and "player affiliated with T2" may also be set. However, if a value that is immoderately lower than the parameter value (strength and the like) of the player L is set as the exchange condition, other player cards having a parameter value that is immoderately lower than the player L will also satisfy the exchange condition. Thus, a value that is the same as or close to the parameter value of the player card (card of the player L in this example) selected by the exchange target selection unit 83 is desirably set as the exchange condition.

As another example, considered is a case where the player card selected by the exchange target selection unit 83 is a player V (not shown) (player V strength "* 60", affiliated ball club "T3", velocity "149 km/h", ball power "B rank", stamina "G rank", dominant hand "right-handed pitcher", other parameters are omitted), and the three items of exchange condition item ID=2 (player affiliated with @), ID=8 (player with a velocity of @ km/h or more) and ID=14 (right-handed pitcher or left-handed pitcher) shown in FIG. 17 are selected by the exchange condition item selection unit 90. In the foregoing case, since the exchange condition setting unit 91 needs the player card of the player V to satisfy the exchange condition, for example, the exchange condition setting unit 91 sets an exchange condition of "player affiliated with T3", "player with a velocity of 149 km/h or more" and "right-handed pitcher" (refer to the exchange condition of the exchange card 2 of FIG. 7).

In the foregoing case also, if the exchange condition item selection unit 90 had selected ID=13 (player with stamina of * or more) instead of ID=8 (player with velocity of * km/h or more), in order for the player card of the player V to satisfy the exchange condition, an exchange condition that can be easily cleared such as "player with stamina of G rank or more" is set instead of "player with velocity of 149 km/h or more". In the foregoing case, many players other than the player V will satisfy the foregoing exchange condition. While there may be cases such an exchange condition that is advantageous to the game player is set, this may basically be permitted. However, it is undesirable for this kind of exchange condition that is advantageous to the game player to occur frequently. Thus, upon the exchange condition item selection unit 90 selecting the exchange condition item, when the capability trade is selected as the basic exchange condition, it is desirable to subject the selection probability to weighting so that a capability with a higher parameter is more easily selected as the exchange condition item among the various capabilities of the player card (card of the player V in this example) selected by the exchange target selection unit 83. In other words, in the foregoing example of the player V, the probability that an exchange condition item such as velocity (149 km/h) or ball power (B rank) will be selected over stamina (G rank) is set high.

The exchange condition display unit 85 displays the exchange condition set by the exchange condition setting unit 91 on the screen, for example, as shown in FIG. 7.

As described above, the exchange condition presentation unit 53 of this embodiment is configured to pre-select the player cards that may be exchanged among the player cards owned by the game player upon determining the exchange condition, and subsequently setting the exchange condition to match the selected player card. In the foregoing case, what is presented by the CPU 1 of the game device 100 to the game player is, as shown in FIG. 7, the exchange condition (exchange condition configured from one to three exchange condition items), and the player card that was pre-selected for setting the exchange condition is not requested to the game player as the direct exchange condition. When the exchange condition is determined as described above, a smooth player card exchange can be realized since there will be a player card among the player cards owned by the game player that can satisfy the exchange condition without fail.

Note that the game player is not required to select, as the player card to be exchanged, the player card that was pre-selected by the CPU 1 for setting the exchange condition. In other words, if the game player owns another player card which satisfies the exchange condition, the game player may use such other player card for the exchange.

A variation of the exchange condition presentation unit 53 is now explained with reference to the functional block diagram of FIG. 5. The exchange condition presentation unit 53 has a function of predicting the player card that the game player does not wish to exchange among the player cards owned by the game player, and makes it difficult for that player card to be included in the exchange condition. In order to realize this function, the exchange condition presentation unit 53 shown in FIG. 5 comprises a ball club condition determination unit 92 and a position condition determination unit 93 in addition to the respective units 81 to 85 shown in FIG. 4.

Since the ball club identified by the foregoing ball club identification unit 66 is predicted to be a ball club favored by the game player, to put it the other way around, it can also be predicted to be a ball club that the game player does not wish to exchange. Thus, the ball club condition determination unit 92 has a function of determining the ball club condition so that the ball club identified by the ball club identification unit 66 is chosen with a lower probability than each of the other ball clubs.

The ball club condition determination unit 92 determines the ball club based on, for example, the random number generated by the random number generation unit 56. In addition, upon setting the ball club based on the random number, the ball club condition determination unit 92 sets the probability that the ball club identified by the ball club identification unit 66 will be selected to be lower than the probability that each of the other ball clubs will be selected. For example, within the range (minimum value to maximum value) that the random number value can be obtained, the probability of the choosing of the random number is subject to weighting where the random number value that the ball club identified by the ball club identification unit 66 will be chosen is set to 4% (11/275), and the random number value that the other 11 ball clubs will be respectively chosen is set to be higher at approximately 8.73% (24/275).

The weighting of the choosing probability is not limited to the foregoing example, and an arbitrary choosing probability may be adopted so as long as the probability that the ball club identified by the ball club identification unit 66 will be selected is lower than the probability that each of the ball clubs will be selected.

Moreover, since the insufficient position identified by the foregoing insufficient position identification unit 69 is a position that lacks strength in comparison to the other positions, it is possible to predict that it is a position that the game player does not wish to exchange. Thus, the position condition determination unit 93 has a function of determining the position condition so that the insufficient position identified by the insufficient position identification unit 69 is chosen with a lower probability than each of the other positions.

The position condition determination unit 93 determines the ball club based on, for example, the random number generated by the random number generation unit 56. In addition, upon determining the ball club based on the random number, the position condition determination unit 93 sets the probability that the insufficient position will be selected to be lower than the probability that each of the other positions will be selected. For example, within the range that the random number value can be obtained, the probability of the choosing of the random number is subject to weighting where the random number value that the insufficient position will be chosen is set to 10% (4/40), and the random number value that the other four positions will be respectively chosen is set to be higher at 22.5% (9/40).

The weighting of the choosing probability is not limited to the foregoing example, and an arbitrary choosing probability may be adopted so as long as the probability that the insufficient position will be selected is lower than the probability that each of the ball clubs will be selected.

Figure 5:
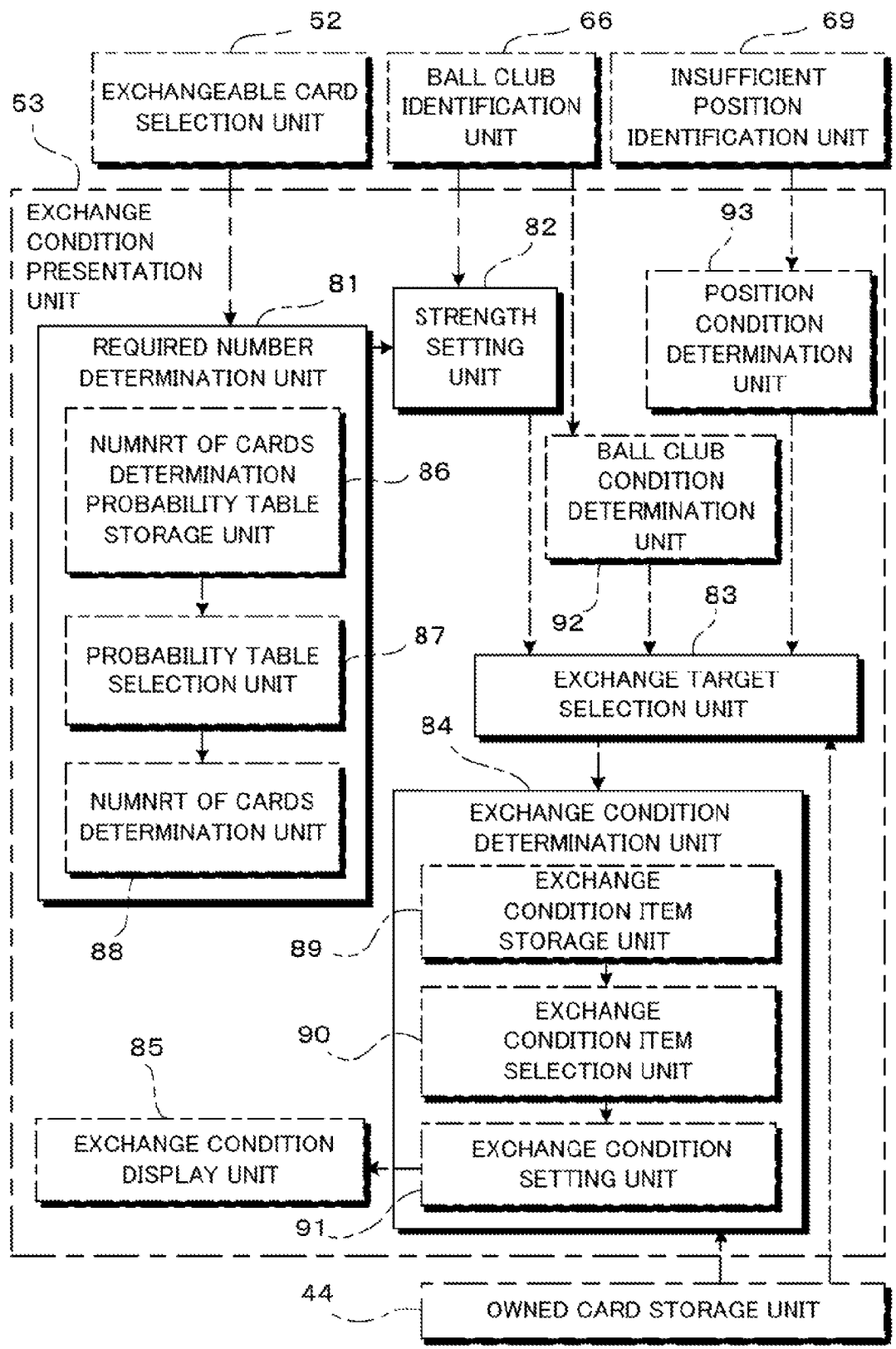
FIG. 5 is a functional block diagram showing another configuration example of the exchange condition presentation unit.

The exchange target selection unit 83 shown in FIG. 5 selects, among the player cards owned by the game player, the player that complies with the ball club determined by the ball club condition determination unit 92, the position determined by the position condition determination unit 93, and the "strength of each player card required for the exchange" that was set by the foregoing strength setting unit 82. Accordingly, the player card that is selected by the exchange target selection unit 83 will reflect the ball club and position which are predicted as items that the game player does not wish to exchange (ball club and position that are selected only at a lower probability than each of the other ball clubs and each position).

In addition, since the exchange condition determination unit 84 determines the exchange condition based on the player card selected by the exchange target selection unit 83, even in cases where an exchange condition related to the ball club is consequently presented as the exchange condition, the probability that the ball club identified by the ball club identification unit 66 (ball club predicted to be favored by the game player) will be proposed is lower than the probability that each of the other ball clubs will be proposed. Similarly, even in cases where an exchange condition related to the position is presented as the exchange condition, the probability that the insufficient position identified by the insufficient position identification unit 69 will be proposed is lower than the probability that each of the other positions will be proposed.

When a ball club or a position that the game player does not wish to exchange is presented as the exchange condition, normally, the game player cannot comply with that exchange condition. Thus, it is desirable to reduce the frequency that such an exchange condition is presented by the CPU 1. As described above, since the exchange condition presentation unit 53 shown in FIG. 5 predicts the ball club or position of the player card that the game player does not wish to exchange among the player cards owned by the game player upon determining the exchange condition and makes it difficult for that player card to be included in the exchange condition, it is possible to realize a smooth player card exchange.

As another variation of the exchange condition presentation unit 53, a configuration where, without using the ball club condition determination unit 92 and the position condition determination unit 93, the exchange target selection unit 83 selects the player card in consideration of the ball club and the position which are predicted as items that the game player does not wish to exchange is now explained. While the basic configuration of this exchange condition presentation unit 53 is the same as FIG. 4, the operation of the exchange target selection unit 83 differs as follows.

When the exchange target selection unit 83 is to select, among the player cards owned by the game player, a player card that complies with "the strength of each player card required for the exchange" set by the foregoing strength setting unit 82, rather than randomly selecting the player card that complies with that strength, the exchange target selection unit 83 causes the probability that the player card affiliated with the ball club identified by the ball club identification unit 66 to be lower than the probability that the player card affiliated with each of the other ball clubs.

For example, let it be assumed that there are a total of n-number of player cards (n is a positive integer of 2 or more) that comply with the strength set by the strength setting unit 82 among the player cards owned by the game player, and that there are m-number of player cards (m is a positive integer) affiliated with the ball club identified by the ball club identification unit 66 among the foregoing n-number of player cards. In the foregoing case, when one player card among the n-number of player cards is selected randomly, and the selection probability of each player card is PS (%), the result will be:

$$PS=(1/n)\times 100=100/n \quad (1),$$

and all player cards will have the same selection probability. Thus, when the selection probability of each player card affiliated with the ball club identified by the ball club identification unit 66 is PV (%), in order to reduce the PV (%) to be lower than the probability PS (%) of the random selection, for example, the following setting is adopted:

$$PV=(100/n)\times(1/a) \quad (2)$$

(Here, a is a coefficient). In the foregoing case, when the selection probability of each player card other than the ball club identified by the ball club identification unit 66 is PW (%), this can be calculated as:

$$PW=(100-PV\times m)/(n-m) \quad (3).$$

As a specific example, let it be assumed that there are n=10 player cards that comply with the strength set by the strength setting unit 82 among the player cards owned by the game player, and there are m=2 player cards affiliated with the ball club identified by the ball club identification unit 66 among the foregoing 10 player cards. In addition, when coefficient a=2, the random selection probability PS=10(%), the selection probability PV of each player card affiliated with the ball club identified by the ball club identification unit 66 (ball club predicted to be favored by the game player)=5(%), and the selection probability PW of each player card affiliated with the other ball clubs=11.25(%). This results in PV<PW, and it becomes more difficult for each player card affiliated with the ball club predicted as being favored by the game player to be selected by the exchange target selection unit 83 than each player card of the other ball clubs.

Similarly, let it be assumed that there are a total of n-number of player cards (n is a positive integer of 2 or more) that comply with the strength set by the strength setting unit 82 among the player cards owned by the game player, and that there are m-number of player cards (m is a positive integer) of the insufficient position identified by the insufficient position identification unit 69 among the foregoing n-number of player cards. In the foregoing case also, foregoing Formula (2) and foregoing Formula (3) can be adopted. In other words, the selection probability of each player card of the insufficient position can be calculated as PV (%) of foregoing Formula (2). Moreover, the selection probability of each player card of the other positions can be calculated as PW (%) of foregoing Formula (3).

Moreover, considered is a case where there are a total of n-number of player cards (n is a positive integer of 2 or more) that comply with the strength set by the strength setting unit 82 among the player cards owned by the game player, and that a player card affiliated with the ball club identified by the ball club identification unit 66 and a player card of the insufficient position identified by the insufficient position identification unit 69 coexist in the foregoing n-number of player cards. Here, let it be assumed that there are p-number (p is a positive integer) of the player cards X which are affiliated with the ball club identified by the ball club identification unit 66 and of an insufficient position, and the selection probability of each player card X is PX (%). Moreover, let it be assumed that there are q-number (q is a positive integer) of the player cards Y which are affiliated with the ball club identified by the ball club identification unit 66 but are not an insufficient position, and the selection probability of each player card Y is PY (%). Moreover, let it be assumed that there are r-number (r is a positive integer) of the player cards Z which are an insufficient position but are not affiliated with the ball club identified by the ball club identification unit 66, and the selection probability of each player card Z is PZ (%). Moreover, let it be assumed that there are (n−p−q−r)−number of the player cards E which are neither an insufficient position nor affiliated with the ball club identified by the ball club identification unit 66, and the selection probability of each player card E is PE (%). Here, each selection probability can be calculated as follows:

$$PX=(100/n)\times(1/a)\times(1/b) \quad (4)$$

$$PY=(100/n)\times(1/a) \quad (5)$$

$$PZ=(100/n)\times(1/b) \quad (6)$$

$$PE=(100-PX\times p-PY\times q-PZ\times r)/(n-p-q-r) \quad (7)$$

(Here, a and b in the respective formulae are coefficients).

As a specific example, when n=10 (cards), p=1 (card), q=1 (card), r=2 (cards), and coefficient a=b=2, this results in PX=2.5(%), PY=5(%), PZ=5(%), PE=13.75(%), and PX<PY=PZ<PE. In other words, the player card X affiliated with the ball club identified by the ball club identification unit 66 (ball club predicted to be favored by the game player) and which is also an insufficient position will not be selected with the highest probability, the player card Y or Z of the ball club identified by the ball club identification unit 66 or of an insufficient position will not be selected with the next highest probability, and the player card E which is neither the ball club identified by the ball club identification unit 66 nor an insufficient position is most likely to be selected.

Meanwhile, even with a player card of the ball club identified by the ball club identification unit 66 or the insufficient position identified by the insufficient position identification unit 69, there may be cases where the game player wishes to use that player card as an exchange candidate (exchange target) since the * number of that player card is low. Thus, for player cards of a predetermined * number or less, the exchange target selection unit 83 may also randomly select such player cards with the same probability as the other player cards even when they are not the ball club identified by the ball club identification unit 66 or the insufficient position identified by the insufficient position identification unit 69.

[Operation of Game Device]

In the foregoing configuration, an operation example of the game device 100 according to an embodiment of the present invention is now explained with reference to the flowcharts of FIG. 18 to FIG. 26.

When a start button of the baseball game in the game device 100 is pressed, the game program is loaded to the RAM 5 from the recording medium 300 or the memory 18 storing the game program. Here, various types of basic game data required for executing the baseball game are also loaded to the RAM 5 from the recording medium 300 or the memory 18. Consequently, the game program and the basic game data are recognized by the game device 100, and the game device 100 is operated by the control of the CPU 1 based on the game program.

As described above, when the game player is to execute a game mode of forming an original team and playing a match for the first time with the game device 100, a predetermined number of player cards are given to that game player. Here, the predetermined number of player cards to be given to the game player is determined as a result of being chosen among all player cards in the game by the CPU 1 of the game device 100. For example, the CPU 1 generates a random number, selects the player cards based on the acquired random number value, and gives those player cards to the game player.

In the selection of the player cards, weighting is performed so that the probability of a card with a higher basic ability score of the player character (strength of the player character indicated by the * number in this embodiment) being selected will be lower.

Moreover, even in cases where the game player purchases a player card in a shop within the virtual game space, the CPU 1 of the game device 100 selects the player card to be purchased by choosing that card among all player cards in the game. In this case also, the probability of a card with a higher basic ability score of the player character being selected will be lower.

Thus, there may be cases where a player card favored by the game player does not exist in the player cards initially given by the CPU 1 or purchased by the game player. Thus, the game player may use the player card exchange function of this game device 100 and attempt to exchange a player card that is currently in one's possession with the exchangeable card presented by the CPU 1.

When the game player attempts to exchange a player card, the game player will select, for example, the menu of "trade center" displayed on an initial screen (home screen or menu screen) (not shown) of the game device 100. It is thereby possible to enter the virtual trade center (virtual space where the game player can exchange player cards with the CPU 1) managed by the game device 100. The game player can basically enter the virtual trade center from the initial screen at any time. An example of the player card exchange processing after entering the trade center is explained with reference to the flowchart of FIG. 18 and the screen samples of FIG. 6 to FIG. 12.

Upon entering the virtual trade center from the initial screen, the exchangeable card presentation processing is executed by the exchangeable card presentation unit 51 (S1). With this exchangeable card presentation processing, the player cards that the game player wishes to exchange are predicted based on the player cards owned by the game player, and presents the exchangeable card reflecting such prediction on the screen. The exchangeable card presentation processing will be explained in further detail later. An example of the exchangeable card presentation screen displayed based on this processing is shown in FIG. 6.

In the screen example of FIG. 6, there are six exchangeable cards 101 lined up as the "Currently exchangeable cards", and three cards among such six exchangeable cards are displayed as a list. Moreover, by operating the controller 19 (refer to FIG. 1) and selecting the navigation button 110 or pressing a predetermined button of the controller 19, the remaining three exchangeable cards 101, which are not currently displayed, can also be confirmed.

Moreover, when the controller 19 is operated and the cursor 104 is placed over one of the exchangeable cards 101 lined up, the player character information of that exchangeable card 101 is displayed in a capability display region 102 and a ball club display region 103. The capability display region 102 displays the following matters related to the player card 101 selected by the cursor 104; namely, player name, uniform number, strength (* number), dominant arm (right handed or left handed), batting position (right handed or left handed), rank of batting skill against right-handed pitchers (ball contact capability against right-handed pitchers), rank of batting skill against left-handed pitchers (ball contact capability against left-handed pitchers), rank of batting power, rank of base running skill, rank of overall defense skill, and so on. In the example of FIG. 6, since the player card 101 of the player C is selected by the cursor 104, the capability display region 102 displays the following information of the player C;

namely, player name "player C", uniform number "53", *74, throws left-handed, bats left-handed, D rank batting skill against right-handed pitchers, C rank batting skill against left-handed pictures, batting power A rank, base running skill F rank, first position E rank and left position G rank as the overall defense skill.

Moreover, by operating the controller 19 and selecting the navigation button 111 or 112, other capability parameters that are not currently displayed on the page can be displayed in the capability display region 102. In this embodiment, the various capabilities of the respective player characters are divided into a plurality of blocks (for example, six blocks), and the capabilities of each block can all be confirmed by switching the page with the navigation button 111 or 112. The screen example of FIG. 6 is displaying the first page of the capability block (representative capabilities of the player character). In addition, in this embodiment, the respective items of the capability blocks that can be confirmed on the first page are also used as the exchange condition items.

Moreover, the ball club display region 103 displays the ball club name to which the player character of the player card 101 selected with the cursor 104 is affiliated. In the example of FIG. 6, since the player card 101 of the player C is selected with the cursor 104, the ball club display region 103 displays the ball club name "ball club T1" to which the player C is affiliated. Accordingly, since the detailed player character information of the selected exchangeable card 101 can be confirmed on the screen when the exchangeable card 101 lined up I is selected by means of the cursor 104, the game player can easily determine whether there is a card that the game player wishes to exchange.

In the exchangeable card presentation screen of FIG. 6, the game player operates the controller 19 and moves the cursor 104, and selects the card to be exchanged among the presented options of the exchangeable character 101. In order to finalize this selection processing, the game player may operate the controller 19 and select the enter button 113, or press a predetermined button of the controller 19. Moreover, the screen of FIG. 6 also displays a return button 114 and a help button 115. When the return button 114 is selected, the game player can return to the initial screen of the game device 100. Moreover, when the help button 115 is selected, the game player can confirm the operation explanation on that screen.

When the game player selects a card among the exchangeable cards 101 presented by the CPU 1 in the manner described above (S2; YES), the exchange condition presentation unit 53 executes the exchange condition presentation processing of presenting, on the screen, the exchange condition for exchanging the exchangeable card 101 selected by the game player with the player card owned by the game player (S3). The exchange condition presentation processing will be described in detail later. An example of the exchange condition presentation screen displayed based on this processing is shown in FIG. 7.

In the screen example of FIG. 7, the exchangeable card 101 (card of the player C) selected by the game player is displayed at the upper part of the screen, and two exchange conditions for the exchange with the card of the player C is displayed in the lower exchange condition display region 120. In other words, (1) the first exchange condition of "player with * 65 or higher" and "player affiliated with T2" and (2) the second exchange condition of "player affiliated with T3" and "velocity of 149 km/h or more" and "right-handed pitcher" are displayed on the screen by the exchange condition presentation unit 53. In the foregoing case, in order to acquire the exchangeable card 101 of the player C via exchange, the game player is required to select a total of two cards; namely, one player card that satisfies the first exchange condition, and one player card that satisfies the second exchange condition, to be exchanged among the player cards in one's possession.

An exchange card setting region 121 is provided in the exchange condition display region 120 of the exchange condition presentation screen of FIG. 7, and the game player selects the cards that satisfy the exchange condition among the player cards in one's possession and sets those cards in the exchange card setting region 121. When the game player selects the exchange condition (in this example, selects either the first or second exchange condition) and presses the enter button 113 (S4; YES) in order to set the player cards in the exchange card setting region 121, the processing proceeds to the string selection screen illustrated in FIG. 8 (S5). Note that when the return button 114 is selected on the screen of FIG. 7, the game player can return to the exchangeable card presentation screen of FIG. 6. Moreover, while the "exchange" button 122 is also displayed on the screen of FIG. 7, this is a button to be used after setting the player cards, and will be explained later.

A second string team button 131 and a third string team button 132 for selecting the player card to be exchanged from either the second string team or the third string team is displayed on the string selection screen of FIG. 8, and the game player can select the string team by selecting one of either the second string or the third string and pressing the enter button 113. This screen displays the capability display region 102 and the ball club display region 103 showing the exchangeable card 101 (card of the player C in this example) selected by the game player and the capabilities and affiliated ball club of that player character, and this screen also enables the game player to confirm the information of the exchangeable card 101. Moreover, if the return button 114 is selected in the screen of FIG. 8, the game player can return to the exchange condition presentation screen of FIG. 7.

In the string selection screen of FIG. 8, when the game player selects the string team (S6; YES), the extraction unit 54a extracts the player cards that satisfy the exchange condition among the player cards owned by the game player and which are the player cards affiliated with the selected string team (S7). Subsequently, a list of the player cards affiliated with the selected string team is displayed in a manner where the player cards that satisfy the exchange condition and the player cards that do not satisfy the exchange condition can be distinguished (S8).

FIG. 9 shows an example of the player card list display screen in a case where the second string team was selected. In this screen example, up to 12 player cards 141 owned by the game player can be simultaneously displayed in the player card display region 140. Moreover, when the up-down scroll button 142 is operated by the controller 19, the player cards 141 that are not currently displayed can also be displayed in the player card display region 140. In addition, in this screen example, while the player cards 141 that satisfy the exchange condition are displayed bright by increasing the brightness, the player cards 141 that do not satisfy the exchange condition are grayed out and cannot be selected.

In the player card list display screen of FIG. 9, the game player operates the controller 19 and moves the cursor 104, and selects the card to be exchanged among the player cards 141 that are displayed bright (that is, the player cards that satisfy the exchange condition). In order to finalize this selection processing, the game player operates the controller 19 and selects the enter button 113. Note that when the return button 114 is selected in the screen of FIG. 9, the game player can return to the string selection screen of FIG. 8.

When the game player selects the player card 141 that satisfies the exchange condition in the player card list display screen of FIG. 9 (S9; YES), as shown in the exchange condition presentation screen of FIG. 10, that player card 141 is set (displayed) in the exchange card setting region 121 provided within the exchange condition display region 120.

Figure 10:
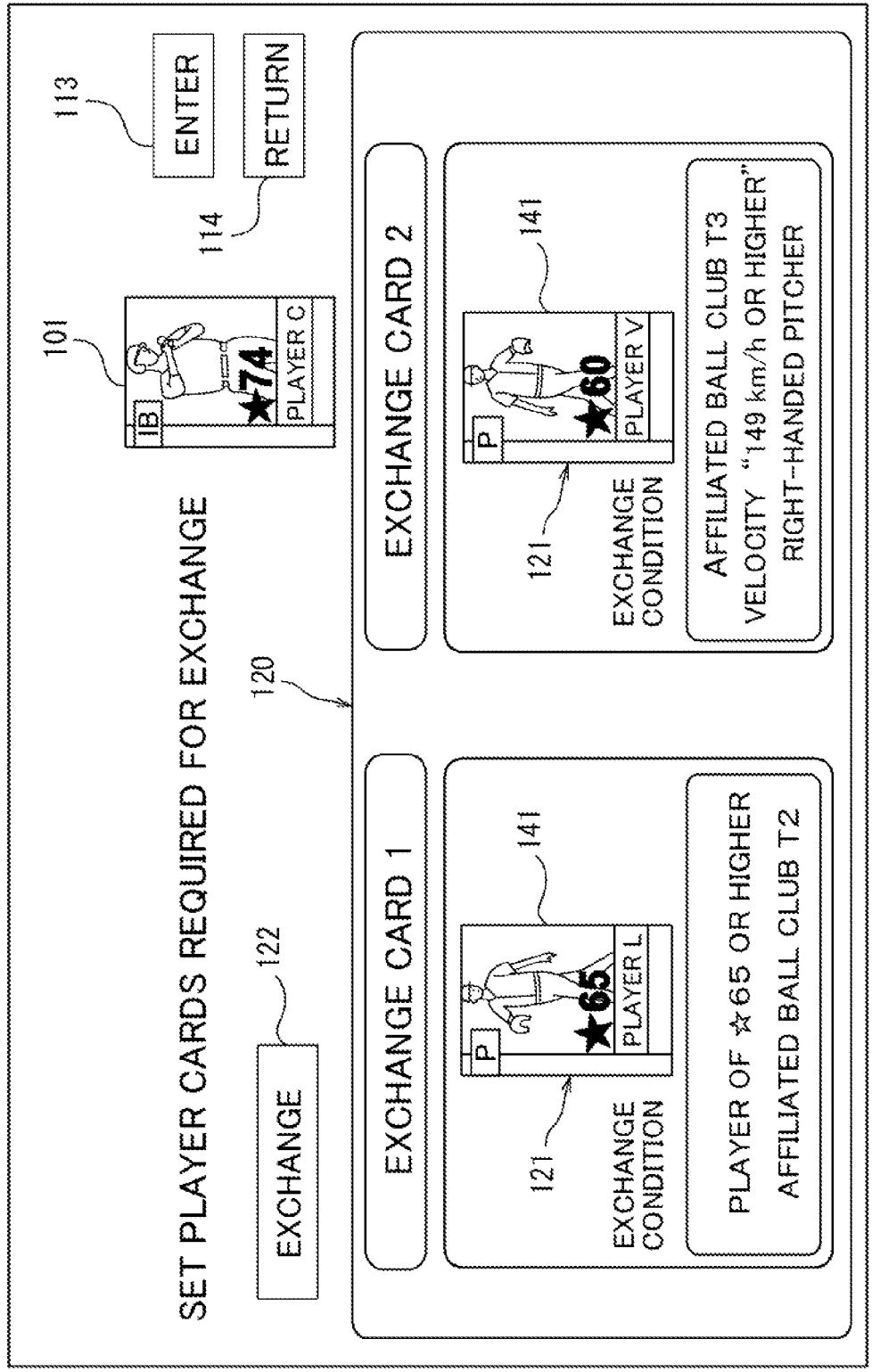
FIG. 10 is an explanatory diagram showing an example of the exchange condition presentation screen.

Since two exchange conditions are presented in the exchange condition presentation screen shown in FIG. 7 or FIG. 10, unless both of these exchange conditions are achieved (S10; NO), the processing returns to S4, and the loop processing of repeating S4 to S10 is performed until all exchange conditions are achieved.

When all exchange conditions are achieved (S10; YES); that is, in the example of FIG. 10, when the two player cards that satisfy the exchange condition are set in the exchange card setting region 121 and the game player operates the controller 19 and selects the exchange button 122, the exchange execution unit 55 approves the exchange of the exchangeable card 101 (card of the player C in the example of FIG. 10) and the player card 141 (two cards of the player L and the player V in the example of FIG. 10) (S12). Here, the exchange execution unit 55 updates the memory content of the owned card storage unit 44 to a content after the approval of the exchange (S12).

Figure 11:
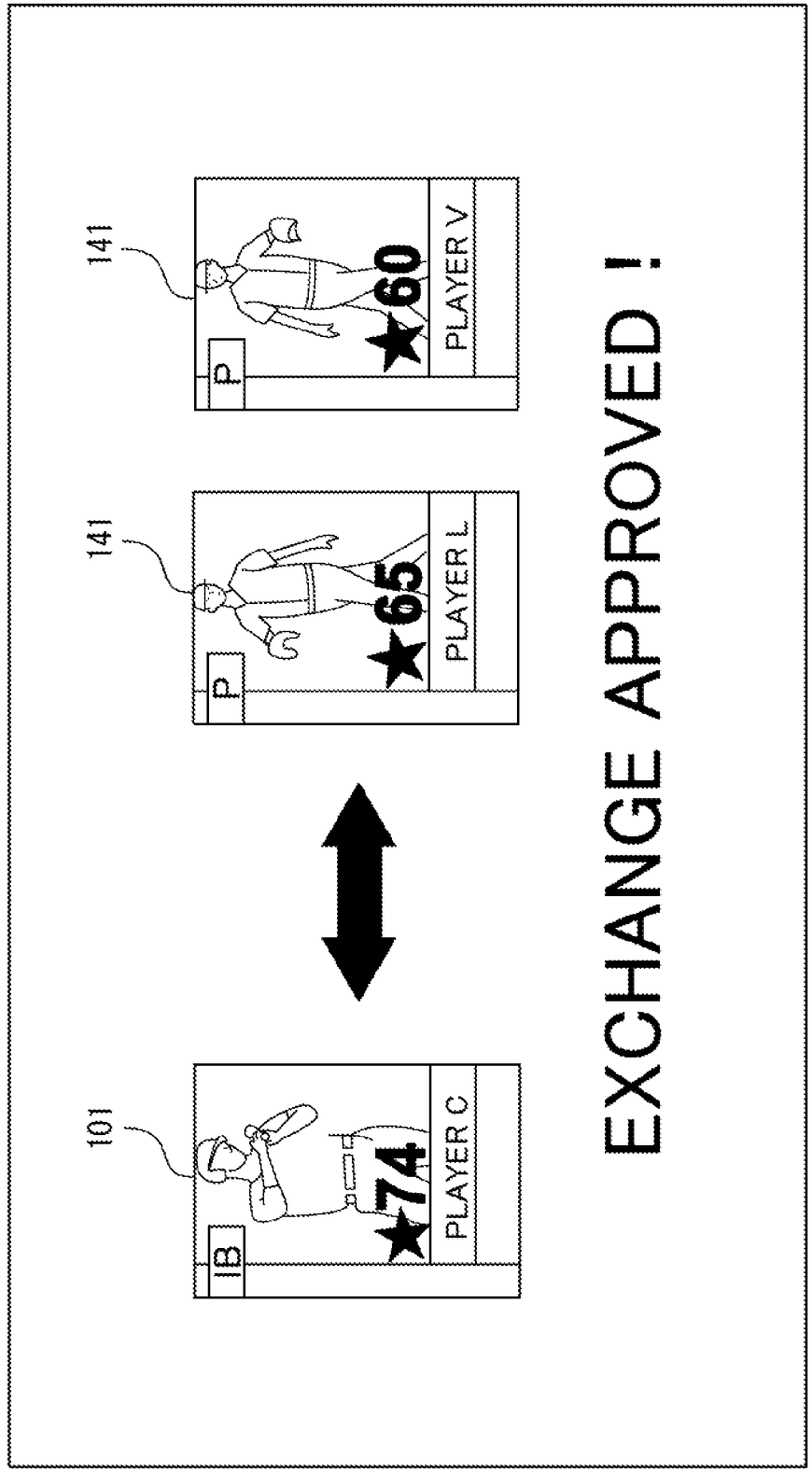
FIG. 11 is an explanatory diagram showing an example of the presentation display screen when the exchange is approved.

Moreover, when the exchange execution unit 55 approves the foregoing exchange, for example, as shown in FIG. 11, the exchange execution unit 55 displays an announcement to the game player of the fact that the exchange of one exchangeable card 101 (card of the player C presented by the CPU 1) and two player cards 141 (two cards of the player L and the player V owned by the game player) has been approved.

After the card exchange has been approved as described above, for example, as shown in FIG. 12, a label 150 such as "Exchanged" (or "Exchanged" in Japanese) is overlapped on the exchanged card and displayed on the exchangeable card presentation screen. In addition, a card affixed with the label 150 can no longer be exchanged.

Figure 12:
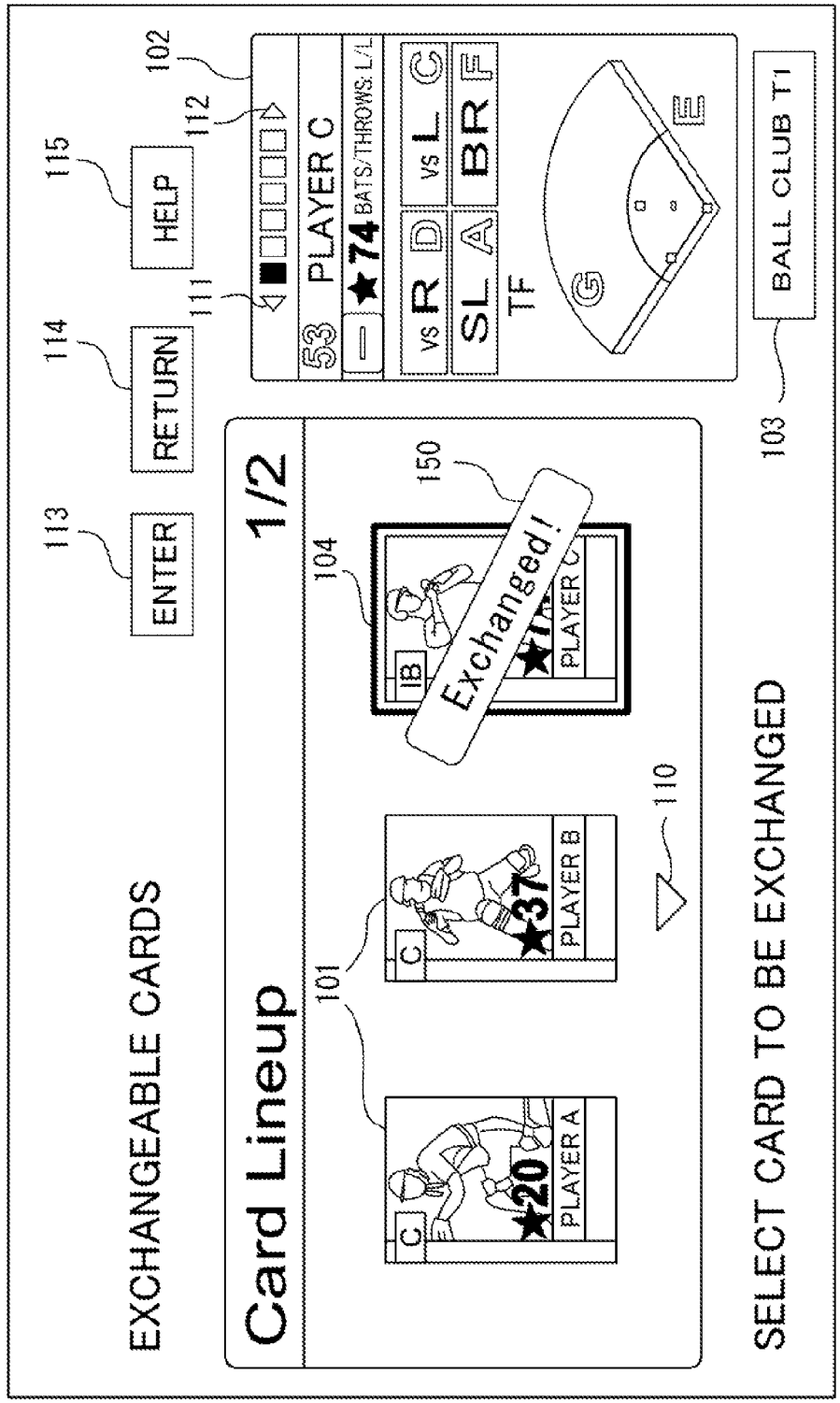
FIG. 12 is an explanatory diagram showing an example of the exchangeable card presentation screen including the exchanged card.

The cycle of determining and updating the exchangeable cards 101 that are lined up in the exchangeable card presentation screen shown in FIG. 6 or FIG. 12 is now explained. In this embodiment, as described above, in a case where the game player forms an original team using the player cards owned by that game player and participates in a tournament, after that tournament is ended (for example, when the game player enters the virtual trade center for the first time after the tournament is ended, or immediately after the tournament is ended), the player card exchange unit 50 determines (updates) the lineup of the exchangeable cards. For example, each time one tournament is ended, when three exchangeable cards are collectively determined and transferred to the exchangeable card presentation screen, these three exchangeable cards are lined up. An upper limit may be set to the maximum number of exchangeable cards that may be lined up, and in this embodiment up to nine exchangeable cards can be lined up. Since three exchangeable cards are lined up after the end of one tournament, a total of nine exchangeable cards, which is the upper limit, will be lined up after the end of three tournaments. The three new exchangeable cards that are lined up after the subsequent tournament are lined up in substitute for the three oldest cards, and thus up to nine up-to-date cards will constantly be lined up.

As described above, the label 150 of "Exchanged" is affixed to an exchanged card, and that exchanged card can no longer be exchanged. Since the game player can enter the virtual trade center from the initial screen at any time, the card exchange itself can be performed at any time. However, if all of the exchangeable cards lined up have been exchanged by the game player, the game player cannot exchange cards until new exchangeable cards are lined up. Thus, a game player who wishes to actively exchange cards will actively participate in tournament so that new exchangeable cards will be lined up. In other words, the card exchangeable function of this game device 100 also motivates a game player to actively participate in tournaments.

Note that the timing (cycle) of determining and updating the exchangeable cards that are lined up is not limited to the foregoing example, and, for example, the exchangeable cards to be lined up may be determined and updated when the game player plays a predetermined number of matches in the game (for instance, 3 to 5 matches). Moreover, the number of exchangeable cards to be determined and updated collectively is not limited to three cards, and may also be one card or two cards or four cards or more.

Figure 18:
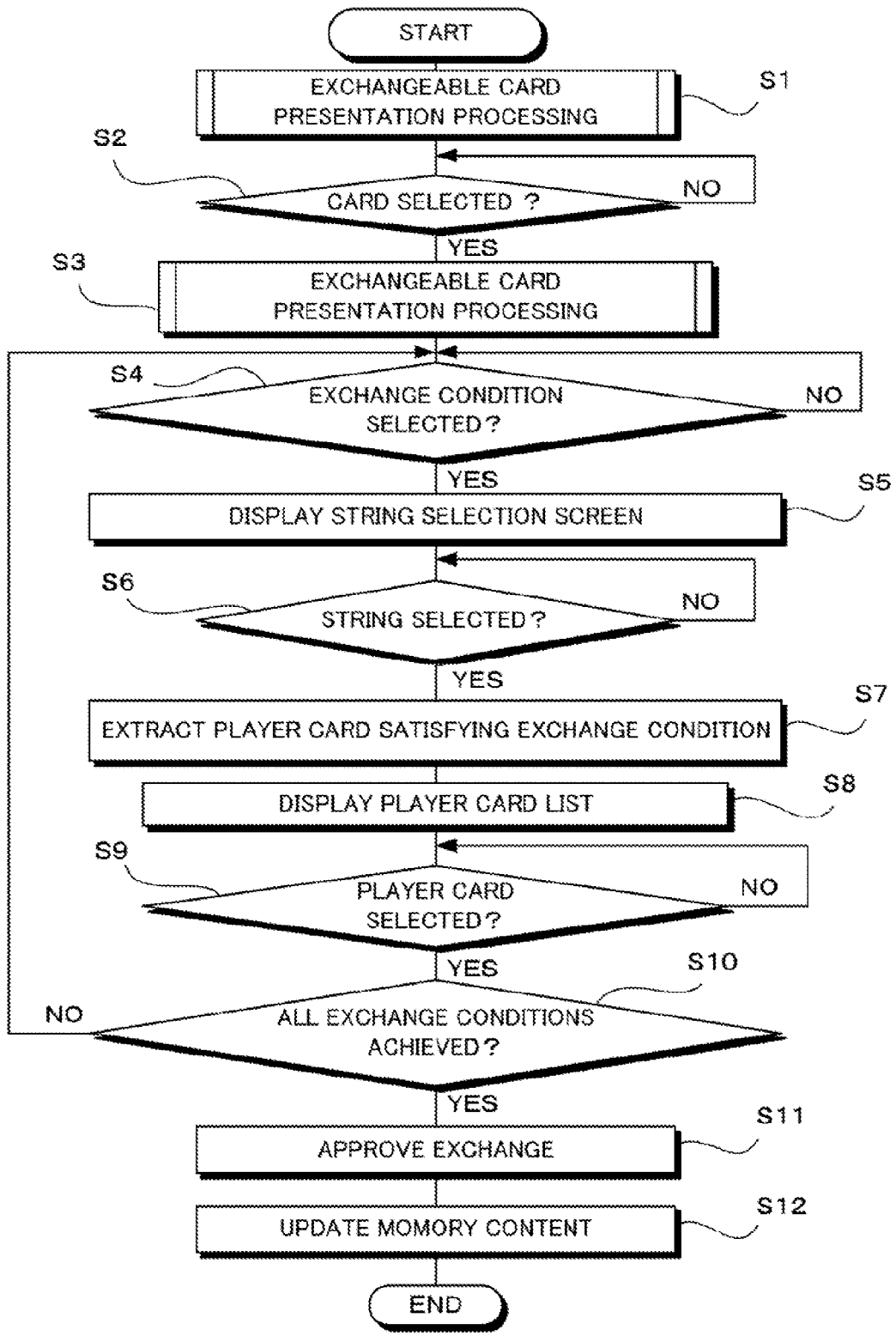
FIG. 18 is a flowchart showing an example of the operation of the game device.

The sub routine of the exchangeable card presentation processing (S1) in the flowchart of FIG. 18 is now explained with reference to the flowchart of FIG. 19. Upon selecting the exchangeable card presented by the CPU 1, foremost, the ball club determination unit 61 of the exchangeable card presentation unit 51 determines the affiliated ball club of the exchangeable card (S21). Here, the ball club determination unit 61 predicts the ball club favored by the game player, and causes that ball club to be selected with a higher probability than the other ball clubs.

Moreover, the position determination unit 62 determines the position of the exchangeable card (S22). Here, the position determination unit 62 identifies the insufficient position based on the player cards owned by the game player, and causes the insufficient position to be selected with a higher probability than the other respective positions. The strength determination unit 63 determines the strength (*number) of the exchangeable card (S23). Details of the respective sub routines of S21 to S23 will be described later. Note that the order of executing the respective processes of S21 to S23 is not limited to the foregoing example, and any processing may be executed first.

Subsequently, 0 is substituted in the variable i that is used for performing the loop control of subsequent steps S25 to S28, and initialization is performed (S24). Subsequently, the exchangeable card selection unit 64 randomly selects, as the exchangeable cards among all player characters in the game that is managed by the character management unit 30, the player cards of the player characters that satisfy all conditions of ball club, position and strength determined in S21 to S23 (S25).

Subsequently, the CPU 1 determines whether the player card selected in S25 is already in the game player's possession (S26). When the selected player card is already owned by the game player (S26; YES), the variable i is incremented (add 1 to i) (S27), and whether i has reached 5 is determined (S28). If the number of times that the player card was selected in S25 is less than five times (S28; NO), the processing proceeds to S25 once again, and the loop processing of repeating S25 to S28 is performed.

When it is determined that the player card selected in S25 is not owned by the game player before the number of times that the player card is selected in S25 exceeds five times (S26; NO), that player card is lined up as an exchangeable card to be presented by the CPU 1 (S29). The determined exchangeable card is stored in the exchangeable card storage unit 64*a*. Accordingly, since the lineup is determined upon confirming that the player card selected in S25 is not the same as the card owned by the game player, it becomes difficult for the player card that is already owned by the game player to be lined up as an exchangeable card.

Meanwhile, when i=5 in S28; that is, when all of the selected player cards are cards owned by the game player as a result of repeating the selection of the player cards in S25 five times, the selection of a player card owned by the game player is relinquished, and the card that was selected in the fifth selection is lined up as the exchangeable card to be presented by the CPU 1 (S29).

Note that the number of times that the card selection processing is repeated is not limited to five times, and may be four times or less or six times or more, and may be determined in consideration of the processing load of the CPU 1.

Subsequently, whether a predetermined number of cards as the exchangeable cards to be presented by the CPU 1 has been determined is determined (S30). In this embodiment, since the number of cards that are lined up at one time is three cards, unless three cards have been determined (S30; NO), the processing proceeds to S21, and the foregoing processing of S21 to S30 is repeated. When three exchangeable cards to be lined up have been determined (S30; YES), the lineup is updated and, as shown in the screen example of FIG. 6, the exchangeable cards are presented on the screen (S31).

Note that, as described above, upon adopting a scheme where the lineup of three exchangeable cards are determined and updated each time one tournament is ended, the foregoing processing of S21 to S30 is executed only when the game player enters the virtual trade center for the first time after the tournament is ended, and the exchangeable cards that were determined as the lineup are stored in the exchangeable card storage unit 64a. Subsequently, until the subsequent lineup is updated, the foregoing processing of S21 to S30 can be omitted by reading the lineup of the exchangeable cards from the exchangeable card storage unit 64a, and the read exchangeable cards may be presented on the screen. Moreover, the foregoing processing of S21 to S30 may also be performed at the point in time that the tournament is ended (immediately after the tournament is ended) rather than when the game player entered the virtual trade center for the first time after the tournament is ended, the determined exchangeable cards may be stored in the exchangeable card storage unit 64a, and the lineup of the exchangeable cards may be read from the exchangeable card storage unit 64a and presented on the screen when the game player enters the virtual trade center.

Figure 19:
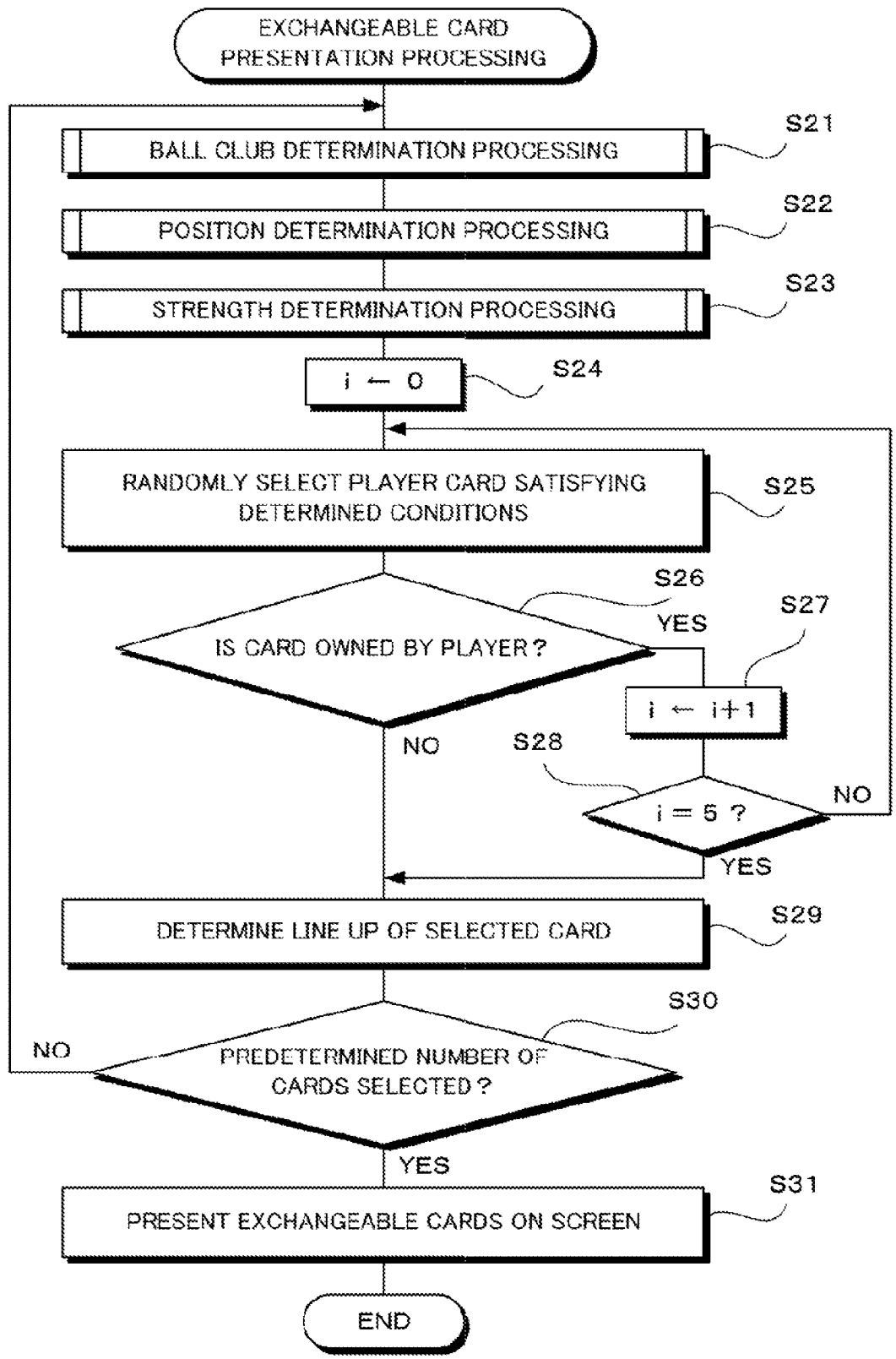
FIG. 19 is a flowchart showing an example of the exchangeable card presentation processing.

The sub routine of the ball club determination processing (S21) in the flowchart of FIG. 19 is now explained with reference to the flowchart of FIG. 20. In this ball club determination processing, foremost, the ball club identification unit 66 identifies the ball club by analyzing (predicting) that the ball club to which the most player characters of the player cards are affiliated based on the player cards owned by the game player as the ball club favored by the game player (S41). Otherwise, it is also possible to identify the ball club by predicting the ball club that the game player selected as one's own ball club upon forming one's original team as the ball club favored by the game player.

Subsequently, the ball club determination unit 67 increases the probability of the identified ball club being chosen based on a random number to be higher than the probability of each of the ball clubs being chosen based on a random number so that the ball club identified by the ball club identification unit 66 will be more easily selected than each of the other ball clubs (S42). For example, the choosing probability of foregoing identified ball club is set to 20%, and the choosing probability of the other 11 ball clubs is respectively set to approximately 7.27%. Subsequently, the random number generation unit 56 generates a random number (S43), and the ball club determination unit 67 determines the ball club of the exchangeable card based on the acquired random number value (S44).

Accordingly, in this embodiment, the ball club (desired ball club) favored by the game player is analyzed/predicted based on the player cards owned by the game player rather than selecting the exchangeable cards to be presented by the CPU 1 in a completely random manner, and the exchangeable cards are determined by causing the predicted ball club to be selected with a higher probability than each of the other ball clubs. When the exchangeable cards are selected completely randomly, there may be cases where the cards desired by the game player are not presented as the exchangeable card for some time. Meanwhile, with this game device 100, since the card of the ball club that is predicted to be the game player's favored ball club (desired ball club) is more easily presented, it is possible to realize a smooth card exchange where the game player will be dissatisfied with the card exchange.

The sub routine of the position determination processing (S22) in the flowchart of FIG. 19 is now explained with reference to the flowchart of FIG. 21. In this position determination processing, foremost, the average strength calculation unit 68 of the position determination unit 62 calculates, for each position, the average * number (average strength) of the player cards owned by the game player (S51). In this embodiment, the average value of the * number for each of the five positions of (1) starting pitcher, (2) relief pitcher/closer, (3) infielder, (4) outfielder, and (5) catcher is calculated. Subsequently, the insufficient position identification unit 69 identifies, as the insufficient position, the position with the lowest average * number calculated by the average strength calculation unit 68 (S52).

Subsequently, the position determination unit 70 increases the probability of the identified insufficient position being chosen based on a random number to be higher than the probability of each of the other positions being chosen based on a random number so that the insufficient position identified by the insufficient position identification unit 69 will be more easily selected than each of the other positions (S53). For example, the choosing probability of foregoing identified insufficient position is set to 30%, and the choosing probability of the other four positions is respectively set to approximately 17.5%. Subsequently, the random number generation unit 56 generates a random number (S54), and the position determination unit 70 determines the position of the exchangeable card based on the acquired random number value (S55).

Accordingly, in this embodiment, the insufficient position is analyzed/predicted based on the player cards owned by the game player rather than selecting the exchangeable cards to be presented by the CPU 1 in a completely random manner, and this insufficient position is predicted as being the position that the game player wishes to acquire via exchange. Subsequently, the exchangeable cards are determined by causing the predicted insufficient position to be selected with a higher probability than each of the other positions. Thus, with this game device 100, since the card that is predicted to be the game player's desired position is more easily presented, it is possible to realize a smooth card exchange where the game player will be dissatisfied with the card exchange.

Figure 22:
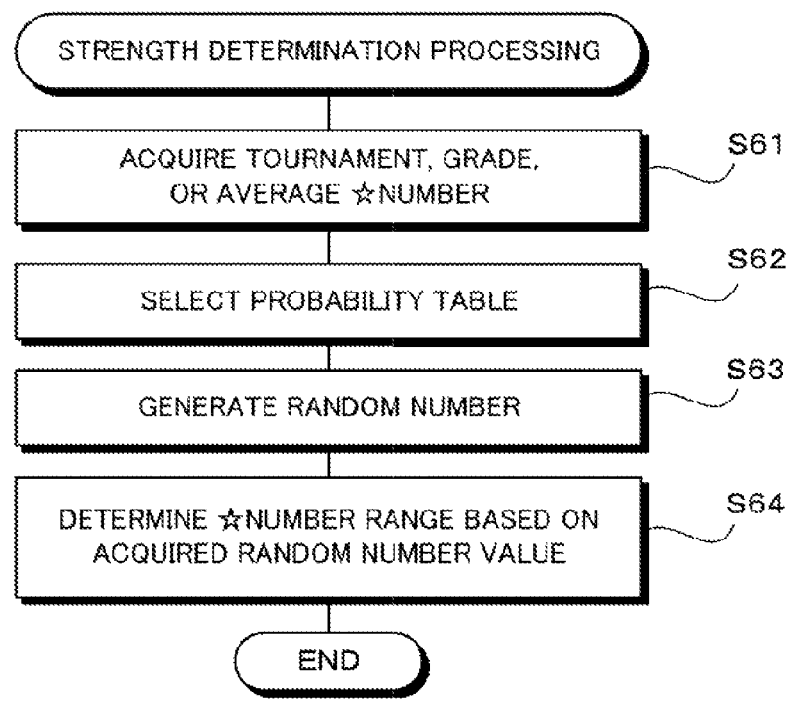
FIG. 22 is a flowchart showing an example of the strength determination processing.

The sub routine of the strength determination processing (S23) in the flowchart of FIG. 19 is now explained with reference to the flowchart of FIG. 22. In this strength determination processing, foremost, the strength determination unit 63 acquires any one of the following information among the tournament that the game player participated in, the grade of the game player or the average strength of the player cards owned by the game player (S61). Here, explained is an example where the strength determination unit 63 acquired information regarding the tournament that the game player participated in.

Subsequently, the probability table selection unit 72 selects the probability table corresponding to the tournament that the game player participated in from the strength determination probability table (probability table based on the level of advancement (difficulty) of the tournament illustrated in FIG. 13A) stored in the strength determination probability table storage unit 71 (S62). For example, when the game player participated in the tournament of grand prix 4, a probability table in which, as the strength of the exchangeable cards, *10 to 24 is 5%, *25 to 54 is 30%, *55 to 79 is 50%, and *80 to 99 is 15%, will be selected. Subsequently, the random number generation unit 56 generates a random number (S63), and the strength determination unit 73 determines the * number (* number range) as the strength of the exchangeable cards based on the acquired random number value (S64).

Accordingly, in this embodiment, exchangeable cards of an appropriate * number according to the level of advancement of the tournament can be selected more easily by assigning a probability table according to the level of advancement (difficulty) of the tournament that the game player participated in.

The sub routine of the exchange condition presentation processing (S3) in the flowchart of FIG. 18 is now explained with reference to the flowchart of FIG. 23. Upon determining the exchange condition that matches the exchangeable cards to be presented by the CPU 1, foremost, the required number determination unit 81 of the exchange condition presentation unit 53 determines the number (required number) of player cards required for the exchange with an exchangeable card (S71). Here, the required number determination unit 81 increases the probably of the required number of cards increasing as the * number as the strength of the exchangeable card is greater. The required number of cards determination processing will be explained later in further detail.

Subsequently, the exchange condition presentation unit 53 determines the exchange condition to match the required number of cards (S72). This exchange condition determination processing will be explained later in further detail. Subsequently, whether the exchange condition for the required number of cards has been determined is determined (S73). When the determination is NO in S73, the processing proceeds to S72, and the processing of S72 and S73 is repeated until the exchange condition for the required number of cards is determined. When the exchange condition for the required number of cards has been determined (S73; YES), the exchange condition presentation unit 53 presents the determined exchange condition for the required number of cards on the screen as shown with the screen example of FIG. 7 (S74).

Figure 23:
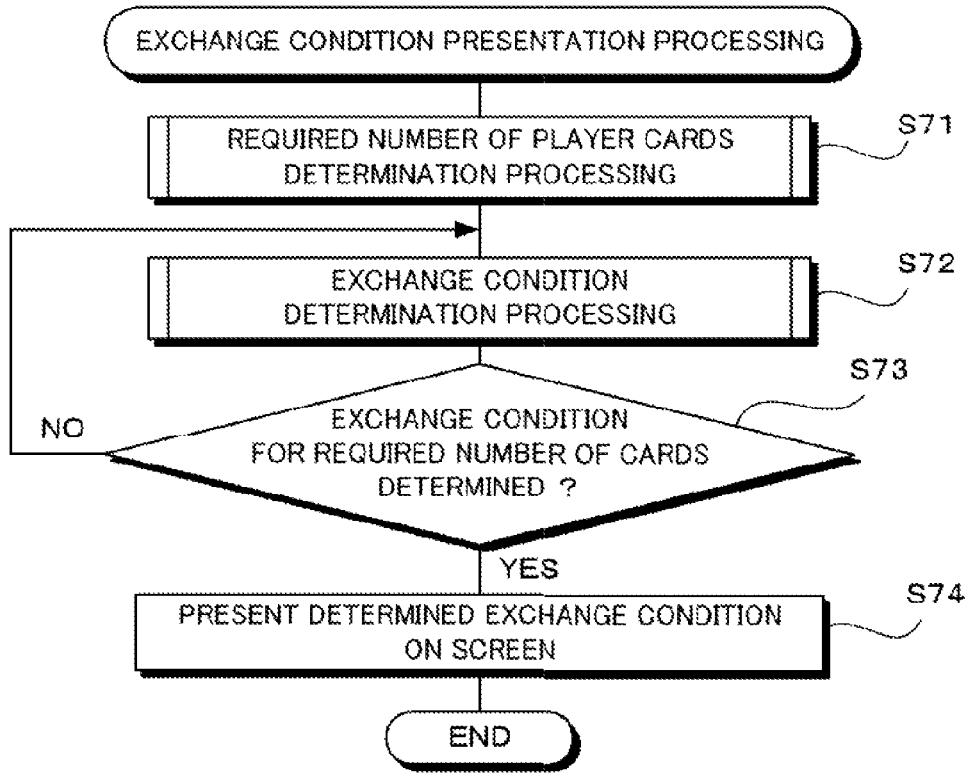
FIG. 23 is a flowchart showing an example of the exchange condition presentation processing.
Figure 24:
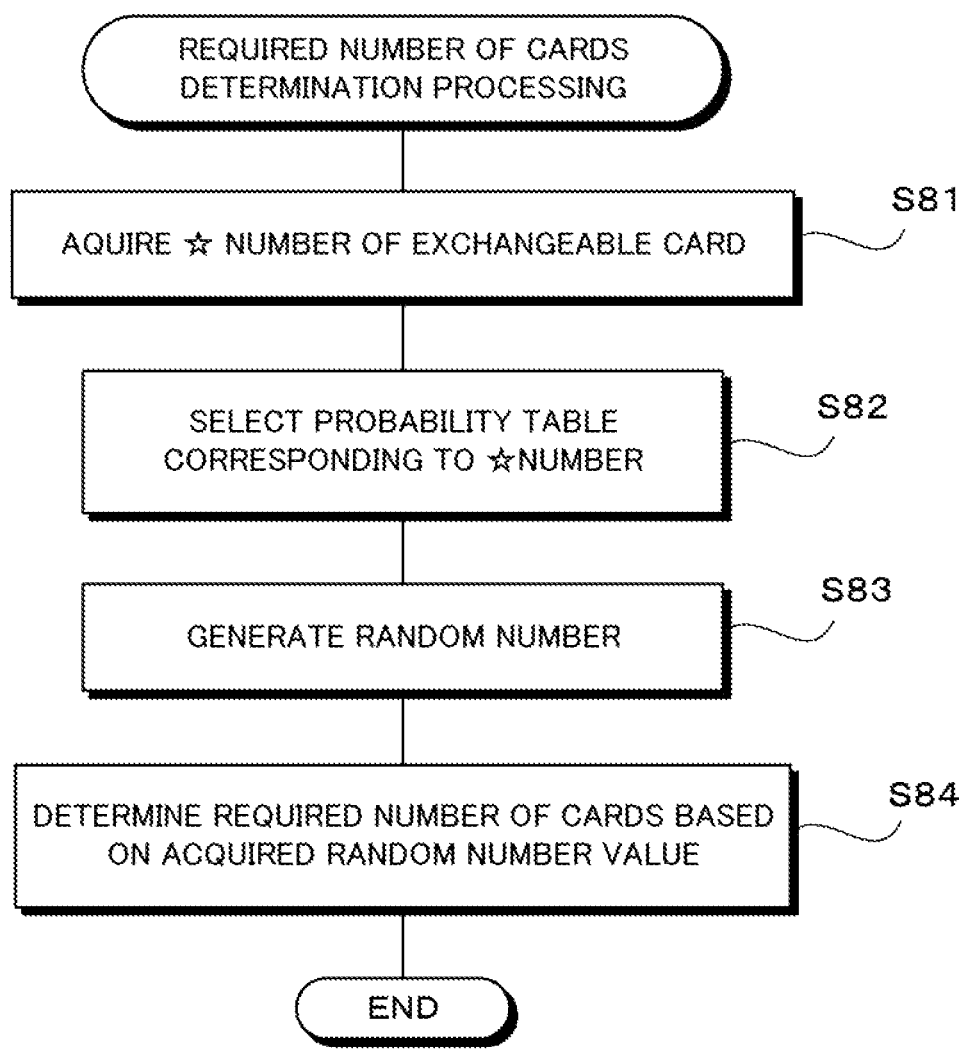
FIG. 24 is a flowchart showing an example of the required number of cards determination processing.

The sub routine of the required number of cards determination processing (S71) in the flowchart of FIG. 23 is now explained with reference to the flowchart of FIG. 24. In this required number of cards determination processing, foremost, the required number determination unit 81 acquires information regarding the * number as the strength of the exchangeable card to be presented by the CPU 1 (S81).

Subsequently, the probability table selection unit 87 selects the probability table corresponding to the * number of the exchangeable card from the number of cards determination probability table (refer to FIG. 14) stored in the number of cards determination probability table storage unit 86 (S82). For example, if the strength of the exchangeable card is *74, a probability table in which, as the required number of cards, one card is 40%, two cards is 40%, and three cards is 20%, is selected from the number of cards determination probability table of FIG. 14. The number of cards determination probability table applied here is set so that the probability of the number of player cards required for the exchange increasing is increased as the strength of the exchangeable card is greater.

Subsequently, the random number generation unit 56 generates a random number (S83). Subsequently, the number of cards determination unit 88 determines the number of player cards required for the exchange with the exchangeable card presented by the CPU 1 based on the random number value generated by the random number generation unit 56 by applying the probability table selected in S82 (S84).

The sub routine of the exchange condition determination processing (S72) in the flowchart of FIG. 23 is now explained with reference to the flowchart of FIG. 25. In this exchange condition determination processing, foremost, the strength setting unit 82 acquires information regarding the strength (* number) of the exchangeable card presented by the CPU 1 (S91), and acquires information regarding the number of player cards required for the exchange with that exchangeable card (S92). Subsequently, the strength setting unit 82 calculates the strength of the player card from the * number of the exchangeable card presented by the CPU 1 and the required number of cards according to, for example, the calculation rule shown in FIG. 15 (S93). For example, when the strength of the exchangeable card is *74, and the required number of cards is two cards, the calculation result of the player card's strength will be * 59 to 69.

Subsequently, the exchange target selection unit 83 selects one player card that complies with the * number calculated in S93 among the player cards owned by the game player stored in the owned card storage unit 44 (S94). If there are a plurality of compatible player cards, one of those cards is selected randomly.

Subsequently, the exchange condition item selection unit 90, foremost, randomly selects one among the three basic exchange conditions shown in FIG. 16 based on, for example, a random number (S95). Subsequently, whether the capability trade was selected as the basic exchange condition is determined (S96). Here, when the * number trade or the ball club trade is selected as the basic exchange condition (S96; NO), as shown in FIG. 17, the exchange condition item ID=1 or ID=2 is determined as the first exchange condition item. Meanwhile, when the capability trade was selected as the basic exchange condition (S96; YES), the exchange condition item selection unit 90 selects one among a plurality of exchange condition items contained in the capability trade (S97), and determines this as the first exchange condition item. In the foregoing case, when the player card selected by the exchange target selection unit 83 is a fielder, the exchange condition item selection unit 90 randomly selects one exchange condition item based on, for example, a random number among the exchange condition item ID=3 (common item) and ID=4 to 7 (fielder exclusive item). Moreover, when the player card selected by the exchange target selection unit 83 is a pitcher, the exchange condition item selection unit 90 randomly selects one exchange condition item based on a random number among the exchange condition item ID=3 (common item) and ID=8 to 14 (fielder exclusive item).

In addition to the first exchange condition item determined in the above-mentioned manner, it is determined if another (second) exchange condition item is added, for example, based on a random number. Subsequently, when the addition of the second exchange condition item is determined (S98; YES), the processing proceeds to S95, and the processing of S95 to S98 is repeated. Subsequently, up to three exchange condition items are determined in this embodiment based on the loop processing of S95 to S98.

When another exchange condition item is not to be added in S98 (S98; NO); that is, when it is determined that another exchange condition item is not to be added based on a random number, or three exchange condition items as the upper limit have been determined, the processing proceeds to S99. In S99, the exchange condition setting unit 91 sets the exchange condition so that the player card itself selected in S94 satisfies the exchange condition configured from one to three exchange condition items determined in the loop processing of S95 to S98.

Figure 25:
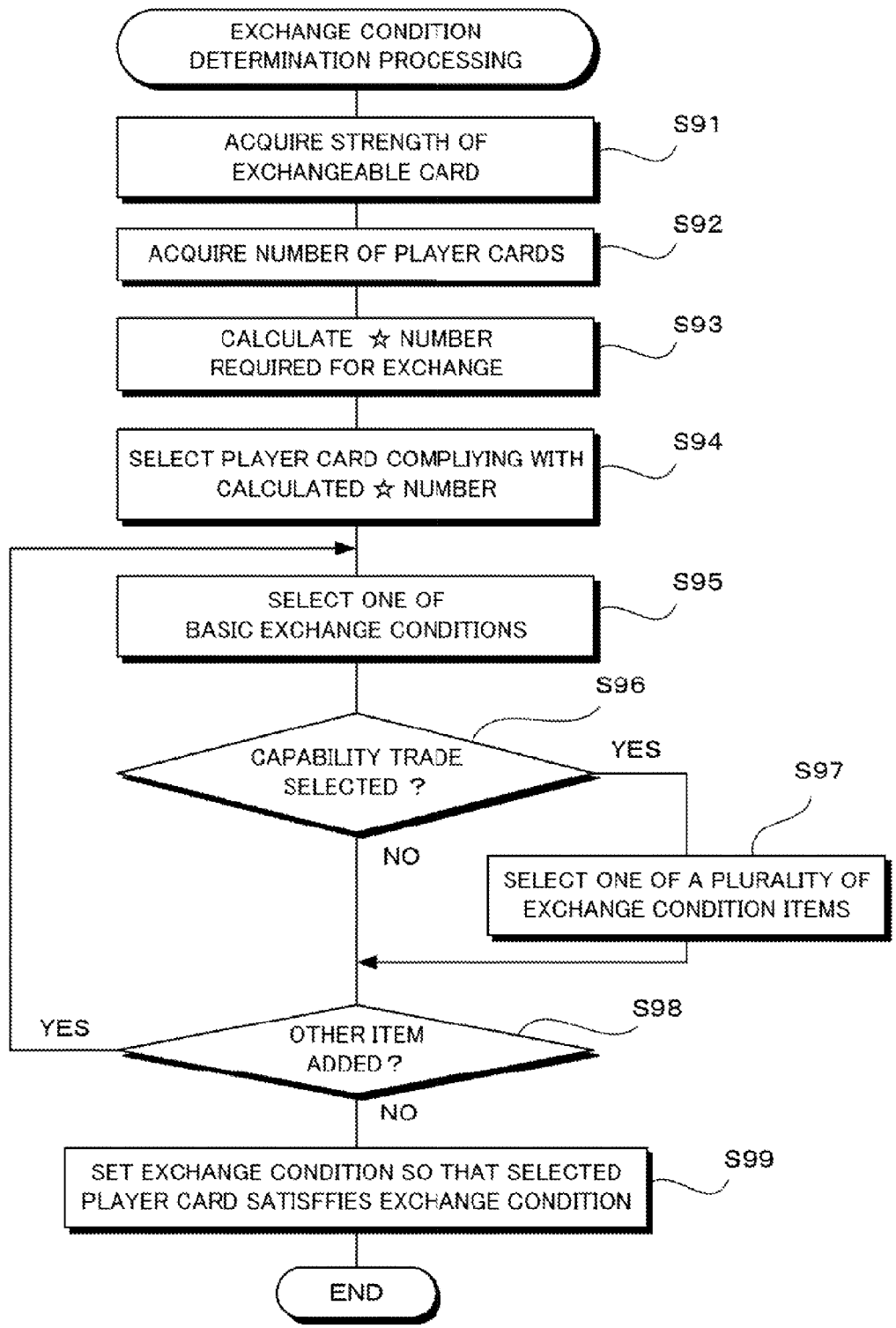
FIG. 25 is a flowchart showing an example of the exchange condition determination processing.

As the exchange condition determination processing, in addition to the processing shown with the flowchart of FIG. 25, it is also possible to determine the comparable exchange condition based on the exchangeable cards presented by the CPU 1 without pre-selecting the player cards that may be exchanged. However, the processing of pre-selecting the player cards that may be exchanged among the player cards owned by the game player and subsequently setting the exchange condition to match the selected player cards as described above is more preferable since it is possible to include a player card that reliably satisfies the exchange condition in the player cards owned by the game player.

Figure 26:
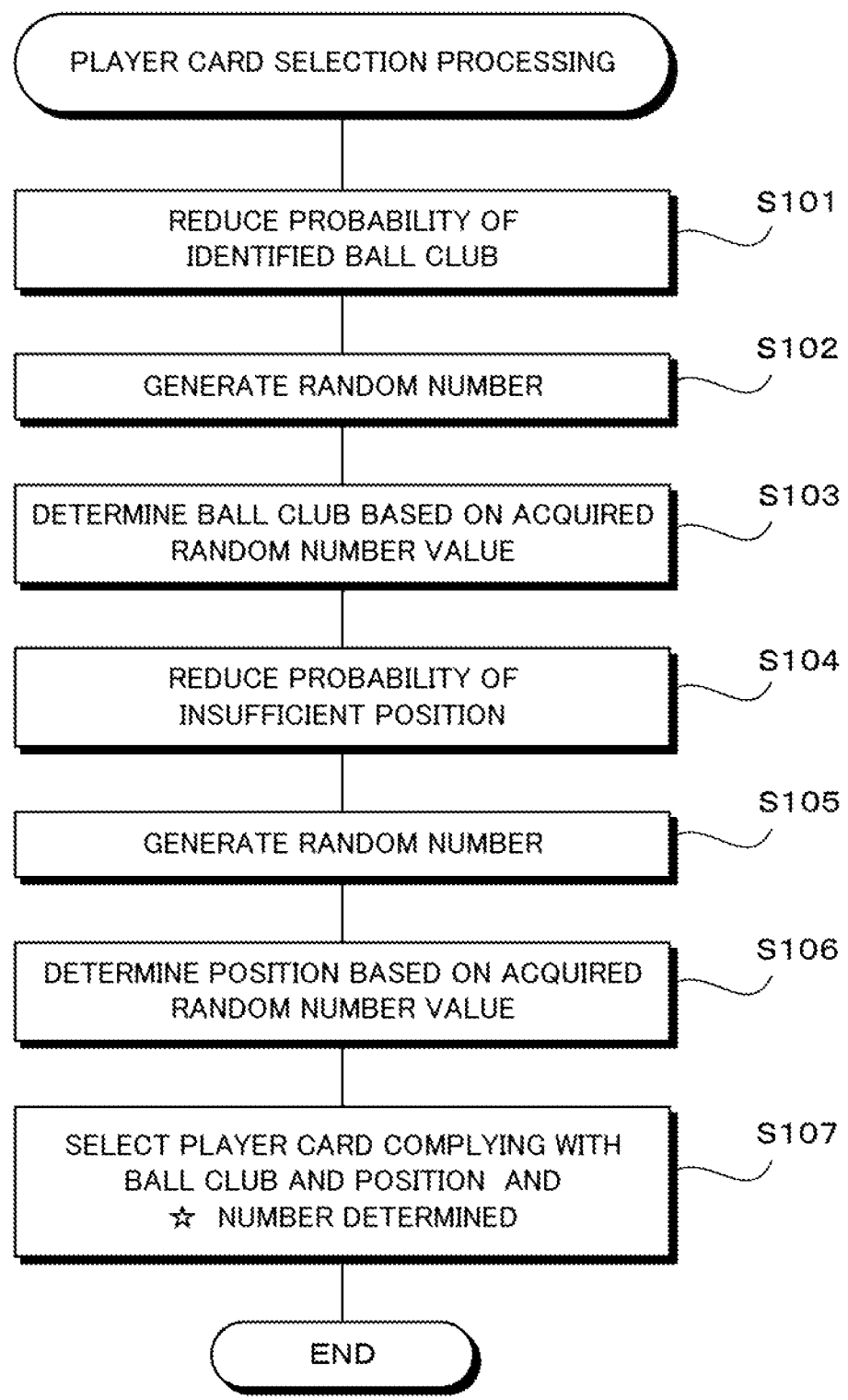
FIG. 26 is a flowchart showing an example of the player card selection processing.

Different player card selection processing than the player card selection processing (S94) in the flowchart of FIG. 25 is now explained with reference to the flowchart of FIG. 26. In the player card selection processing of S94, one player card that complies with the * number calculated in S93 is randomly selected among the player cards owned by the game player. Meanwhile, in the player card selection processing of FIG. 26, rather than randomly selecting the player card that complies with the * number, the ball club and position that the game player does not wish to exchange are predicted, and the player card of such ball club and position are caused to be selected with lower probability.

Figure 20:
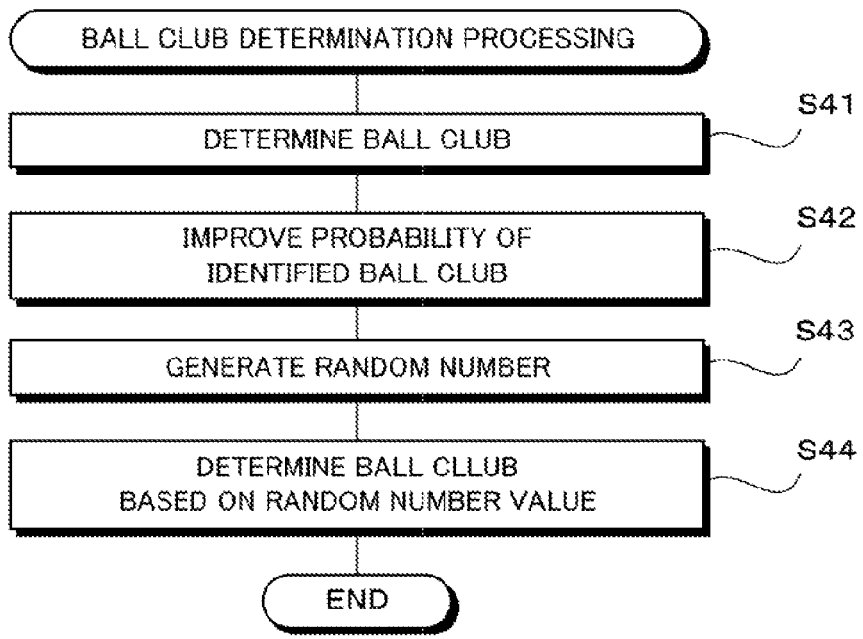
FIG. 20 is a flowchart showing an example of the ball club determination processing.
Figure 21:
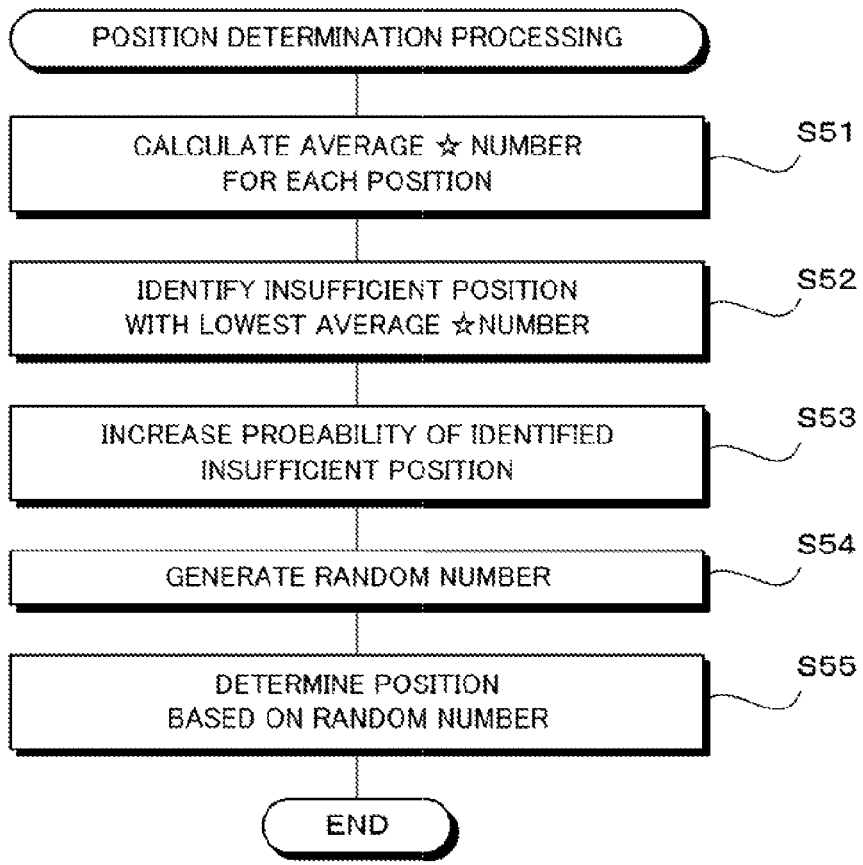
FIG. 21 is a flowchart showing an example of the position determination processing.

Here, the ball club and position that the game player does not wish to exchange are predicted to be the ball club identified in S41 of FIG. 20 and the insufficient position identified in S52 of FIG. 21. Thus, in the player card selection processing, foremost, the probability of the ball identified in S41 being chosen is caused to be lower than the probability that each of the other ball clubs is chosen (S101). For example, with respect to the choosing probability of the ball club, the ball club identified in S41 is set to 4%, and each of the other ball clubs is set to approximately 8.73%. Subsequently, the random number generation unit 56 generates a random number (S102), and the ball club is determined based on the acquired random number value (S103).

Moreover, the probability of the insufficient position identified in S52 being chosen is caused to be lower than the probability that each of the other positions is chosen (S104). For example, with respect to the choosing probability of the position, the insufficient position is set to 10%, and each of the other four positions is set to 22.5%. Subsequently, the random number generation unit 56 generates a random number (S105), and the ball club is determined based on the acquired random number value (S106).

Subsequently, a player card that complies with the ball club determined in S103, the position determined in S106 and the * number determined in S93 of FIG. 25 is selected among the player cards owned by the game player (S107).

Accordingly, in this player card selection processing, by making it difficult for the ball club and position predicted as items that the game player does not wish to exchange to be selected, the frequency that such ball club and position will be requested as the exchange condition to be presented by the CPU 1 will decrease, and it is thereby possible to realize a smooth player card exchange.

Other Embodiments

In the foregoing embodiment, explained was a case of managing the characters owned by the game player in a virtual space as information in a card format which enables the visual recognition of the character mode, and realizing the exchange of characters based on the exchange of cards, in addition to a card format, the characters themselves owned by the game player (for example, characters represented as 2D or 3D computer graphics in the virtual game space) may also be exchanged.

As the modes of the game player owning characters in a virtual space, without limitation to the modes of this embodiment; namely, the mode where characters are given to the game player from the CPU upon executing the game program, the mode of purchasing and owning the characters with virtual coins and points that can be used in the game, and the mode of exchanging and owning characters, for example, characters may also be given to the game player from the CPU when a predetermined condition is satisfied during the game. For example, the mode may be where, during a game such as a sports game or a combat game where scores are gained based on offense to or defense from the opponent, characters are given to the game player when the game player acquires a predetermined score or higher. Moreover, the mode may be where, in various games having a plurality of stages in a virtual space, characters are given to the game player when the game player clears a predetermined stage before "game over".

In the foregoing embodiment, the explanation was provided by taking a baseball game as an example, but the present invention can be applied to overall games that use characters owned by the game player in a virtual space. In other words, this game device is configured by including a character exchange function of the CPU of the game device determining the exchangeable characters based on the characters owned by the game player, and not the character exchange between game players, and presenting the determined exchangeable characters and the exchange conditions thereof from the CPU side to the game player, and the present invention can be suitably applied to overall games having the foregoing function.

In particular, this game device comprises a unique function of the CPU predicting the group (team or the like) and position desired by the game player based on the characters owned by the game player, and causing the character of the predicted group or position to be presented as an exchangeable character with a higher probability. The term "group" as used herein is not limited to a team or the like in a baseball game, and refers to overall groups including a plurality of characters. Moreover, the character is not limited to a human being, and may also be an animal or fictitious living thing (for example, a monster or a fairy). In addition, the concept of group and position similarly exists, for example, in various sports games such as a soccer game, a football game, a basketball game, and a volleyball game, and the present invention can be suitably applied to all of these sports games.

In addition, the present invention can also be suitably applied to games other than a sports game such as a combat game. For example, in a combat game of forming a group called the commando team and infiltrating and attaching the enemy's territory, in a combat game where the respective characters owned by the game player are deployed at the respective positions of, for example, "an operational unit", "an R&D unit", "a food unit", "a medical unit", "an intelligence unit" and the like, a similar concept of group and position as a sports game will exist. Accordingly, the present invention can be suitably applied to overall games having a concept of groups and positions in a virtual space.

Moreover, in the foregoing embodiment, as one example of the game device, explained was a domestic video game machine that is used by being connected to a domestic television, the present invention is not limited this example. In other words, the present invention can similarly be applied to a dedicated portable game device configured integrally with a monitor, a smartphone or portable phone or PHS capable of executing an application program, or a personal computer or a tablet-type terminal that can function as a game device by executing the game program.

Moreover, the various computer-readable game programs according to this embodiment are recorded in various computer-readable recording mediums such as a hard disk, optical disc (CD-ROM, DVD-ROM, UMD or the like), flexible disk, semiconductor memory, ROM cassette, or cartridge for use in domestic video game devices, and the game programs are read from the recording medium and executed by the CPU of the game device. Moreover, the means for providing the game program to the game device is not limited to the foregoing recording mediums, and the game program can also be provided to the game device via communication network such as the internet. For example, when it is possible to download, via the internet, the game program from the website or the like provided by the company that is managing the network game, the game program may also be directly downloaded from the home page to the game device and then executed.

Additional Embodiments

The characteristic configuration of the present invention is now explained regarding an embodiment applied to a game system including a game management device configured from a game server and the like, and a terminal device of each game player which is connectable to the game management device via a network.

The game management device manages the game information of each game player upon receiving access from the terminal device of each game player via the network, and provides a game service to each game player via the network.

Meanwhile, the terminal device of the game player functions as a user interface for sending input information based on the game player's operation to the game management device via the network, and performing the game I/O of displaying the game screen or outputting sounds that are sent from the game management device via the network.

Thus, the arithmetic processing for advancing the game is executed by the game management device, and the main functions provided to the game device of the foregoing embodiment are also loaded in the game management device. In other words, the configuration may be such that, among the functions provided to the game device of the foregoing embodiment, the functions other than the I/O function (functions such as operation input and display output) are provided to the game management device. In addition, the game management device has a function of controlling the display of the terminal device by receiving the game player's operation information from the terminal device, and sending information for displaying the game to the terminal device.

Figure 27:
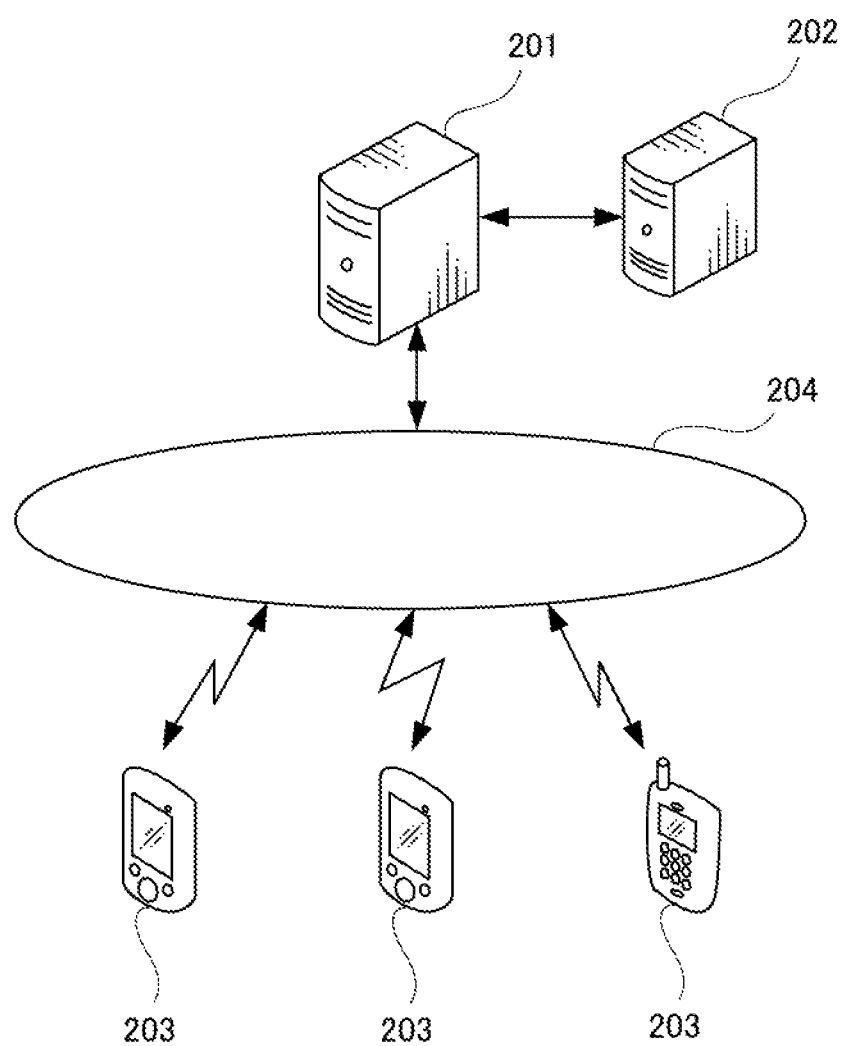
FIG. 27 is an explanatory diagram showing a configuration example of the game system according to an embodiment of the present invention.

A configuration example of the game system according to an embodiment of the present invention is shown in FIG. 27. As shown in the diagram, this game system is configured from a game server 201 disposed on a network 204 such as the internet, a database server 202 communicably connected to the game server 201, and a terminal device 203 of each game player that can be communicably connected to the game server 201 via the network 204.

The network 204 of this embodiment is not limited to the internet, and may also be, for example, a dedicated line, a public line (phone line, mobile communication line or the like), wired LAN, wireless LAN or the like so as long as the game server 201 and the terminal device 203 of each game player can be connected to each other communicably, or the network may be a combination of these with the internet.

In the example of this game system, the game management device according to an embodiment of the present invention is configured from a game server 201 and a database server 202. The game server 201 receives, via the network 204, the access from the terminal device 203 of each game player to receive the game service, accumulates and manages the game information of each game player in the database server 202 (storage device), and provides the game service to each game player via the network 204.

In this embodiment, as one mode of the provision of the game service by the game server 201, explained is a case of providing a so-called browser game in which the game can be played using the web browser loaded in the terminal device 203 of each game player. In the service mode of providing this browser game, there is no need to download or install game-dedicated software to the terminal device 203 of the game player, and, so as long as the environment enables the terminal device 203 to be connected to the network 204, the game player can casually enjoy the game service provided by the game server 201 anywhere.

With this game system, a browser game program (application software) is loaded in the game server 201, and the game server 201 executes arithmetic processing and data processing for advancing the game according to the input operation in the terminal device 203 of each game player. In addition, the game server 201 updates the game information of each player in the database server 202 based on the execution result of the arithmetic processing and the like, and sends the web page information (game screen data) to the terminal device 203 of each game player for displaying the execution result on the screen of the terminal device 203 of the game player.

The terminal device 203 of each game player is loaded with a web browser having a web site browsing function as the user agent, and the web page information sent from the game server 201 can thereby be displayed on the screen of the terminal device 203. As the terminal device 203, applied may be, for example, various terminals such as a smartphone, a portable phone terminal, a PHS terminal, a portable digital assistant (PDA), a personal computer or a tablet-type computer terminal that can be connected to the game server 201 via the network 204 and receive the provision of the game service.

Moreover, since the game provided by this embodiment can be a game comprising the factors of a so-called social game that can be played by a game player while communicating with another game player who is also receiving the game service. For example, by incorporating the game server 201 and the database server 202 of this embodiment into a system of a social networking service (SNS), it is possible to configure a game system that provides a social game service as one of the SNS services. While it is also possible to provide the game player with a game service based on a game system that runs on an SNS platform as described above, it is also possible to create an independent game system without incorporating the game server 201 and the database server 202 into the SNS system.

In the foregoing game system, the game management device (game server 201 and database server 202) receive the access from the terminal device 203 of each game player via the network 204 and manage the game information of each game player, and provides, to each game player via the network 204, the game service regarding the game using the owned characters owned by the game player. The configuration of the game management device according to this embodiment is now explained in detail.

[Configuration of Game Management Device]

Figure 28:
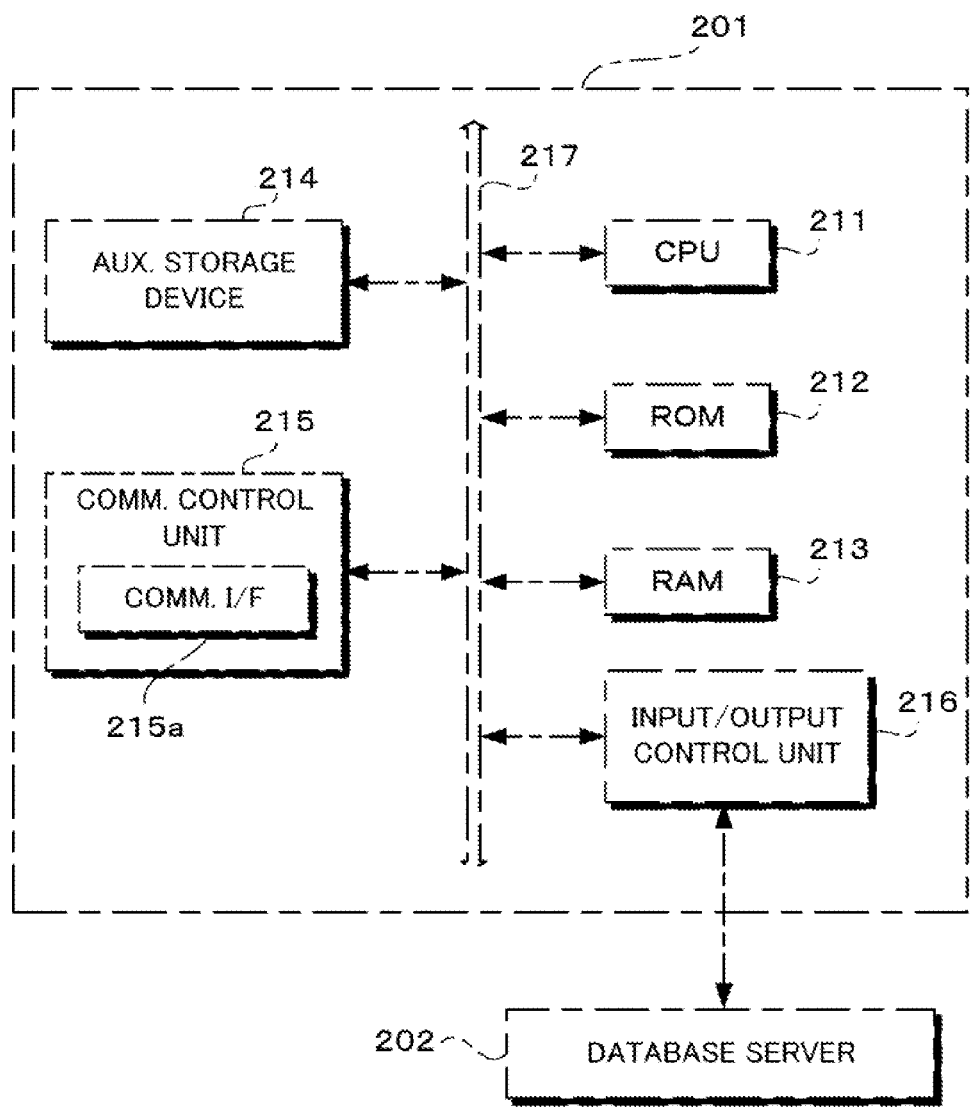
FIG. 28 is a block diagram showing an example of the hardware configuration of the game management device.

As described, the game management device according to an embodiment of the present invention is configured from the game server 201 and the database server 202. FIG. 28 shows an example of the hardware configuration of the game server 201. As shown in FIG. 28, the game server 201 mainly comprises a CPU 211, a ROM 212 and a RAM 213 as the main storage devices, an auxiliary storage device 214, a communication control unit 215, and an I/O control unit 216, and these components are mutually connected via a bus line 217 including an address bus, a data bus, a control bus and the like. Note that an interface circuit is interposed between the bus line 217 and the respective constituent elements as needed, but the illustration of such interface circuits is omitted in the drawing.as main memory devices, The CPU 211 interprets and executes commands of application software such as system software and game programs, and controls the overall game server 201. The ROM 212 stores programs and the like required for the basic operational control of the game management device 201. Moreover, the RAM 213 stores various programs and data, and ensures the work area for the CPU 211.

The auxiliary storage device 214 is a storage device for storing application software such as game programs and various types of data. As the auxiliary storage device 214, for example, a hard disk drive or the like may be used. The program of this embodiment for causing the game server 201 (computer) to operate as the game management device is also stored in the auxiliary storage device 214, and the program is loaded from the auxiliary storage device 214 to the RAM 213 via the bus line 217 upon starting the game server 201, and executed by the CPU 211.

The communication control unit 215 comprises a communication interface 215*a* that is connected to the network 204, and controls the communication with the terminal device 203 of each user via the network 204. Moreover, the communication control unit 215 also controls the communication with a server (not shown) that is connected to the network 204. For example, in the case of a system configuration where the game server 201 is incorporated into SNS, the communication control unit 215 of the game server 201 controls the communication with the SNS server (not shown) via the network 204.

The I/O control unit 216 is communicably connected to the database server 202, and is a database interface for controlling the I/O when the CPU 211 executes the reading and writing of data (records) from and to the database server 202.

The database server 2 comprises, as the storage device having a region for storing the game information of each user managed by the game server 1, for example, a large-capacity hard disk device of a RAID (Redundant Arrays of Inexpensive Disks) configuration. The database server 2 can be configured as a relational database, an object database, an object relationship database or the like which associates identifying information (user ID) for uniquely identifying each user and various game information of each user (user name, level, game points, owned item and so on), and stores the association.

In this embodiment, a case where the game management device is configured from the game server 201 and the database server 202 is explained, but the configuration is not limited thereto. For example, the game management device may be configured only with the game server 1 by causing the game server 201 to comprise the function of the database server 202. Moreover, the respective functions of the game server 201 may be distributed to a plurality of servers, and configure the game server 201 as a plurality of servers. For example, an authentication server with an authentication function of determining, when a user operates the terminal device 203 and accesses the game server 201, whether that user is an official user may be provided separately from the main server of the game server 201, and configure the game server 201 with the main server and the authentication server. As another configuration example, a billing management server for performing billing management when a user purchases a charged item within the game may be provided separately from the main server of the game server 201, and configure the game server 201 with the main server, the authentication server and the billing management server.

Moreover, if the number of users that use this game service becomes over hundred thousand or million or even more, the creation of a server system capable of withstanding enormous access from the terminal devices 203 of numerous users will be required. Thus, a load-balancing system configuration may be adopted by providing a plurality of game servers 201 on the network 204 to achieve redundancy (multiplexing). In the foregoing case, it is desirable to provide a load balancer for adjusting the load among a plurality of game servers 201.

(Configuration of Terminal Device)

As the terminal device 203 to be operated by the game player, various terminals including the foregoing portable phone terminal comprising the web site browsing function may be used, and in this embodiment a portable phone terminal is taken as an example and the configuration thereof is explained. Note that, with the terminal devices 203 other than a portable phone terminal, the basic configuration required for playing the game, such as the input operation for displaying the game screen or executing the game by using the web site browsing function is the same as the configuration of a portable phone terminal.

Figure 29:
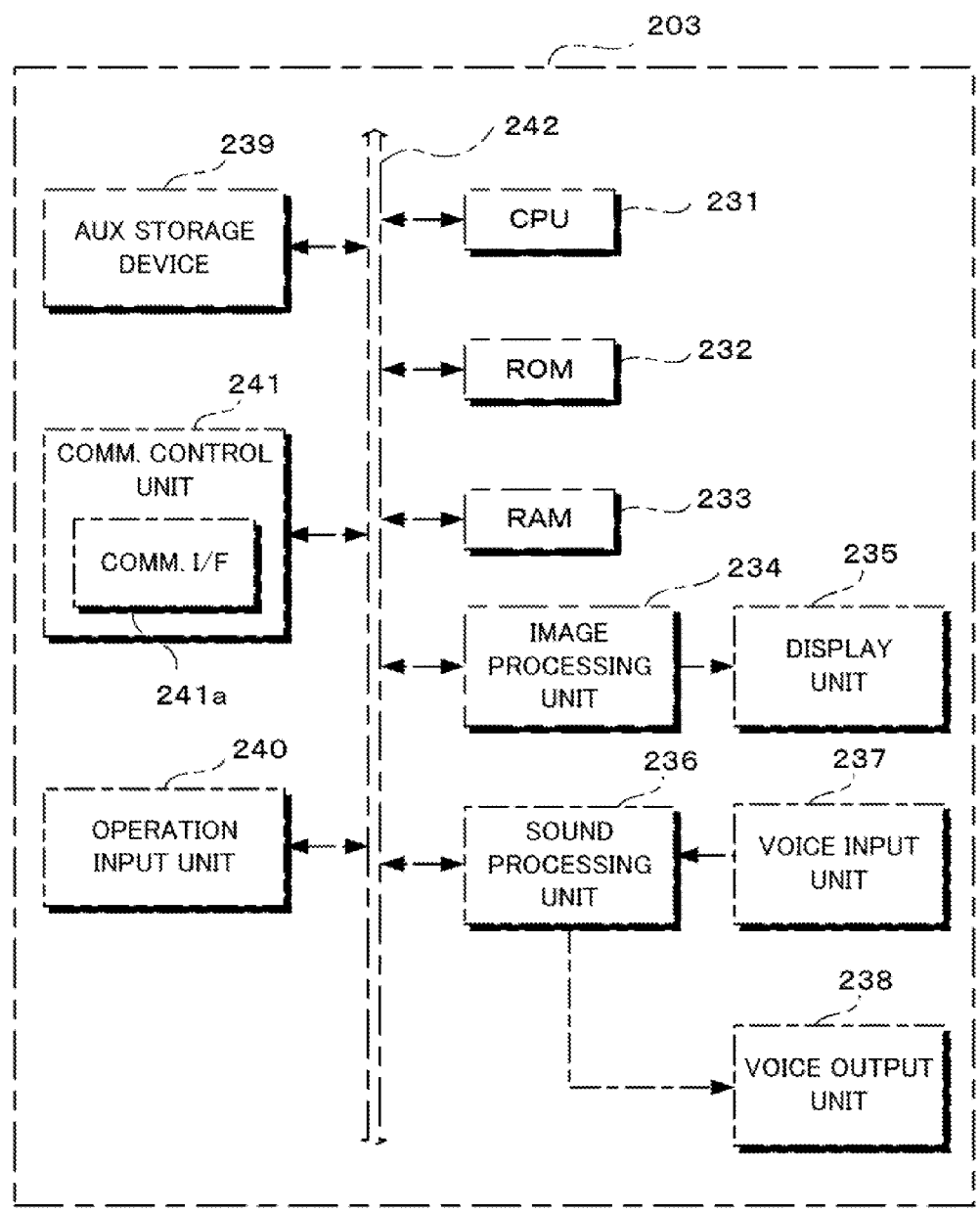
FIG. 29 is a block diagram showing an example of the hardware configuration of the terminal device.

A portable phone terminal comprising the web site browsing function is referred to as a feature phone or a smartphone, and FIG. 29 shows a configuration example thereof. As shown in the diagram, the terminal device 203 mainly comprises a CPU 231, a ROM 232 and a RAM 233 as the main storage devices, an image processing unit 234, a display unit 235, a sound processing unit 236, a voice input unit 237, a voice output unit 238, an auxiliary storage device 239, an operation input unit 240, and a communication control unit 241, and the constituent elements 231 to 234, 236 and 239 to 241 are mutually connected via bus line 242. Note that an interface circuit is interposed between the bus line 242 and the respective constituent elements as needed, but the illustration of such interface circuits is omitted in the drawing.

The CPU 231 interprets and executes commands of various programs including the web browser, and controls the overall terminal device 203. The ROM 232 stores programs and the like required for the basic operational control of the terminal device 203. Moreover, the RAM 233 stores various programs and data that are loaded from the ROM 232 or the auxiliary storage device 239, and ensures the work area for the CPU 231. The web browser that displays game screen data described in HTML or the like is stored in the ROM 232 or the auxiliary storage device 239, and loaded into the RAM 233 and then executed by the CPU 231. Moreover, various types of plug-in software for expanding the browser function of the web browser may also be stored in the ROM 232 or the auxiliary storage device 239 together with the web browser.

The image processing unit 234 drives the display unit 235 based on the image display command from the CPU 231, and displays an image on the screen of the display unit 235. For the display unit 235, various types of known display devices such as a liquid crystal display or an organic EL (Electro-Luminescence) display may be adopted.

The sound processing unit 236 converts an analog voice signal into a digital voice signal when a voice is input from the voice input unit 237, and generates an analog voice signal based on pronunciation instructions from the CPU 231 and outputs the generated analog voice signal to the voice output unit 238. The voice input unit 237 is configured from a microphone built into the terminal device 203 and is used for phone communication or recording. The voice output unit 238 is configured from a phone receiver speaker during a phone communication or a speak that outputs ring tones and sound effects during game execution.

The auxiliary storage device 239 is a device for storing various programs and data. As the auxiliary storage device 239, a flash memory drive or the like may be used an internal memory of the portable phone terminal, and a memory card reader/writer or the like may be used as an external memory of the portable phone terminal. Moreover, a hard disk drive or the like may also be used as the auxiliary storage device 239.

The operation input unit 240 is used for receiving the game player's operation input and outputting an input signal corresponding to the operation input to the CPU 231 via the bus line 242. As examples of the operation input unit 240, there are physical buttons such as a direction button, enter button, and a one-byte character input button provided to the body of the terminal device 203. Moreover, in cases of the terminal device 203 where the display unit 235 is configured as a so-called touch screen by mounting a touch panel (contact input-type interface) on the screen of the display unit 235, the foregoing touch panel also becomes the operation input unit 240.

The communication control unit 241 comprises a communication interface 241a, and has a communication control function for data communication during the game operation and the like, and a communication control function for sending and receiving voice data as a portable phone terminal. Here, the communication control function for data communication includes, for example, a wireless LAN connecting function, internet connecting function via a wireless LAN or portable phone line network, and a near-field wireless communication function using a predetermined frequency band (for example, a 2.4 GHz frequency band). The communication control unit 241 emits connection signals for connecting the game device 1 to the wireless LAN or internet based on a command from the CPU 231, and receives information sent from the communication opponent side and supplies the received information to the CPU 231.

Note that the terminal device 203 may also be provided with a GPS (Global Positioning System) signal reception circuit, an imaging device (camera) such as a CCD (Charge Coupled Device) image sensor, or a triaxial acceleration sensor, and, for example, the GPS position information may be utilized in the game.

In the terminal device 203 configured as described above, the game player who wishes to receive a game service launches the web browser and accesses the game site managed by the game server 201. When this access is authenticated by the game server 201, the communication control unit 241 of the terminal device 203 receives game screen data described in HTML or the like which is sent from the game server 201, and the CPU 231 executes the web browser and displays the game screen on the display unit 235. Here, the game player operates the operation input unit 240 and selectively inputs the selectable button objects or hyperlinks displayed on the game screen. The game server 201 advances the game according to this selective input, and sends new game screen data to the terminal device 203. In addition, the new game screen is displayed on the display unit 235 of the terminal device 203, and, similar to the above, the game player can play the game provided by the game server 201 by selectively operating the button objects that are selectable on the game screen displayed on the display unit 235.

(Functional Configuration of Game Management Device)

Figure 30:
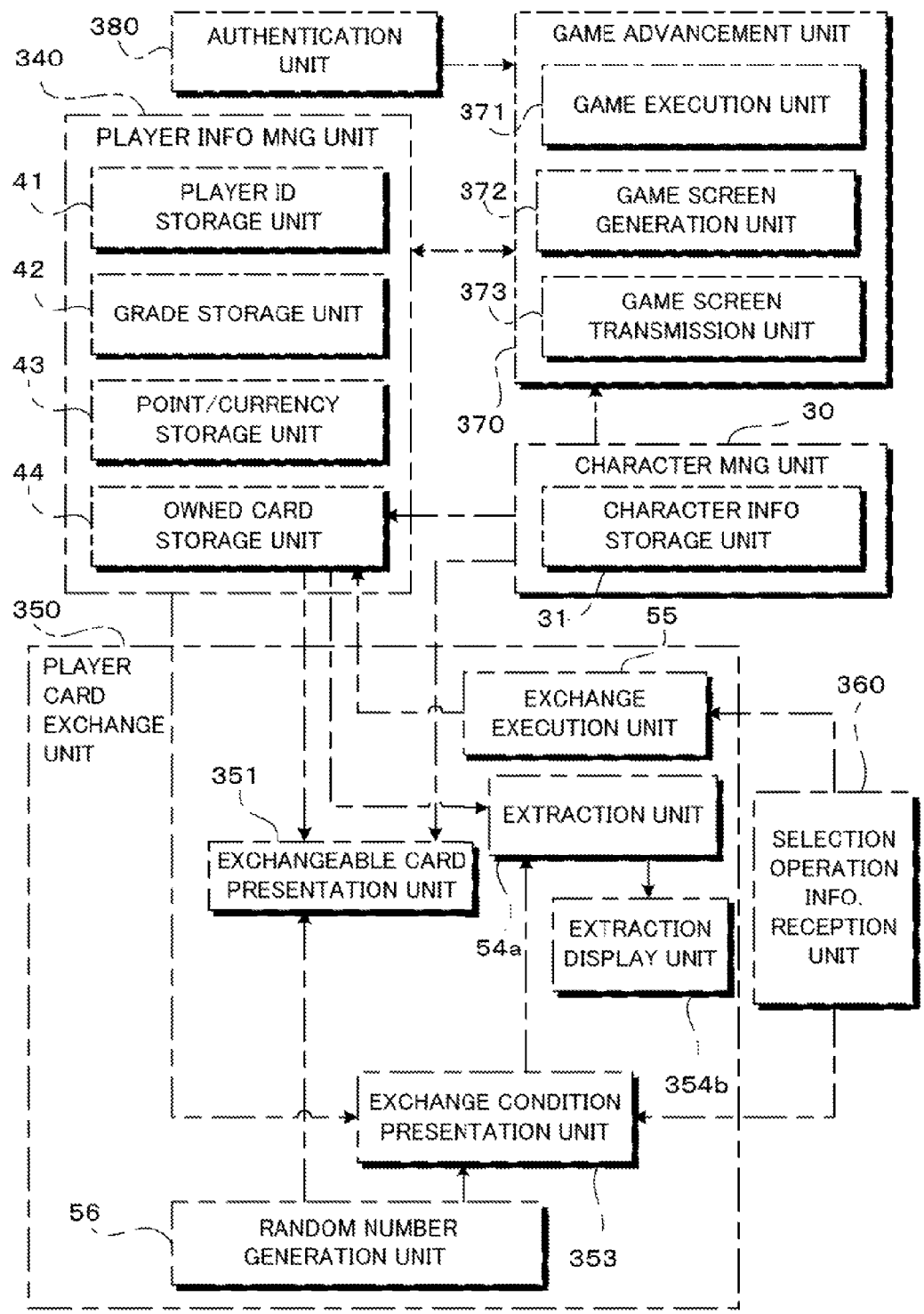
FIG. 30 is a functional block diagram showing an example of the functional configuration of the game management device.

The main functions of the game management device (game server 201 and database server 202) configured as described above are now explained. FIG. 30 is a main functional block diagram of the game management device. Note that the same component number is given to the same configuration as those shown in the previous diagrams explained above (FIG. 1 to FIG. 29), and the explanation thereof is omitted as needed.

As with the game device 100 (refer to FIG. 2) described above, this game management device comprises a character management unit 30, a game player information management unit 340 and a player card exchange unit 350 (character exchange unit). Moreover, this game management device additionally comprises a selection operation information reception unit 360, a game advancement unit 370 and an authentication unit 380. The respective units provided to this game management device are realized by the CPU 211 of the game server 201 executing the programs according to this embodiment. The configuration of this game management device is now explained mainly regarding the differences in comparison to the configuration of the game device 100 shown in FIG. 2.

The game player information management unit 340 of this game management device accumulates and manages the game information of each game player in the database server 202 (storage device). The game player information management unit 340 describes the foregoing game player ID storage unit 41, a grade storage unit 42, a point/currency storage unit 43 and an owned card storage unit 44 (character storage unit). Since the game information of a plurality of game players is managed in this game server 201, the game player information management unit 340 manages the game information of each game player by associating such game information with the game player ID of each game player. For example, the grade storage unit 42 associates the grade information of the game player with the game player ID and stores the association in a predetermined storage area of the database server 202 for each game player ID. The point/currency storage unit 43 and the owned card storage unit 44 similarly associate the point/currency information and the owned card information of the game player with the game player ID, and store the association in a predetermined storage area of the database server 202 for each game player ID.

Moreover, the game information of the game player managed by the game player information management unit 340 is not limited to the foregoing information stored in the respective units 41 to 44, and there are various types of game information depending on the content of the game service provided by this game server 201 to the game player. For example, in the case of a game where the empirical value is accumulated by the game player advancing the game, and the game player's game level is increased when the accumulated empirical value reaches a given amount, the game player information management unit 340 stores the empirical value and game level information in a predetermined storage area of the database server 202 for each game player ID. Moreover, in the case of a game where the game player plays a match (competition game) with another game player, the game player information management unit 340 associates information relating to the game result with the game player ID and stores the association in a predetermined storage area of the database server 202 for each game player ID.

Moreover, the game player information management unit 340 stores in a predetermined storage area of the database server 202, information related to each player such as the log-in ID, password, and a game player name in association with the game player ID.

The player card exchange unit 350 of this game management device has a player card exchange processing function of exchanging a player card owned by the game player with another player card. The player card exchange unit 350 comprises an exchangeable card presentation unit 351 (exchangeable character presentation unit), an exchange condition presentation unit 353, an extraction unit 54a, an extraction display unit 354b, an exchange execution unit 55 and a random number generation unit 56.

The exchangeable card presentation unit 351 has a function of determining the exchangeable card that can be exchanged with the player card based on the player cards owned by the game player, and presenting the exchangeable card on the screen of the game player's terminal device 203. The exchangeable card presentation unit 351 displays the exchangeable card on the screen of the terminal device 203 by sending information (game screen data and the like) for displaying the exchangeable card to the terminal device 203 via the network 204.

In other words, the difference between this exchangeable card presentation unit 351 and the exchangeable card presentation unit 51 shown in FIG. 2 is that, whereas the exchangeable card presentation unit 51 displays the exchangeable card on the screen of the game device 100 without going through a network, the exchangeable card presentation unit 351 displays the exchangeable card on the screen of the terminal device 203 via the network 204. Other than the foregoing difference, the exchangeable card presentation unit 351 and the exchangeable card presentation unit 51 shown in FIG. 2 basically have the same configuration and function.

The exchange condition presentation unit 353 has a function of setting an exchange condition (character exchange condition) for exchanging the exchangeable card presented by the exchangeable card presentation unit 351 with the player card owned by the game player, and presenting the exchange condition on the screen of that game player's terminal device 203. The exchange condition presentation unit 353 displays the exchange condition on the screen of the terminal device 203 by sending information (game screen data and the like) for displaying the exchange condition to the terminal device 203 via the network 204.

In other words, the difference between this exchange condition presentation unit 353 and the exchange condition presentation unit 53 shown in FIG. 2 is that, whereas the exchange condition presentation unit 53 displays the exchange condition the screen of the game device 100 without going through a network, the exchange condition presentation unit 353 displays the exchange condition on the screen of the terminal device 203 via the network 204. Other than the foregoing difference, the exchange condition presentation unit 353 and the exchange condition presentation unit 53 shown in FIG. 2 basically have the same configuration and function.

The extraction display unit 354b has a function of displaying the player card extracted by the foregoing extraction unit 54a, apart from the player cards that do not satisfy the exchange condition, on the screen of the game player's terminal device 203. In other words, the extraction display unit 354b of this embodiment basically has the same configuration and function as the extraction display unit 54b shown in FIG. 2 other than performing the display control processing via the network 204.

The selection operation information reception unit 360 receives the selection operation information from the terminal device 203 when the game player performs the selection operation of selecting the selectable object displayed on the screen of the terminal device 203. In addition, the selection operation information reception unit 360 supplies the selection operation information received from the terminal device 203 to the exchange condition presentation unit 353 and the exchange execution unit 55.

For example, as shown in FIG. 6, in a case where a plurality of exchangeable cards are displayed on the screen of the terminal device 203 and the game player performs the selection operation of selecting one of such exchangeable cards, the information (selection operation information) of the selected exchangeable card is sent from the terminal device 203 to the game server 201. Here, the selection operation information reception unit 360 receives information of the selected exchangeable card from the terminal device 203, and supplies the information to the exchange condition presentation unit 353. In addition, the exchange condition presentation unit 353 sets the exchange condition for exchanging the received exchangeable card with the player card owned by the game player.

Moreover, for example, as shown in FIG. 9, in a case where a list of player cards (owned characters) owned by the game player is displayed on the screen of the terminal device 203 and the player card to be exchanged with the exchangeable character is selected using the terminal device 203, information (selection operation information) of the selected player card to be exchanged is sent from that terminal device 203 to the game server 201. Here, the selection operation information reception unit 360 receives the information of the selected player card to be exchanged from the terminal device 203, and supplies the information to the exchange execution unit 55. In addition, when the player card that satisfies the exchange condition presented by the exchange condition presentation unit 353 is selected by using the terminal device 203, the exchange execution unit 55 approves the exchange of that player card and the exchangeable card, and updates the memory content of the owned card storage unit 44 to a content after the approval of the exchange.

Figure 31:
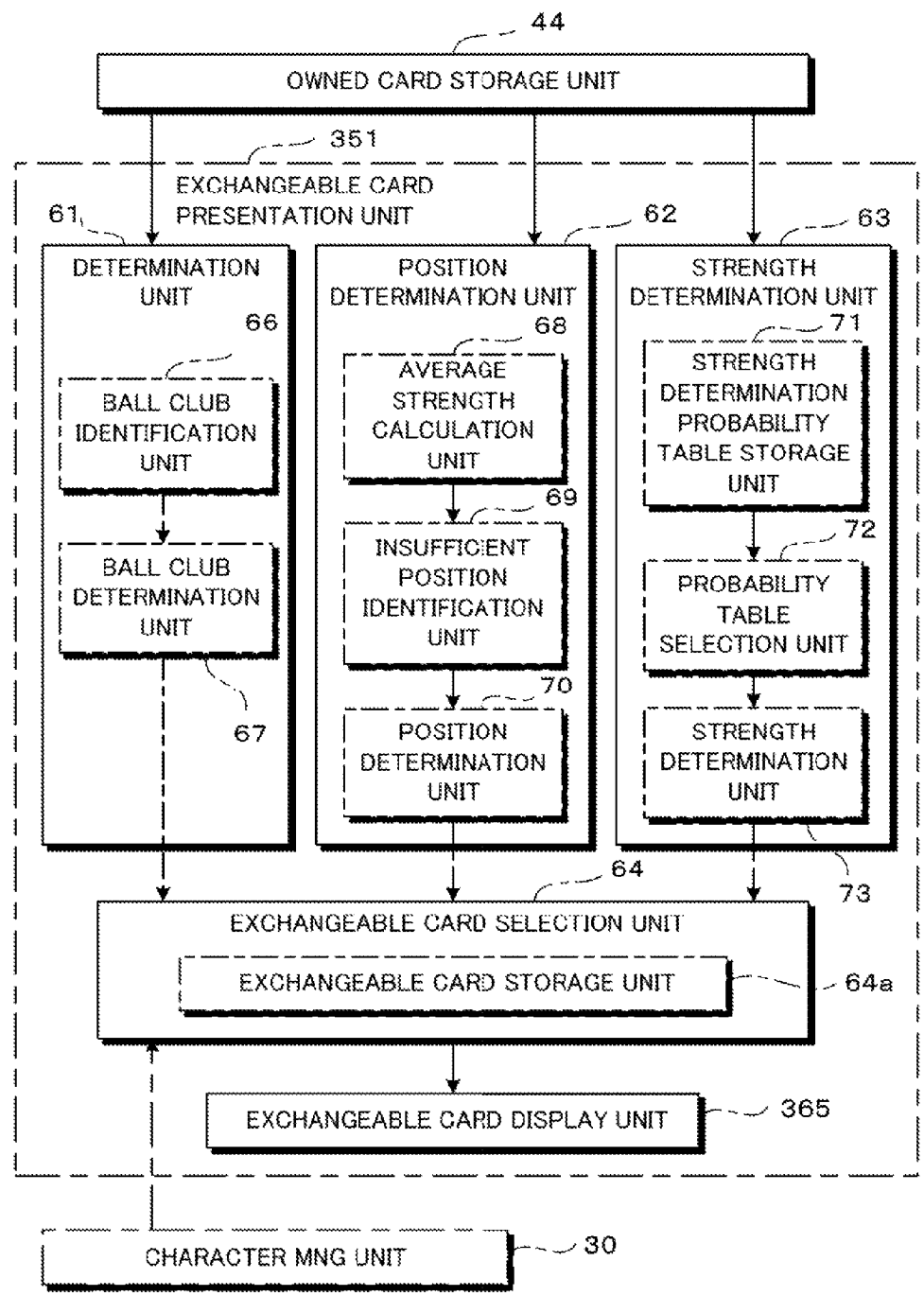
FIG. 31 is a functional block diagram showing a configuration example of the exchangeable card presentation unit.

Moreover, as shown in FIG. 31, as with the exchangeable card presentation unit 51 shown in FIG. 3, the exchangeable card presentation unit 351 comprises a ball club determination unit 61, a position determination unit 62, a strength determination unit 63, an exchangeable card selection unit 64 and an exchangeable card display unit 365. These respective units are realized by the CPU 211 of the game server 201 executing the programs according to this embodiment.

The difference between the exchangeable card display unit 365 provided to the exchangeable card presentation unit 351 of this embodiment, and the exchangeable card display unit 65 shown in FIG. 3 is as follows. In other words, whereas the exchangeable card display unit 65 shown in FIG. 3 performs the display processing to the screen of the game device 100 without going through a network, the exchangeable card display unit 365 of this embodiment controls the display of the terminal device 203 by sending information (game screen data and the like) to be displayed to the terminal device 203 via the network 204. Other than the foregoing difference, the exchangeable card display unit 365 and the exchangeable card display unit 65 shown in FIG. 3 basically have the same configuration and function.

Figure 32:
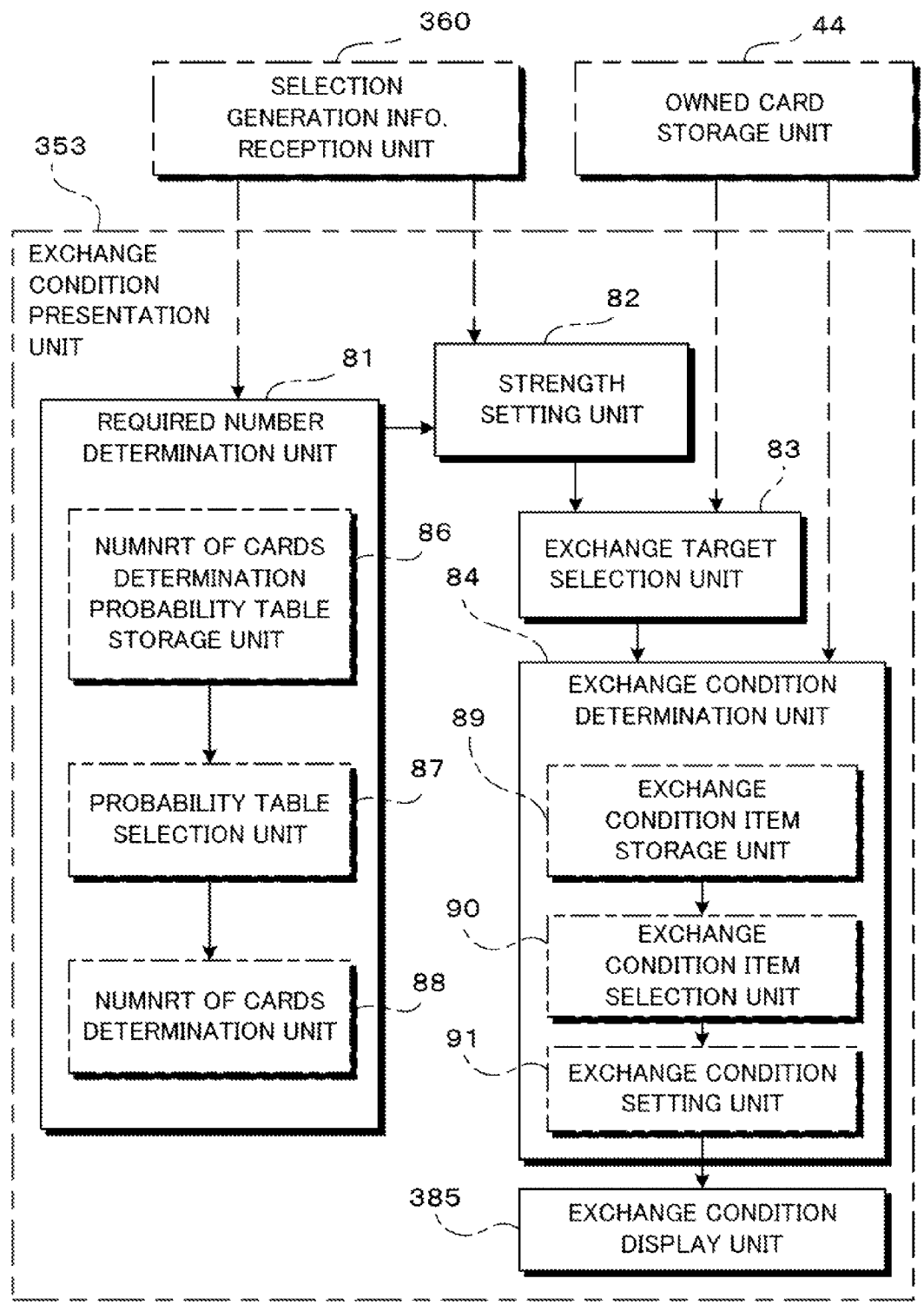
FIG. 32 is a functional block diagram showing a configuration example of the exchange condition presentation unit.

Moreover, as shown in FIG. 32, as with the exchange condition presentation unit 53 shown in FIG. 4, the exchange condition presentation unit 353 comprises a required number determination unit 81, a strength setting unit 82 (basic ability scoresetting unit), an exchange target selection unit 83, an exchange condition determination unit 84 and an exchange condition display unit 385. Each of these units is realized by the CPU 211 of the game server 201 executing the programs according to this embodiment.

The difference between the exchange condition display unit 385 provided to the exchange condition presentation unit 353 of this embodiment, and the exchange condition display unit 85 shown in FIG. 4 is as follows. In other words, whereas the exchange condition display unit 85 shown in FIG. 4 performs the display processing to the screen of the game device 100 without going through a network, the exchange condition display unit 385 of this embodiment controls the display of the terminal device 203 by sending information (game screen data and the like) to be displayed to the terminal device 203 via the network 204. Other than the foregoing difference, the exchange condition display unit 385 and the exchange condition display unit 85 shown in FIG. 4 basically have the same configuration and function.

Figure 33:
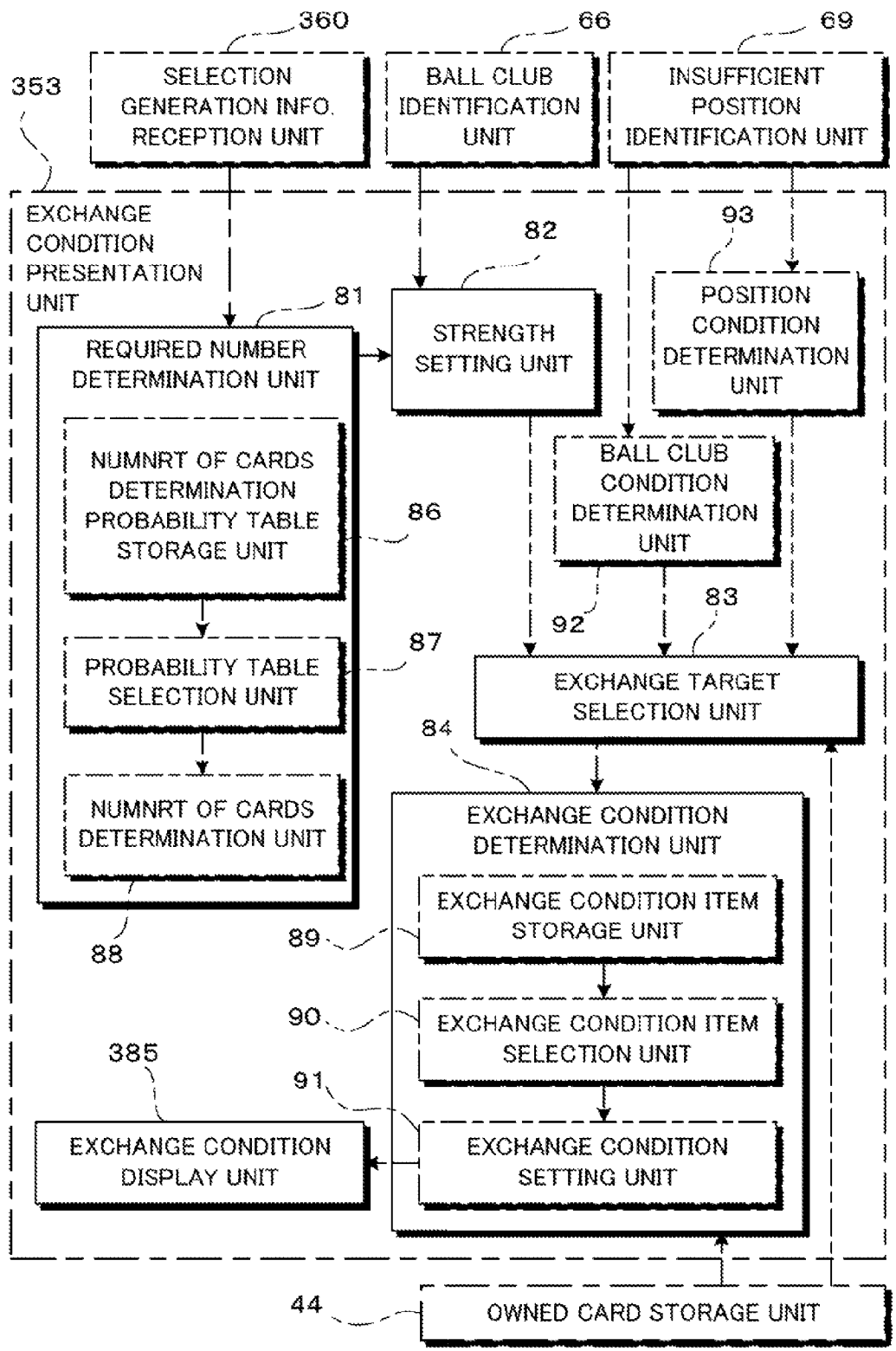
FIG. 33 is a functional block diagram showing another configuration example of the exchange condition presentation unit.

Moreover, as shown in FIG. 33, as with the exchange condition presentation unit 53 shown in FIG. 5, the exchange condition presentation unit 353 may additionally comprise a ball club condition determination unit 92 and a position condition determination unit 93. Each of these units 92, 93 is realized by the CPU 211 of the game server 201 executing the programs according to this embodiment.

Moreover, the game advancement unit 370 shown in FIG. 30 has a function of executing the game according to the game player's operation performed using the terminal device 203, generating game screen data according to the execution result and sending the generated game screen data to the terminal device 203, and advancing the game by displaying a game screen according to the game player's operation on the terminal device 203. The game advancement unit 370 comprises a game execution unit 371, a game screen generation unit 372, and a game screen transmission unit 373.

For example, when a game screen is displayed with the web browser of the game player's terminal device 203 and the game player performs an operation for selecting the selectable object or hyperlink on the game screen, a game screen request according to the operation is sent to the game server 201 by the web browser of the terminal device 203. In the game server 201 that received the foregoing request, the game execution unit 371 executes the game by reading the game player's game information according to the request and performing arithmetic processing and data processing.

The game screen generation unit 372 generates game screen data from, for example, HTML data according to the execution result of the game execution unit 371. and the HTML data may also be embedded with a script (program) that is operated based on a plug-in of the web browser of the terminal device 203.

The game screen transmission unit 373 sends, to the game player's terminal device 203, the game screen data (HTML data and the like) generated by the game screen generation unit 372 as a response to the game screen request. The game player's terminal device 203 that received the foregoing game screen data displays the game screen using the web browser.

Moreover, when a game player who wishes to receive the game service accesses (logs into) the game server 201 by operating the terminal device 203, the authentication unit 380 shown in FIG. 30 performs log-in authentication by determining the game participation eligibility of that game player. As an example of this authentication, there is authentication based on a log-in ID and password associated with the game player ID.

Moreover, the game server 201 may also additionally include a fellow player management function or a message communicating function. The fellow player management function is a function of storing, in the database server 202, information of each fellow game player in a fellow player relationship affiliated with a group centered around the respective game players, and performing fellow player management for each game player. Moreover, the message communicating function is a function of receiving messages addressed to other game players which were sent from the terminal device 203 of each game player, and communicating such messages to the terminal device 203 of the other game players.

(Operation of Game System)

An operation example of the game system according to an embodiment of the present invention configured as described above is now explained with reference to the flowchart of FIG. 34. FIG. 34 shows the processing flow of the terminal device 203 and the game server 201 when the game player operates the terminal device 203 and accesses the game server 201 to receive the game service.

When the game player is to receive the game service, foremost, the game player operates the operation input unit 240 of the terminal device 203 and launches the web browser (S411). Subsequently, the game player performs operations for accessing the game site managed by the game server 201, and an access request is thereby sent from the terminal device 203 to the game server 201 (S412). Here, the game server 201 performs log-in authentication to the access from the terminal device 203 (S421), and confirms that the access is from a game player who is registered for using the game service. Subsequently, the game server 201 sends main screen data described in HTML or the like to the terminal device 203 (S422). In addition, in the terminal device 203 that received the main screen data, the web browser interprets the received data, and displays the main screen (initial screen upon starting the game) on the display unit 235 (S413).

Here, when the game player performs the operation of selecting an object such as selectable buttons or a hyperlink displayed on the screen, a screen request according to the operation is sent from the terminal device 203 to the game server 201 (S414). The game server 201 that received the foregoing request executes the game by performing arithmetic processing and data processing according to the game player's operation (S423), and sends the game screen data reflecting the execution result to the terminal device 203 (S424). In addition, with the terminal device 203 that received the screen data, the web browser interprets the received data, and displays the game screen on the display unit 235 (S415).

Thereafter, in the game player's terminal device 203, S414 and S415 are repeated, and in the game server 201, S423 and S424 are repeated, and, consequently, each time the game player selects the selectable button or the like displayed on the screen of the terminal device 203, the game screen of the terminal device 203 is switched in succession so as to advance the game.

Subsequently, when the game player operates the terminal device 203 and closes the game screen (S416), the game server 201 performs log-out processing (S425). For example, when the game player closes the web browser, the game server 201 performs the log-out processing after a session time-out.

Meanwhile, in this game system, even when the game player logs out from the game server 201, the game server 201 side can read the game information of that game player and advance the game. For example, another logged-in game player may request a logged-out game player to play a game. Regardless of whether the game player is logged-in, the game advancement unit 370 of the game server 201 reads the game information of the game player from the database server 202 and executes a match, and updates the game information of each game player by reflecting the execution result thereof.

The flow of each type of processing (player card exchange processing and the like) in the game management device of this embodiment is basically common with the flow of each processing of the game device 100 which has been previously explained with reference to the flowcharts of FIG. 18 to FIG. 26 and other diagrams. In other words, while the game device 100 internally executes each type of processing, the game management device of this embodiment differs in that each type of processing is executed while sending and receiving information to and from the terminal device 203 via the network 204. However, the basic processing flow is common. Thus, the detailed explanation of each processing flow in the game management device of this embodiment is omitted.

As described above, the characteristic configuration of the present invention can also be applied to a game management device (game server 201, database server 202) for providing various games such as a social game to the game player. Thus, this game management device can analyze (predict) the characters that the game player wishes to exchange and thereby select the exchangeable character as with the foregoing game device 100, and it is possible to provide the game player with a highly amusing game capable of realizing a smooth character exchange which subdues the dissatisfaction during a conventional exchange of characters by game players.

Summary of Embodiments (1) As described above, the game device according to one aspect of the present invention is a game device for executing a game using an owned character that is owned by a game player in a virtual space, which comprises a character storage unit for storing the owned character in a storage device; and a character exchange unit for exchanging the owned character with another character, wherein the character exchange unit comprises (a) an exchangeable character presentation unit for determining, based on the owned character, an exchangeable character that can be exchanged with the owned character, and presenting the exchangeable character on a screen, (b) an exchange condition presentation unit for setting a character exchange condition for exchanging the exchangeable character presented by the exchangeable character presentation unit with the owned character, and presenting the character exchange condition on a screen, (c) an exchange-target character selection unit for causing the game player to select, among owned characters, an owned character to be exchanged with the exchangeable character, and (d) an exchange execution unit for executing the exchange of the owned character with the exchangeable character when the owned character that satisfies the character exchange condition presented by the exchange condition presentation unit is selected by the exchange-target character selection unit, and updating a memory content of the character storage unit to a content after executing the exchange.

According to the foregoing configuration, owned characters that are owned by a game player in a virtual space; for instance, player characters such as pitchers and fielders in a baseball game, are stored in the character storage unit and managed. In addition, this game device comprises a character exchange unit, and, rather than the game players exchanging characters with each other, an exchangeable character presented from the game device side and the game player's owned characters can be exchanged. Upon performing this character exchange, since the exchangeable character presentation unit determines the exchangeable character to be presented from the game device side based on the characters owned by the game player, the CPU in the game device can determine the exchangeable character upon analyzing the character that the game player wishes to exchange. The exchangeable character that was determined in the manner described above is displayed on the screen and presented to the game player. Moreover, the character exchange condition for exchanging the exchangeable character with the game player's owned characters is set by the exchange condition presentation unit, and this character exchange condition is also displayed on the screen and presented to the game player.

When the exchangeable character and the exchange condition thereof are presented from the game device side as described above, the game player confirms these on the screen and considers whether to exchange the presented exchangeable character with the game player's owned characters. Here, when the game player attempts to exchange the characters, the exchange-target character selection unit selects the character to be exchanged among the self-owned characters. Here, when the owned character that satisfies the character exchange condition presented by the game device side is selected by the game player, the exchange execution unit approves the exchange of the owned character and the exchangeable character presented by the game device side. Subsequently, the exchange execution unit updates the memory content regarding the owned character of the character storage unit to the content after the approval of the exchange.

As described above, with a conventional exchange of characters by game players, when another game player does not possess the character desired by a certain game player, or, even when the other game player possesses that character, when the other game player is not willing to exchange that character, a game player will have trouble acquiring one's desired character and, if this kind of situation were to continue, the game player may become dissatisfied with the exchange of characters between game players. Meanwhile, with this game device, since the exchangeable character to be presented by the game device side is determined based on the game player's owned characters as described above, it is possible to select the exchangeable character by analyzing (predicting) the character that the game player wishes to exchange, and thereby realize a smooth character exchange which subdues the dissatisfaction in a conventional exchange of characters by game players.

(2) In the configuration of (1) above, preferably, the game is played on the basis of a group including a plurality of the owned characters, the exchangeable character presentation unit comprises an average value calculation unit for calculating an average value of basic ability scores of the owned characters for each position in the group, an insufficient position identification unit for identifying, as an insufficient position, a position with a lowest average value calculated by the average value calculation unit, and a position determination unit for determining a position so that the insufficient position identified by the insufficient position identification unit is chosen with a higher probability than other positions, and the exchangeable character presentation unit presents, as the exchangeable character, a character of the position determined by the position determination unit on a screen.

According to the foregoing configuration, an insufficient position is identified among the positions (for example, positions such as starting pitcher, relief pitcher/closer, infielder, outfielder, and catcher) in a group (for example, baseball team formed from the player characters owned by the game player in a virtual space) including a plurality of characters owned by the game player. The identification of the insufficient position is realized by the average value calculation unit calculating the average value of the basic ability scores of the characters owned by the game player for each position in the group, and the insufficient position identification unit identifying, as the insufficient position, the position with the lowest calculated average value. Here, a basic ability score represents the level of the basic capability of each character (for example, in the case of a baseball game, the pitcher capability or fielder capability of the player character), and a position in which the average value of these basic ability scores is lowest is a position that is lacking in strength, and is assumed to be the position that the game player wishes to acquire a new character via exchange.

This insufficient position is chosen with a higher probability than the other position upon determining the position of the exchangeable character. Thus, with this game device, the character that the game player wishes to exchange is predicted by identifying the insufficient position based on the game player's owned characters, and the character of the insufficient position is presented on the screen as the exchangeable character with a higher probability than the character of other positions. In other words, performed is processing which enables the provision of options capable of compensating the weakness of the game player's group. It is thereby possible to realize a smooth character exchange which subdues the dissatisfaction in a conventional exchange of characters by game players.

(3) In the configuration of (2) above, preferably, the exchange condition presentation unit sets the probability that the insufficient position identified by the insufficient position identification unit is proposed as the character exchange condition to be lower than the probability that other positions are proposed.

Here, since the insufficient position is a position that lacks strength in comparison to the other positions, it is possible to analyze (predict) that it is a position that the game player does not wish to exchange. If a position that the game player does not wish to exchange is presented as the exchange condition, it would be difficult for the game player to accept that exchange condition and, therefore, it would be desirable to lower the frequency that such exchange condition is presented from the game device. Thus, with this game device, by setting the probability that the insufficient position is proposed as the character exchange condition to be lower than the probability that the other positions are proposed, it becomes difficult for the insufficient position to be presented as the character exchange condition, and a smooth character exchange is thereby realized.

(4) In the configuration of any one of (1) to (3) above, preferably, the owned characters belong to a group among a plurality of predetermined groups, the exchangeable character presentation unit comprises an affiliated group identification unit for identifying a group to which a largest number of the owned characters are affiliated, and a group determination unit for determining a group so that the group identified by the affiliated group identification unit is chosen with a higher probability than other groups, and the exchangeable character presentation unit presents, as the exchangeable character, a character belonging to the group determined by the group determination unit on a screen.

According to the foregoing configuration, the respective characters owned by a game player belong to a group among a plurality of predetermined groups. For example, in a baseball game, a plurality of ball clubs corresponding to the 12 baseball clubs of the Japan Professional Baseball existing in the real world also exist as a group in a virtual space, and the respective characters are affiliated with one of these ball clubs. In addition, a group to which the largest number of the game player's owned characters are affiliated is identified by the affiliated group identification unit. The group that was identified as described above can be assumed to be a group that is favored by the game player for which characters are being actively collected; that is, an affiliated group of the character which the game player wishes to acquire via exchange.

The group identified by the affiliated group identification unit is chosen with a higher probability than other groups upon determining the affiliated group of the exchangeable character. Thus, with this game device, a group favored by the game player is predicted based on the game player's owned characters, and the character of that group is presented on the screen as the exchangeable character with a higher probability than the character of other positions. It is thereby possible to realize a smooth character exchange which effectively subdues the dissatisfaction in a conventional exchange of characters by game players.

(5) In the configuration of (4) above, preferably, the exchange condition presentation unit sets the probability that the group identified by the affiliated group identification unit is proposed as the character exchange condition to be lower than the probability that other groups are proposed.

Here, the group identified by the affiliated group identification unit is predicted to be a group that is favored by the game player as described above. To put it the other way around, it is possible to analyze (predict) that it is a group that the game player does not wish to exchange. If a group that the game player does not wish to exchange is presented as the exchange condition, it would be difficult for the game player to accept that exchange condition and, therefore, it would be desirable to lower the frequency that such exchange condition is presented from the game device. Thus, with this game device, by setting the probability that the group identified by the affiliated group identification unit is proposed as the character exchange condition to be lower than the probability that the other groups are proposed, it becomes difficult for the identified group to be presented as the character exchange condition, and a smooth character exchange is thereby realized.

(6) In the configuration of any one of (1) to (5), preferably, the exchange condition presentation unit comprises a required number determination unit for determining a required number of the owned characters, which are required for an exchange with the exchangeable character, so that the required number becomes greater as the basic ability score of the exchangeable character is higher, and a basic ability scoresetting unit for setting the basic ability score of the respective owned characters, which are required for the exchange with the exchangeable character, to be lower as the required number determined by the required number determination unit is greater, the character exchange condition determined based on the basic ability score set by the basic ability scoresetting unit is presented on a screen for the required number, and the exchange execution unit approves the exchange of the required number of owned characters and the exchangeable character when the required number of owned characters that satisfy all character exchange conditions presented by the exchange condition presentation unit is selected by the owned character selection unit.

According to the foregoing configuration, the required number determination unit increases the probability that the required number of the game player's owned characters required for the exchange will increase as the basic ability score of the exchangeable character presented by the game device side and to be considered by the game player as a target of exchange is higher, and thereby enables the required number to become greater with a higher probability. Moreover, simultaneously, in light of the balance that is required between the required number, which is required for the exchange, and the basic ability score, the basic ability score-setting unit sets the basic ability score of the respective owned characters required for the exchange to be lower as the required number of the game player's owned characters required for the exchange is greater. In addition, the exchange condition presentation unit presents, on the screen, the same number of character exchange conditions as the required number that was determined as described above, and the exchange execution unit approves the exchange when the required number of owned characters that satisfy the character exchange conditions is selected by the game player as targets of exchange.

Consequently, when an exchangeable character having a relatively high basic ability score is presented from the game device side, the required number of the game player's owned characters required for the exchange is set to be greater, and the basic ability score of the respective owned characters is set to be lower. Thus, in cases where the game player does not possess a character with a high basic ability score that matches the exchangeable card, or, even upon possessing such a character with a high basic ability score, in cases where the game player does not wish to relinquish that character, the character exchange can be approved more easily based on an exchange of "one-to-many" with a plurality of owned characters having a basic ability score that is lower than the foregoing character being targets of exchange, and a smooth character exchange is thereby realized.

(7) In the configuration of any one of (1) to (6), preferably, the exchange condition presentation unit comprises an exchange target selection unit for selecting, among the owned characters, an owned character to be exchanged with the exchangeable character, and an exchange condition determination unit for determining the character exchange condition so that the owned character selected by the exchange target selection unit satisfies the character exchange condition, and the character exchange condition determined by the exchange condition determination unit is presented on a screen.

According to the foregoing configuration, upon determining the character exchange condition, owned characters that may become targets of exchange are selected in advance among the game player's owned characters by the exchange target selection unit. In addition, the character exchange condition is subsequently determined in accordance with the owned characters selected by the exchange condition determination unit in advance. If the character exchange condition is determined based on the foregoing configuration, a smooth character exchange can be realized since a character that satisfies the character exchange condition will exist in the game player's owned characters without fail.

(8) In the configuration of any one of (1) to (7), preferably, the exchange-target character selection unit comprises an extraction unit for extracting, among the owned characters, an owned character that satisfies the character exchange condition presented by the exchange condition presentation unit, and an extraction display unit for displaying the owned character extracted by the extraction unit on a screen apart from owned characters that do not satisfy the character exchange condition, and the exchange-target character selection unit causes the game player to select an owned character to be exchanged with the exchangeable character among the owned characters displayed by the extraction display unit.

According to the foregoing configuration, when the exchange-target character selection unit displays a list of the game player's owned characters on the screen and causes the game player to select a character to be exchanged from the list, the extraction unit extracts the characters that satisfy the character exchange condition among the game player's owned characters, and the extraction display unit displays the owned characters that satisfy the exchange condition apart from the owned characters that do not satisfy the exchange condition (for example, the satisfying characters and non-satisfying characters are displayed in different brightness, color, size and the like). Consequently, even when there are numerous game player's owned characters, the game player can easily discover the owned characters that satisfy the character exchange condition from the screen displaying a list thereof, and the operation of selecting the owned character to be exchanged can be performed accurately and smoothly.

(9) The game control method according to another aspect of the present invention is a game control method where a computer controls a game using an owned character that is owned by a game player in a virtual space, comprises a character storage step of the computer storing the owned character in a storage device, and a character exchange step of the computer exchanging the owned character with another character, wherein the character exchange step comprises (a) an exchangeable character presentation step of the computer determining, based on the owned character, an exchangeable character that can be exchanged with the owned character, and presenting the exchangeable character on a screen, (b) an exchange condition presentation step of the computer setting a character exchange condition for exchanging the exchangeable character presented in the exchangeable character presentation step with the owned character, and presenting the character exchange condition on a screen, (c) an exchange-target character selection step of the computer causing the game player to select, among the owned characters, an owned character to be exchanged with the exchangeable character, and (d) an exchange execution step of the computer approving the exchange of the owned character and the exchangeable character when the owned character that satisfies the character exchange condition presented in the exchange condition presentation step is selected in the exchange-target character selection step, and updating a memory content of the storage device to a content after the approval of the exchange.

(10) The program according to yet another aspect of the present invention is a program for causing a computer to operate as the foregoing game device, and causes the computer to function as the respective units of the game device.

(11) The recording medium according to yet another aspect of the present invention is a non-transitory computer-readable recording medium having the program of (10) above recorded thereon.

(12) The game management device according to yet another aspect of the present invention is a game management device which receives an access from a terminal device of each player via a network and provides to each player, via the network, a game service using an owned character that is owned by a game player in a virtual space, which comprises a character storage unit for storing an owned character in a storage device, and a character exchange unit for exchanging the owned character with another character, wherein the character exchange unit comprises an exchangeable character presentation unit for determining, based on the owned character, an exchangeable character that can be exchanged with the owned character, transmitting information for displaying the exchangeable character to the terminal device, and presenting the exchangeable character on a screen of the terminal device; an exchange condition presentation unit for setting a character exchange condition for exchanging the exchangeable character presented by the exchangeable character presentation unit with the owned character, transmitting information for displaying the character exchange condition to the terminal device and presenting the character exchange condition on the screen of the terminal device; a selection operation information reception unit for receiving a selection operation information from the terminal device when an owned character to be exchanged with the exchangeable character is selected among the owned characters using the terminal device; and an exchange execution unit for executing the exchange of the owned character with the exchangeable character when the owned character that satisfies the character exchange condition presented by the exchange condition presentation unit is selected using the terminal device, and updating a memory content of the character storage unit to a content after the execute of the exchange.

According to the foregoing configuration, the present game management device receives an access from the terminal device of each player via a network and provides a game service to each player via the network, and is configured, for example, from an information processing device such as a server that can be connected to a network. As the game service that is provided to the respective players by the present game management device, for example, there is a service of a social game or the like where the players can play the game while cooperating or communicating with each other.

As explained in the above (1), the game management device comprises the character storage unit and the character exchange unit, and presents exchangeable characters and character exchange conditions on the screen of the player's terminal device. Furthermore, the exchange of the owned character with the exchangeable character is executed when the owned character that satisfies the character exchange condition is selected using the terminal device. According to the foregoing configuration, as in the case of the above configuration (1), the exchangeable characters to be presented to the player are selected on the side of the game management device based on the characters owned by the player. Thus, this game management device can analyze (predict) the characters that the game player wishes to exchange and thereby select the exchangeable character as with the foregoing configuration (1), and it is possible to provide the game player with a highly amusing game capable of realizing a smooth character exchange which subdues the dissatisfaction during a conventional exchange of characters by game players.

(13) In the configuration of (12) above, preferably, the game is played on the basis of a group including a plurality of the owned characters, the exchangeable character presentation unit comprises an average value calculation unit for calculating an average value of basic ability scores of the owned characters for each position in the group, an insufficient position identification unit for identifying, as an insufficient position, a position with a lowest average value calculated by the average value calculation unit, and a position determination unit for determining a position so that the insufficient position identified by the insufficient position identification unit is chosen with a higher probability than other positions, and the exchangeable character presentation unit presents, as the exchangeable character, a character of the position determined by the position determination unit on a screen. According to the foregoing configuration, the same function and effect as those of the configuration (2) above can be exhibited.

(14) In the configuration of (13) above, preferably, the exchange condition presentation unit sets the probability that the insufficient position identified by the insufficient position identification unit is proposed as the character exchange condition to be lower than the probability that other positions are proposed. According to the foregoing configuration, the same function and effect as those of the configuration (3) above can be exhibited.

(15) In the configuration of any one of (12) to (14) above, preferably, the owned characters belong to a group among a plurality of predetermined groups, the exchangeable character presentation unit comprises an affiliated group identification unit for identifying a group to which a largest number of the owned characters are affiliated, and a group determination unit for determining a group so that the group identified by the affiliated group identification unit is chosen with a higher probability than other groups, and the exchangeable character presentation unit presents, as the exchangeable character, a character belonging to the group determined by the group determination unit on the screen of the terminal device. According to the foregoing configuration, the same function and effect as those of the configuration (4) above can be exhibited.

(16) In the configuration of (15) above, preferably, the exchange condition presentation unit sets the probability that the group identified by the affiliated group identification unit is proposed as the character exchange condition to be lower than the probability that other groups are proposed. According to the foregoing configuration, the same function and effect as those of the configuration (5) above can be exhibited.

(17) In the configuration of any one of (12) to (16), preferably, the exchange condition presentation unit comprises a required number determination unit for determining a required number of the owned characters, which are required for an exchange with the exchangeable character, so that the required number becomes greater as the basic ability score of the exchangeable character is higher, and a basic ability scoresetting unit for setting the basic ability score of the respective owned characters, which are required for the exchange with the exchangeable character, to be lower as the required number determined by the required number determination unit is greater, the character exchange condition determined based on the basic ability score set by the basic ability scoresetting unit is presented on the screen of the terminal device for the required number, and the exchange execution unit approves the exchange of the required number of owned characters and the exchangeable character when the required number of owned characters that satisfy all character exchange conditions presented by the exchange condition presentation unit is selected by the owned character selection unit. According to the foregoing configuration, the same function and effect as those of the configuration (6) above can be exhibited.

(18) In the configuration of any one of (12) to (17), preferably, the exchange condition presentation unit comprises an exchange target selection unit for selecting, among the owned characters, an owned character to be exchanged with the exchangeable character, and an exchange condition determination unit for determining the character exchange condition so that the owned character selected by the exchange target selection unit satisfies the character exchange condition, and the character exchange condition determined by the exchange condition determination unit is presented on the screen of the terminal device. According to the foregoing configuration, the same function and effect as those of the configuration (7) above can be exhibited.

(19) In the configuration of any one of (12) to (18), preferably, the exchange-target character selection unit comprises an extraction unit for extracting, among the owned characters, an owned character that satisfies the character exchange condition presented by the exchange condition presentation unit, and an extraction display unit for displaying the owned character extracted by the extraction unit on the screen of the terminal device apart from owned characters that do not satisfy the character exchange condition by transmitting information for displaying using the terminal device, and the exchange-target character selection unit causes the game player operating the terminal device to select an owned character to be exchanged with the exchangeable character among the owned characters displayed by the extraction display unit. According to the foregoing configuration, the same function and effect as those of the configuration (8) above can be exhibited.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. A game device for executing a game using an owned character that is owned by a user of a game player in the game, comprising:
    a character storage unit for storing the owned character in a storage device; and
    a character exchange CPU configured to exchange the owned character with another character,
    wherein the character exchange CPU is configured to comprise:
    an exchangeable character presentation CPU configured to determine, based on the owned character, an exchangeable character that can be exchanged with the owned character, and presenting the exchangeable character on a screen,
    an exchange condition presentation CPU configured to set a character exchange condition for exchanging the exchangeable character presented by the exchangeable character presentation CPU with the owned character, present the character exchange condition on a screen,
    an exchange-target character selection CPU configured to cause the user to select, among owned characters, an owned character to be exchanged with the exchangeable character, and
    an exchange execution CPU configured to execute the exchange of the owned character with the exchangeable character when the owned character that satisfies the character exchange condition presented by the exchange condition presentation CPU is selected by the exchange-target character selection CPU, and update a memory content of the character storage unit to a content after the execute of the exchange,
    wherein the game is played on the basis of a group including a plurality of the owned characters, and
    the exchangeable character presentation CPU is configured to comprise an average value calculation CPU configured to calculate an average value of basic ability scores of the owned characters for each position in the group, an insufficient position identification CPU configured to identify, as an insufficient position, a position with a lowest average value calculated by the average value calculation CPU, and a position determination CPU configured to determine a position so that the insufficient position identified by the insufficient position identification CPU is chosen with a higher probability than other positions, and the exchangeable character presentation CPU presents, as the exchangeable character, a character of the position determined by the position determination CPU on a screen.

2. The game device according to claim 1, wherein:
the exchange condition presentation CPU is configured to set the probability that the insufficient position identified by the insufficient position identification CPU is proposed as the character exchange condition to be lower than the probability that other positions are proposed.

3. The game device according to claim 1, wherein:
the exchange condition presentation CPU is configured to comprise a required number determination CPU configured to determine a required number of the owned characters, which are required for an exchange with the exchangeable character, so that the required number becomes greater as the basic ability score of the exchangeable character is higher, and a basic ability score setting CPU configured to set the basic ability score of the respective owned characters, which are required for the exchange with the exchangeable character, to be lower as the required number determined by the required number determination CPU is greater, the character exchange condition determined based on the basic ability score set by the basic ability score setting CPU is presented on a screen for the required number; and
the exchange execution CPU is configured to approve the exchange of the required number of owned characters and the exchangeable character when the required number of owned characters that satisfy all character exchange conditions presented by the exchange condition presentation CPU is selected by the owned character selection CPU.

4. The game device according to claim 1, wherein:
the exchange condition presentation CPU is configured to comprise an exchange target selection CPU configured to select, among the owned characters, an owned character to be exchanged with the exchangeable character, and an exchange condition determination CPU configured to determine the character exchange condition so that the owned character selected by the exchange target selection CPU satisfies the character exchange condition, and the character exchange condition determined by the exchange condition determination CPU is presented on a screen.

5. The game device according to claim 1, wherein:
the exchange-target character selection CPU is configured to comprise an extraction CPU configured to extract, among the owned characters, an owned character that satisfies the character exchange condition presented by the exchange condition presentation CPU, and an extraction display CPU configured to display the owned character extracted by the extraction CPU on a screen apart from owned characters that do not satisfy the character exchange condition, and the exchange-target character selection CPU is configured to cause the user to select an owned character to be exchanged with the exchangeable character among the owned characters displayed by the extraction display CPU.

6. A game control method where a computer controls a game using an owned character that is owned by a user of a game player in the game, comprising:
   a character storage step of the computer storing the owned character in a storage device; and
   a character exchange step of the computer exchanging the owned character with another character,
   wherein the character exchange step comprises:
   an exchangeable character presentation step of the computer determining, based on the owned character, an exchangeable character that can be exchanged with the owned character, and presenting the exchangeable character on a screen,
   an exchange condition presentation step of the computer setting a character exchange condition for exchanging the exchangeable character presented in the exchangeable character presentation step with the owned character, and presenting the character exchange condition on a screen,
   an exchange-target character selection step of the computer causing the user to select, among the owned characters, an owned character to be exchanged with the exchangeable character, and
   an exchange execution step of the computer approving the exchange of the owned character and the exchangeable character when the owned character that satisfies the character exchange condition presented in the exchange condition presentation step is selected in the exchange-target character selection step, and updating a memory content of the storage device to a content after the approval of the exchange,
   wherein the game is played on the basis of a group including a plurality of the owned characters, and
   the exchangeable character presentation step of the computer comprises
   an average value calculation step of the computer calculating an average value of basic ability scores of the owned characters for each position in the group,
   an insufficient position identification step of the computer identifying, as an insufficient position, a position with a lowest average value calculated by the average value calculation step,
   a position determination step of the computer determining a position so that the insufficient position identified by the insufficient position identification step is chosen with a higher probability than other positions, and
   a presentation step of the computer presenting, as the exchangeable character, a character of the position determined by the position determination step on a screen.

7. A non-transitory computer-readable recording medium having recorded thereon a program for causing a computer to operate as the game device according to claim 1, which causes the computer to function as the respective CPUs of the game device.

8. A game management device which receives an access from a terminal device of each player via a network and provides to each player, via the network, a game service using an owned character that is owned by a user of a game player in the game, comprising:
   a character storage unit for storing an owned character in a storage device; and
   a character exchange CPU configured to exchange the owned character with another character,
   herein the character exchange CPU is configured to comprise:
   an exchangeable character presentation CPU configured to determine, based on the owned character, an exchangeable character that can be exchanged with the owned character, transmitting information for displaying the exchangeable character to the terminal device, and presenting the exchangeable character on a screen of the terminal device;
   an exchange condition presentation CPU configured to set a character exchange condition for exchanging the exchangeable character presented by the exchangeable character presentation CPU with the owned character, transmitting information for displaying the character exchange condition to the terminal device and presenting the character exchange condition on the screen of the terminal device;
   a selection operation information reception CPU configured to receive a selection operation information from the terminal device when an owned character to be exchanged with the exchangeable character is selected among the owned characters using the terminal device; and
   an exchange execution CPU configured to execute the exchange of the owned character with the exchangeable character when the owned character that satisfies the character exchange condition presented by the exchange condition presentation CPU is selected using the terminal device, and updating a memory content of the character storage unit to a content after the execute of the exchange,
   wherein the game is played on the basis of a group including a plurality of the owned characters, and
   the exchangeable character presentation CPU is configured to comprise an average value calculation CPU configured to calculate an average value of basic ability scores of the owned characters for each position in the group, an insufficient position identification CPU configured to identify, as an insufficient position, a position with a lowest average value calculated by the average value calculation CPU, and a position determination CPU configured to determine a position so that the insufficient position identified by the insufficient position identification CPU is chosen with a higher probability than other positions, and the exchangeable character presentation CPU presents, as the exchangeable character, a character of the position determined by the position determination CPU on a screen.

* * * * *